US011222513B2

(12) United States Patent
Ino et al.

(10) Patent No.: US 11,222,513 B2
(45) Date of Patent: Jan. 11, 2022

(54) MONEY HANDLING APPARATUS

(71) Applicant: GLORY LTD., Himeji (JP)

(72) Inventors: Kenichi Ino, Hyogo (JP); Michiharu Iwamura, Hyogo (JP)

(73) Assignee: Glory Ltd., Himeji (JP)

( * ) Notice: Subject to any disclaimer, the term of this patent is extended or adjusted under 35 U.S.C. 154(b) by 1072 days.

(21) Appl. No.: 15/619,672

(22) Filed: Jun. 12, 2017

(65) Prior Publication Data

US 2017/0278358 A1 Sep. 28, 2017

Related U.S. Application Data

(63) Continuation of application No. 15/463,163, filed on Mar. 20, 2017, which is a continuation of application (Continued)

(30) Foreign Application Priority Data

Aug. 9, 2011 (JP) ............................ JP2011-174052

(51) Int. Cl.

| | |
|---|---|
| ***G06Q 20/00*** | (2012.01) |
| ***G07F 19/00*** | (2006.01) |
| ***G07D 11/14*** | (2019.01) |
| ***G07D 11/50*** | (2019.01) |
| ***E05G 7/00*** | (2006.01) |
| ***G07F 5/26*** | (2006.01) |
| ***G07F 7/02*** | (2006.01) |

(Continued)

(52) U.S. Cl.
CPC ............. *G07F 19/203* (2013.01); *E05G 1/02* (2013.01); *E05G 1/024* (2013.01); *E05G 1/026* (2013.01); *E05G 1/04* (2013.01); *E05G 7/001* (2013.01); *G07C 9/00912* (2013.01); *G07C 9/38* (2020.01); *G07D 11/14* (2019.01); *G07D 11/50* (2019.01); *G07F 5/26* (2013.01); *G07F 7/02* (2013.01)

(58) Field of Classification Search
CPC ........... G06Q 2020/00; G06Q 2020/10; G06Q 2020/12; G07F 19/203; G07F 5/26; G07F 7/02; G07C 9/38; G07C 9/00912; G07D 11/14; G07D 11/50; E05G 1/024; E05G 1/026; E05G 1/04; E05G 1/02; E05G 7/001
USPC ............................................... 705/16, 21, 59
See application file for complete search history.

(56) References Cited

U.S. PATENT DOCUMENTS 4,699,272 A 10/1987 Kokubo et al.
5,774,059 A 6/1998 Henry et al.
(Continued)

FOREIGN PATENT DOCUMENTS

CN 101344975 A 1/2009
DE 20 2009 002 359 U1 7/2010
(Continued)

*Primary Examiner* — Dante Ravetti
(74) *Attorney, Agent, or Firm* — Renner, Kenner, Greive, Bobak, Taylor & Weber

(57) ABSTRACT

The present disclosure relates to a money handling apparatus including: a money storage unit configured to store money; a locking unit configured to limit access to the money storage unit; and a control unit configured to give unlock permission to unlock the locking unit to at least one of a plurality of qualified persons who are qualified to unlock the locking unit, and to perform a process involving change of the qualified person.

6 Claims, 53 Drawing Sheets

Related U.S. Application Data

No. 13/561,729, filed on Jul. 30, 2012, now Pat. No. 9,704,322.

(51) Int. Cl.

| | |
|---|---|
| ***E05G 1/02*** | (2006.01) |
| ***G07C 9/38*** | (2020.01) |
| ***G07C 9/00*** | (2020.01) |
| ***E05G 1/024*** | (2006.01) |
| ***E05G 1/026*** | (2006.01) |
| ***E05G 1/04*** | (2006.01) |

(56) References Cited

U.S. PATENT DOCUMENTS

| | | | | |
|---|---|---|---|---|
| 6,012,048 | A | 1/2000 | Gustin | |
| 6,540,136 | B1 | 4/2003 | Ross | |
| 7,967,191 | B1 | 6/2011 | Enright | |
| 8,893,959 | B1 | 11/2014 | Graef et al. | |
| 2002/0071244 | A1 | 6/2002 | Zerman | |
| 2002/0147598 | A1 | 10/2002 | Smith et al. | |
| 2004/0050650 | A1 | 3/2004 | Yamagishi | |
| 2006/0208852 | A1* | 9/2006 | Wenzlik | G07F 19/20 340/5.28 |
| 2008/0235596 | A1 | 9/2008 | Bhogal et al. | |
| 2008/0290595 | A1* | 11/2008 | Fujita | G07D 11/40 271/278 |
| 2009/0056599 | A1 | 3/2009 | Turner et al. | |
| 2010/0065623 | A1 | 3/2010 | Sauter | |
| 2010/0213661 | A1 | 8/2010 | Fukazawa et al. | |
| 2010/0245043 | A1 | 9/2010 | Doi et al. | |
| 2011/0077770 | A1 | 3/2011 | Ito | |
| 2011/0184865 | A1 | 7/2011 | Mon et al. | |
| 2011/0190929 | A1* | 8/2011 | Ring | G07D 11/36 700/237 |
| 2012/0024659 | A1 | 2/2012 | Mizoro | |
| 2012/0305362 | A1 | 12/2012 | Iwamura et al. | |
| 2014/0238815 | A1 | 8/2014 | Iwamura et al. | |
| 2016/0012659 | A1 | 1/2016 | Iwamura et al. | |

FOREIGN PATENT DOCUMENTS

| | | | |
|---|---|---|---|
| EP | 0 831 432 | A2 | 3/1998 |
| EP | 2 071 528 | A1 | 6/2009 |
| EP | 2 221 773 | A1 | 8/2010 |
| JP | 61-177591 | A | 8/1986 |
| JP | 6-274739 | A | 9/1994 |
| JP | 7-282316 | A | 10/1995 |
| JP | 2000-123219 | A | 4/2000 |
| JP | 2001-243517 | A | 9/2001 |
| JP | 2001-266227 | A | 9/2001 |
| JP | 2002-312833 | A | 10/2002 |
| JP | 2007-125172 | A | 5/2007 |
| JP | 2007-257353 | A | 10/2007 |
| JP | 2007-310547 | A | 11/2007 |
| JP | 2009-129385 | A | 6/2009 |
| JP | 2010-176430 | A | 8/2010 |
| SG | 177134 | A1 | 1/2012 |
| WO | WO 03/075228 | A1 | 9/2003 |
| WO | WO 2011/036782 | A1 | 3/2011 |

* cited by examiner

FIG.18A

| TYPE OF COUNTER | | DENOMINATION | SIZE/ DENOMINATION |
|---|---|---|---|
| ACTUAL INVENTORY AMOUNT | FIRST STORAGE CASSETTE | 128 DENOMINATIONS | 2 BYTES/ DENOMINATION |
| | SECOND STORAGE CASSETTE | 128 DENOMINATIONS | 2 BYTES/ DENOMINATION |
| | THIRD STORAGE CASSETTE | 128 DENOMINATIONS | 2 BYTES/ DENOMINATION |
| | UPPER FOURTH STORAGE CASSETTE | 128 DENOMINATIONS | 2 BYTES/ DENOMINATION |
| | LOWER FOURTH STORAGE CASSETTE | 128 DENOMINATIONS | 2 BYTES/ DENOMINATION |
| | RECONCILIATION CASSETTE | 128 DENOMINATIONS | 2 BYTES/ DENOMINATION |
| | COLLECTION CASSETTE | 128 DENOMINATIONS | 2 BYTES/ DENOMINATION |
| IN-STORAGE INVENTORY AMOUNT | | 128 DENOMINATIONS | 2 BYTES/ DENOMINATION |

FIG.18B

| TYPE OF SERIAL NUMBER LIST | NUMBER OF BANKNOTES | SIZE/ BANKNOTE |
|---|---|---|
| FIRST STORAGE CASSETTE | 3000 | 16 BYTES/ BANKNOTE |
| SECOND STORAGE CASSETTE | 3000 | 16 BYTES/ BANKNOTE |
| THIRD STORAGE CASSETTE | 3000 | 16 BYTES/ BANKNOTE |
| UPPER FOURTH STORAGE CASSETTE | 3000 | 16 BYTES/ BANKNOTE |
| LOWER FOURTH STORAGE CASSETTE | 3000 | 16 BYTES/ BANKNOTE |
| RECONCILIATION CASSETTE | 3000 | 16 BYTES/ BANKNOTE |
| COLLECTION CASSETTE | 5000 | 16 BYTES/ BANKNOTE |
| DISPENSING UNIT | 220 | 16 BYTES/ BANKNOTE |
| REJECTED BANKNOTE ESCROW UNIT | 520 | 16 BYTES/ BANKNOTE |

| PATTERN | QUALIFIED PERSON | PERMITTED QUALIFIED PERSON | OWNER |
|---|---|---|---|
| CONVENTIONAL EXAMPLE | CIT COMPANY | CIT COMPANY | CIT COMPANY |
| EXAMPLE 1 | CIT COMPANY<br>PERSON IN CHARGE OF ACCOUNTING | CIT COMPANY | CIT COMPANY |
| EXAMPLE 2 | CIT COMPANY<br>PERSON IN CHARGE OF ACCOUNTING<br>BANK | CIT COMPANY | CIT COMPANY |

FIG.54

| | QUALIFIED PERSON | PERMITTED QUALIFIED PERSON | OWNER |
|---|---|---|---|
| FIRST SAFE UNIT | PERSON IN CHARGE OF ACCOUNTING<br>CIT COMPANY<br>BANK | PERSON IN CHARGE OF ACCOUNTING | PERSON IN CHARGE OF ACCOUNTING |
| SECOND SAFE UNIT | PERSON IN CHARGE OF ACCOUNTING<br>CIT COMPANY<br>BANK | CIT COMPANY | CIT COMPANY |

MONEY HANDLING APPARATUS

CROSS-REFERENCE TO RELATED APPLICATION

This application is a continuation of U.S. patent application Ser. No. 15/463,163 filed on Mar. 20, 2017, which was a continuation of U.S. patent application Ser. No. 13/561,729 filed on Jul. 30, 2012, which was based upon and claimed the benefit of priority from Japanese Patent Application No. JP 2011-174052 filed on Aug. 9, 2011, the disclosure of which including the specification, the drawings, and the claims is hereby incorporated by reference in its entirety.

BACKGROUND

The present disclosure relates to money handling apparatuses etc.

Japanese Patent Publication No. 2002-312833 discloses a money depositing/dispensing machine from which only a particular collector can remove the money stored therein. In the money depositing/dispensing machine, operation is limited to each ID card. For example, when an ID card of the particular collector is passed through a card reader, a door of a lower block of the machine is unlocked so that proceeds stored in a cassette in the lower block can be collected.

International Patent Publication No. WO2010/109606 discloses a money handling apparatus in which three or more concerned persons can handle the money. This money handling apparatus is divided into a depositing/dispensing unit for depositing/dispensing money, a storage unit for storing the money, etc. Each of the divided units is configured to be handled only by a different concerned person.

The money handling apparatus is generally placed in supermarkets, banks, etc., where a lot of money is handled, and is used for receipts and disbursements at a teller of the bank, or management of proceeds of the supermarket. The money handling apparatus includes a handling unit for handling the money, a safe unit for storing the money, etc., which are suitably divided according to their functions, security level, etc. Accesses to the units are limited to different persons.

For example, when the money handling apparatus is placed in the supermarket, a person in charge of accounting of the supermarket who handles the proceeds is permitted to access the handling unit, and a predetermined CIT company which regularly collects the proceeds based on a request of the bank, or the bank is permitted to access the safe unit.

According to the money depositing/dispensing unit of Japanese Patent Publication No. 2002-312833, and the money handling apparatus of International Patent Publication No. WO2010/109606, access to the handling unit etc. has been fixed. This is disadvantageous in view of recovery from errors etc.

For example, in the above-described case, when an error has occurred in the safe unit while the person in charge of accounting is handling the proceeds using the money handling apparatus, the apparatus cannot be recovered from the error unless the CIT company or a bank clerk in charge is called because the person in charge of accounting is not permitted to access the safe unit. When the CIT company or the bank is located away from the supermarket, or immediate support cannot be expected even when they are located closer to the supermarket, the handling of the proceeds is suspended, and the money handling apparatus cannot be used for a long time.

SUMMARY

The present disclosure is concerned with providing a money handling apparatus which can quickly be recovered from trouble even when the trouble has occurred in the absence of a person permitted to access the apparatus.

The disclosed money handling apparatus includes: a money storage unit configured to store money; a locking unit configured to limit access to the money storage unit; and a control unit configured to give unlock permission to unlock the locking unit to at least one of a plurality of qualified persons who are qualified to unlock the locking unit, and to perform a process involving change of the qualified person.

For example, a plurality of persons can be registered in advance as the qualified persons who are qualified to unlock the unlock unit configured to limit the access to the money storage unit storing the money, such as an electronic lock of a safe unit. The person designates not only an individual person, but includes persons belonging to a particular group. The unlock permission to unlock the unlock unit can be given to at least one of the plurality of qualified persons. The control unit is configured to perform a process involving change of the qualified person.

Thus, according to the money handling apparatus, in the example of the supermarket described above, the person in charge of accounting, the CIT company, and the bank are qualified to unlock the electronic lock, and the unlock permission is given to the CIT company or the bank. Thus, even when trouble has occurred while the person in charge of accounting is handling the proceeds, the qualified person can be changed from the CIT company or the bank to the person in charge of accounting. As a result, the person in charge of accounting can unlock the electronic lock to resolve the trouble without the need to wait for the CIT company or the bank. Thus, the money handling apparatus can be recovered in a short time, and the handling of the proceeds can be continued without interruption for a long time.

The control unit may change the qualified person based on a predetermined condition. In this case, the qualified person can be changed based on the predetermined condition that a command to change the qualified person has been received, that a particular state of the money handling apparatus has been detected, or that it is a predetermined time.

Thus, the qualified person can flexibly be changed, thereby improving convenience of the money handling apparatus.

The money handling apparatus may further include a memory unit configured to record ownership of the money in the money storage unit, wherein the control unit manages the unlock permission in association with the ownership. Specifically, the control unit may be configured to change the qualified person to involve change of the ownership, or to change the ownership in response to change of the qualified person. More specifically, the control unit may be configured to make a transfer between an account of a person having the ownership before the change of the ownership and an account of a person having the ownership after the change of the ownership.

Thus, in changing the qualified person, the ownership of the money in the money storage unit can also be changed. Therefore, the money stored in the money storage unit before and after the change of the qualified person can clearly be handled, and reliability of the apparatus can be ensured.

The control unit may be configured to transfer the ownership to a person corresponding to the qualified person who has unlocked the locking unit.

For example, when the registered qualified person who is qualified to unlock the locking unit has unlocked the locking unit, the control unit can automatically change the owner. Thus, an additional process for changing the owner is no longer necessary, and time required for the recovery can further be shortened.

The money handling apparatus may include two money storage units each having a locking unit, unlock permissions to unlock the locking units being given to different qualified persons, wherein the control unit is configured to give two unlock permissions which have been given to the different qualified persons to the same qualified person.

In this case, the same qualified person can unlock the two money storage units. This can improve efficiency of a collection process etc.

The money storage unit may be in a safe, and the locking unit may lock the safe. The money storage unit may be a money cassette removable from the money handling apparatus, and the locking unit may limit removal of the money cassette from the money handling apparatus.

According to another aspect of the present disclosure, a money managing system can be provided. Specifically, the present disclosure relates to a money managing system including: a money handling apparatus, and a higher-ranking apparatus of the money handling apparatus, wherein the money handling apparatus includes: a money storage unit configured to store money; a locking unit configured to limit access to the money storage unit; and a control unit configured to give unlock permission to unlock the locking unit to at least one of a plurality of qualified persons who are qualified to unlock the locking unit, and the control unit performs a process involving change of the qualified person in cooperation with the higher-ranking apparatus.

According to still another aspect of the present disclosure, a money managing method can be provided. Specifically, the present disclosure relates to a method for managing money in a money handling apparatus in which a locking unit is configured to limit access to a money storage unit configured to store money, and unlock permission to unlock the locking unit is given to at least one of a plurality of qualified persons who are qualified to unlock the locking unit, the method including: a process involving change of the qualified person.

According to the disclosed money handling apparatus etc., trouble can quickly be solved even when the trouble has occurred in the absence of a person permitted to access the apparatus.

BRIEF DESCRIPTION OF THE DRAWINGS

FIGS. 18A and 18B show a counter and serial number management function of the money handling apparatus of the first type.

FIG. 54 shows relationship among persons qualified to unlock a money storage unit according to the alternative.

DETAILED DESCRIPTION

An embodiment of the present disclosure will be described below with reference to the drawings. The following description is set forth merely for the purposes of preferred examples in nature, and are not intended to limit the scope, application, and use of the present disclosure.

[Basic Configuration of Money Handling Apparatus]

A money handling apparatus to which the present disclosure is applicable is a multifunctional apparatus configured to handle banknotes and coins. The apparatus is generally used in supermarkets, banks, etc., where a lot of money is handled. For example, the apparatus is used for time-consuming processes, such as depositing, dispensing, counting, and safekeeping cash in receipts and disbursements at a teller window of a bank, or in management of proceeds of a supermarket. Use of the money handling apparatus can improve accuracy and efficiency of such processes.

Figure 1:
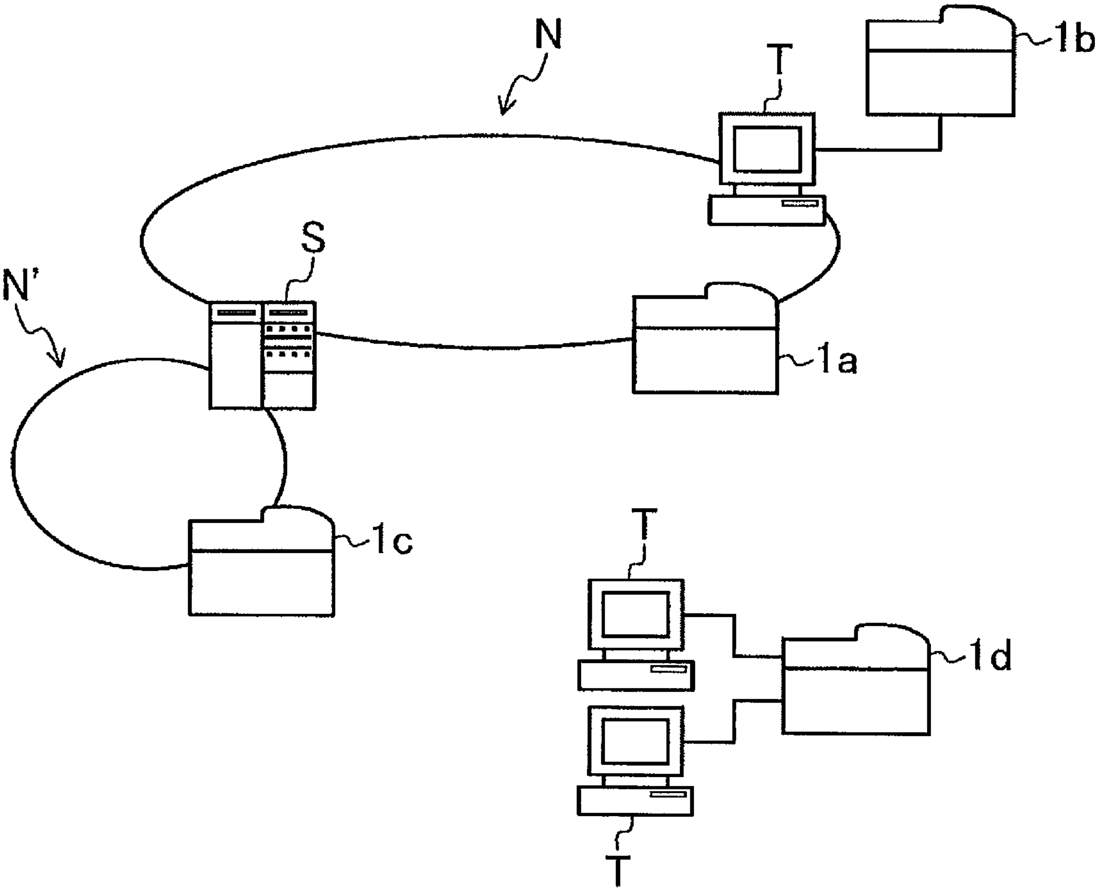
FIG. 1 shows an example of application of a money handling apparatus.

FIG. 1 shows an example of a system to which the disclosed money handling apparatus is applied. The money handling apparatus is connected to a higher-ranking terminal or a server through a network, such as LAN, WAN, etc., to establish communication between them, and can be used as part of a system. For example, as shown in FIG. 1, the money handling apparatus may be a money handling apparatus 1*a* connected to a network N to which a higher-ranking terminal and various devices are connected, or may be a money handling apparatus 1*b* connected to the higher-ranking terminal T on the network N. Further, the money handling apparatus may be a money handling apparatus 1*c* connected to another network N' connected through a server S. In this case, the money handling apparatus 1*c* can be connected to a network of an accounting system of a bank. Thus, an accounting process of the money managed by the money handling apparatus 1*c* can be performed in real-time through the network.

The money handling apparatus 1 may be a money handling apparatus 1*d* which is directly connected to an independent higher-ranking terminal T. In this case, the money handling apparatus 1 can be connected not only to a single higher-ranking terminal T, but to a plurality of higher-ranking terminals T as shown in FIG. 1 so that any one of the higher-ranking terminals T can selectively be used.

There are various types of money handling apparatuses different in applications and functions. The present disclosure is not limited to a particular type of the apparatus, and can be applied to various types of the apparatuses. As examples of the money handling apparatuses to which the present disclosure is applicable, the money handling apparatuses of three types (first to third types) will be described in detail below, and a specific configuration of the disclosed money handling apparatus will be described later.

(Classification of Banknotes)

The money handled by the money handling apparatus includes banknotes and coins. In this example, handling of the banknotes will be described. Processes to be performed may vary depending on the conditions of the banknotes. In the following description, the banknotes are classified by condition. Specifically, a "normal banknote" designates a banknote which is recognizable by a recognition unit, and a "rejected banknote" designates a banknote which is not recognizable by the recognition unit. A "fit banknote" designates a banknote which is a normal banknote, and is stained or torn to a lesser extent, and an "unfit banknote" designates a banknote which is a normal banknote, and is stained or torn to a greater extent.

[Money Handling Apparatus of First Type]

(Configuration of Money Handling Apparatus of First Type)

Figure 2:
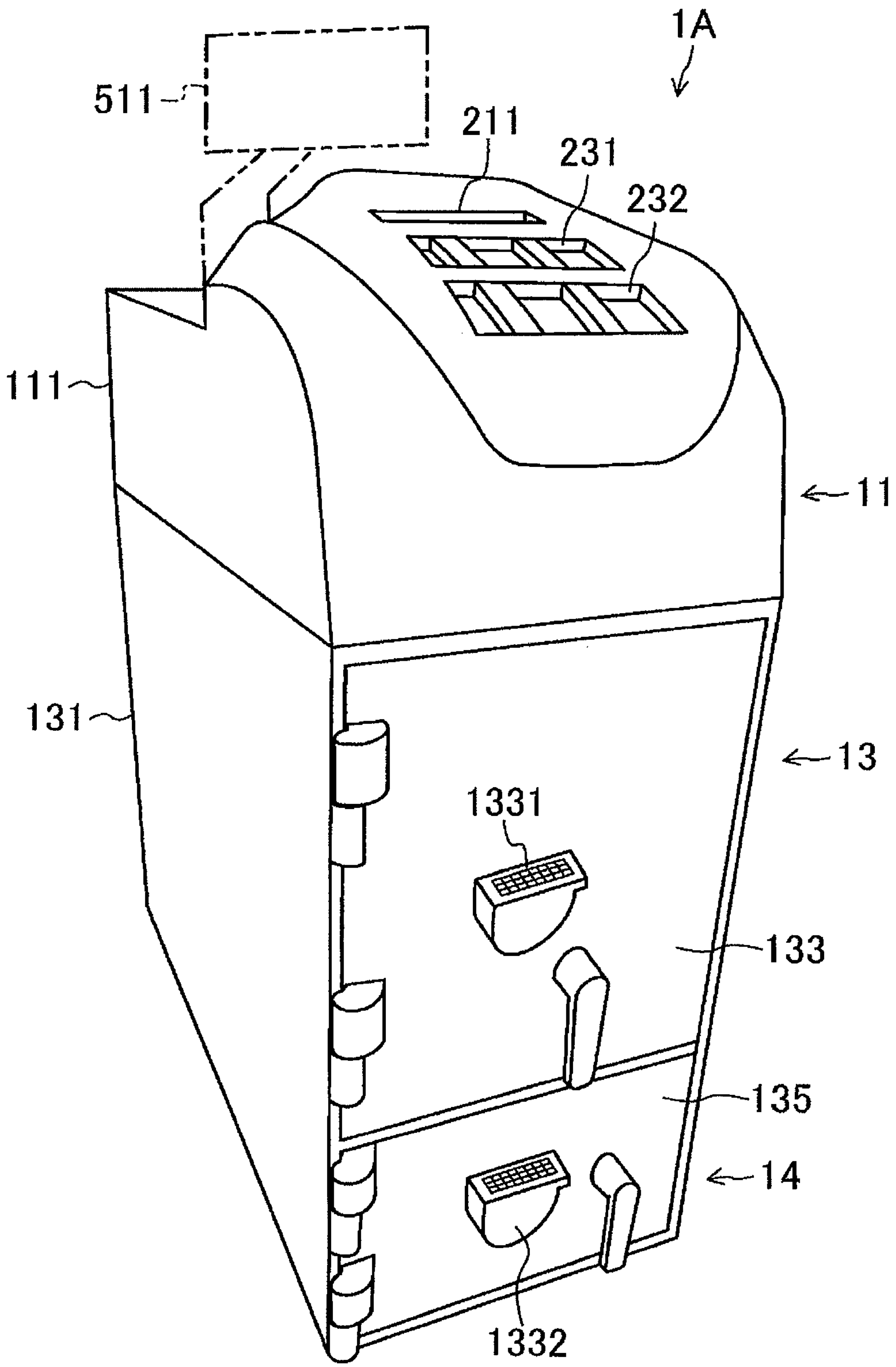
FIG. 2 is a schematic perspective view of a money handling apparatus of a first type.
Figure 3:
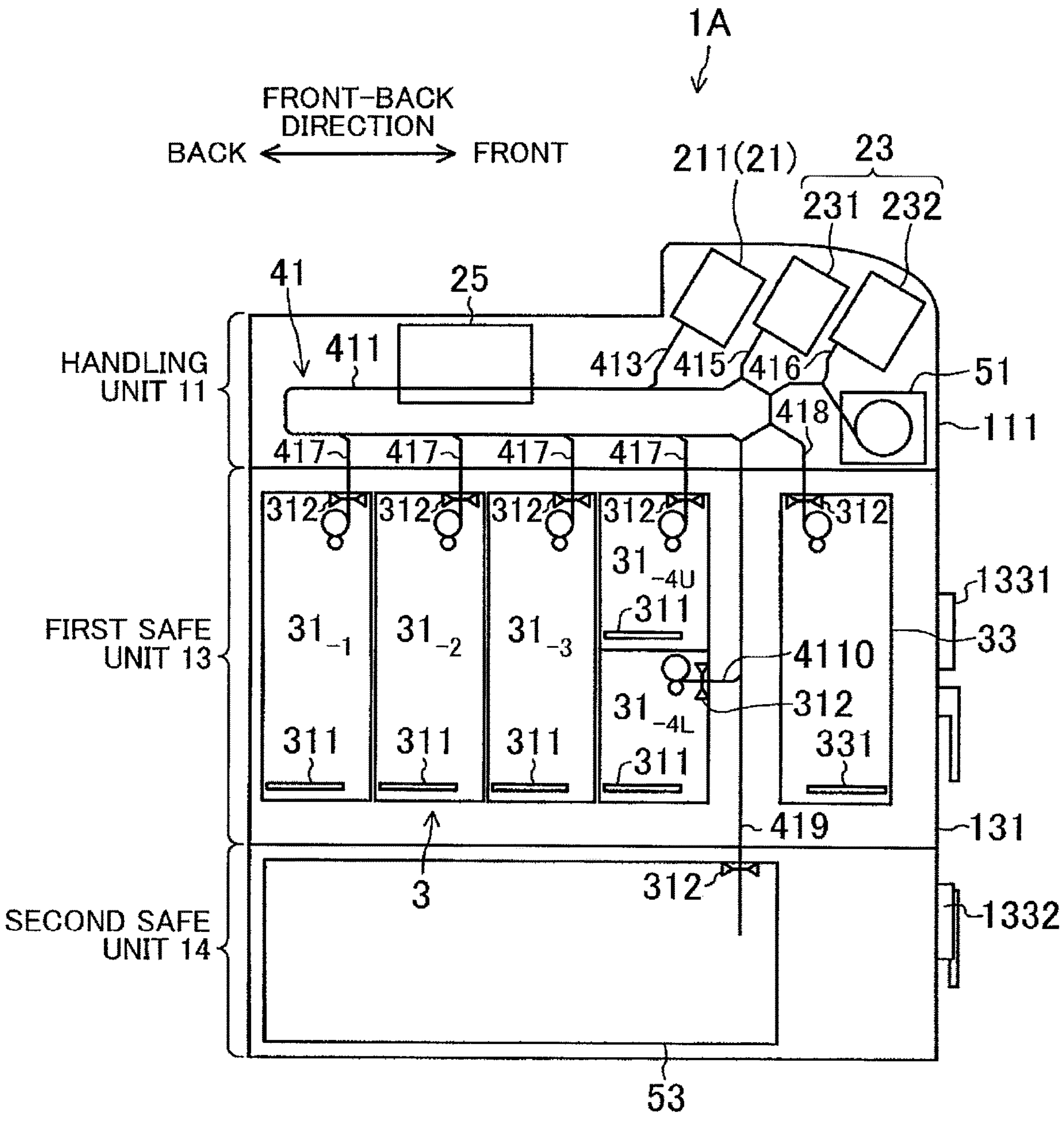
FIG. 3 schematically shows an internal structure of the money handling apparatus of the first type.

FIGS. 2 and 3 show a money handling apparatus of a first type (hereinafter merely referred to as a depositing/dispensing machine 1A). The depositing/dispensing machine 1A is a so-called circulating depositing/dispensing machine. The banknotes dispensed in a dispensing process include the banknotes stored in the storage unit 3 in a depositing process.

The depositing/dispensing machine 1A is broadly divided into an upper handling unit 11, a first safe unit 13 in the middle, and a lower second safe unit 14. A casing 111 constituting the handling unit 11 contains a depositing unit 21 having the inlet 211, a dispensing unit 23 having a first outlet 231 and a second outlet 232, a recognition unit 25 configured to recognize the banknotes, a rejected banknote escrow unit (hereinafter merely referred to as an escrow unit) 51 configured to temporarily store the banknotes, and a transport unit 41 which includes a looped transport path 411 connecting the depositing unit 21, the dispensing unit 23, the recognition unit 25, and the escrow unit 51. A casing 131 arranged below the casing 111 constituting the handling unit 11 constitutes the first and second safe units 13 and 14, and is configured to protect the storage unit 3 etc. contained therein at a predetermined security level or higher (hereinafter may be referred to as a protective casing 131).

The first safe unit 13 contains the storage unit 3 including a plurality of stacking storage cassettes 31 (4 cassettes in an example shown in the drawings), and a stacking reconciliation cassette 33. The second safe unit 14 contains a collection cassette 53. A first door 133 for opening and closing the first safe unit 13, and a second door 135 for opening and closing the second safe unit 14 are provided in a front surface of the protective casing 131.

A first electronic lock 1331 is provided on a front surface of the first door 133, and a second electronic lock 1332 is provided on a front surface of the second door 135. Each of the electronic locks 1331 and 1332 can be unlocked by inputting a predetermined pin number, for example. When the electronic locks 1331 and 1332 are unlocked, the doors 133 and 135 are opened, and access (contact) to the storage unit 3 and the collection cassette 53 is allowed. In conventional apparatuses, as described above, permission to unlock the electronic locks 1331 and 1332 is fixed. According to the present disclosure, however, the permission to unlock the electronic locks 1331 and 1332 can dynamically be changed as described in detail later.

The inlet 211 is a port in which the banknotes to be deposited are placed in a depositing process. The inlet 211 is opened upward in an upper surface of the casing 111, and can receive a plurality of banknotes at a time. The depositing unit 21 includes a feeding mechanism for feeding the plurality of banknotes placed in the inlet 211 one by one to the looped transport path 411.

The first and second outlets 231 and 232 of the dispensing unit 23 are ports to which the banknotes are dispensed in the dispensing process, for example. The outlets 231 and 232 are located forward of the inlet 211 in a front-back direction of the machine, aligned in a front-back direction, and opened obliquely upward between the upper surface and a front surface of the casing 111. Each of the first and second outlets 231 and 232 is provided with a lift (not shown) which can accumulate the transported banknotes, and can hold a plurality of banknotes at a time. A lifting mechanism moves the lift between a dispensing position at which the banknotes can be removed from the outlet, and a standby position at which the banknotes cannot be removed from the outlet.

The recognition unit 25 is provided on the looped transport path 411 to recognize authenticity, fitness, and denomination of each of the banknotes transported on the looped transport path 411. Specifically, the recognition unit 25 includes a sensor for detecting the feature of each banknote, such as an image sensor, an infrared sensor, an ultraviolet sensor, or a magnetometric sensor, to determine whether the feature of the transported banknote matches the stored feature of the banknote, thereby recognizing the authenticity, fitness, and denomination of each banknote. The recognition unit 25 can optically read a serial number printed on each of the banknotes. To read the serial number is to obtain an image of the serial number printed on a predetermined position of the banknote, and to recognize letters or numerics of the serial number based on the obtained image. Instead of the recognition unit 25, another reading unit may be provided on the looped transport path 411 to read the serial number. A control unit 513 described later may have functions of the recognition unit 25 except for the sensor.

The transport unit 41 includes the looped transport path 411 endlessly running in the casing 111. The banknotes are transported on the looped transport path 411 clockwise and counterclockwise in FIG. 3. Although not shown, the looped transport path 411 includes a combination of a plurality of rollers, belts, motors for driving them, sensors for detecting the transported banknotes, and guides. The looped transport path 411 allows long edge feed of the banknotes one by one with a predetermined gap kept between the banknotes. The looped transport path 411 and the inlet 211 are connected through a depositing path 413, and the banknotes placed in the inlet 211 are transported to the looped transport path 411 through the depositing path 413.

To the looped transport path 411, four branch paths 417 connected to the four storage cassettes 31, respectively, are connected through diverters (not shown). Due to operation of the diverters, the banknotes traveling on the looped transport path 411 are selectively transported to any one of the four storage cassettes 31 through the branch path 417, and stored therein, and the banknotes fed from any one of the storage cassettes 31 are transported to the looped transport path 411 through the branch path 417.

To the looped transport path 411, first and second dispensing paths 415 and 416 are connected through diverters (not shown) which change the traveling direction of the banknotes. An end of the first dispensing path 415 is connected to the first outlet 231, and an end of the second dispensing path 416 is connected to the second outlet 232. Each of the diverters is positioned at a junction of three transport paths extending in different directions, and selectively transports the banknotes traveling from one of the transport paths to the other two transport paths. Details of the diverters are described in International Patent Publication WO2009/034758 which is herein incorporated by reference. In this configuration, the banknotes traveling on the looped transport path 411 are selectively transported to the first or second outlet 231 or 232 through the first or second dispensing path 415 or 416 by the operation of the diverter.

To the looped transport path 411, a first connection path 418 connected to the reconciliation cassette 33, and a second connection path 419 connected to the collection cassette 53 are connected through diverters (not shown), respectively. The second connection path 419 vertically penetrates the first safe unit 13, and is provided with a branch path 4110. The branch path 4110 is connected to a lower fourth storage cassette $\mathbf{31}_{-4L}$ described later.

The diverters are positioned at junctions of the first connection path 418 and the second connection path 419, respectively. Each of the diverters is positioned at a junction of three transport paths extending in different directions, and selectively transports the banknotes traveling from one of the transport paths to the other two transport paths. In this configuration, the banknotes traveling on the looped transport path 411 clockwise or counterclockwise are selectively transported to the reconciliation cassette 33 through the first connection path 418, or to the lower fourth storage cassette $\mathbf{31}_{-4L}$ or the collection cassette 53 through the second connection path 419, by the operation of the diverter. The banknotes fed from the reconciliation cassette 33 or the lower fourth storage cassette $\mathbf{31}_{-4L}$, and passed through the first or second connection path 418 or 419 are transported through the looped transport path 411 clockwise or counterclockwise.

As described above, the storage unit 3 includes first to fourth stacking storage cassettes 31 in the example shown in the drawings. In the following description, a set of the four storage cassettes will be indicated by a reference character "31," while the first, second, third, . . . storage cassettes will be indicated by reference characters "$\mathbf{31}_{-1}$, $\mathbf{31}_{-2}$, $\mathbf{31}_{-3}$, . . . " The number of the storage cassettes 31 is not particularly limited as long as more than one storage cassette 31 is provided. In this example, the four storage cassettes 31 are arranged in a front-back direction of the apparatus.

Although not shown in detail in the drawings, the storage unit 3 can be drawn frontward of the apparatus when the door 133 of the first safe unit 13 is open. Each of the storage cassettes 31 is detachable from the apparatus when the storage unit 3 is drawn forward.

Figure 4:
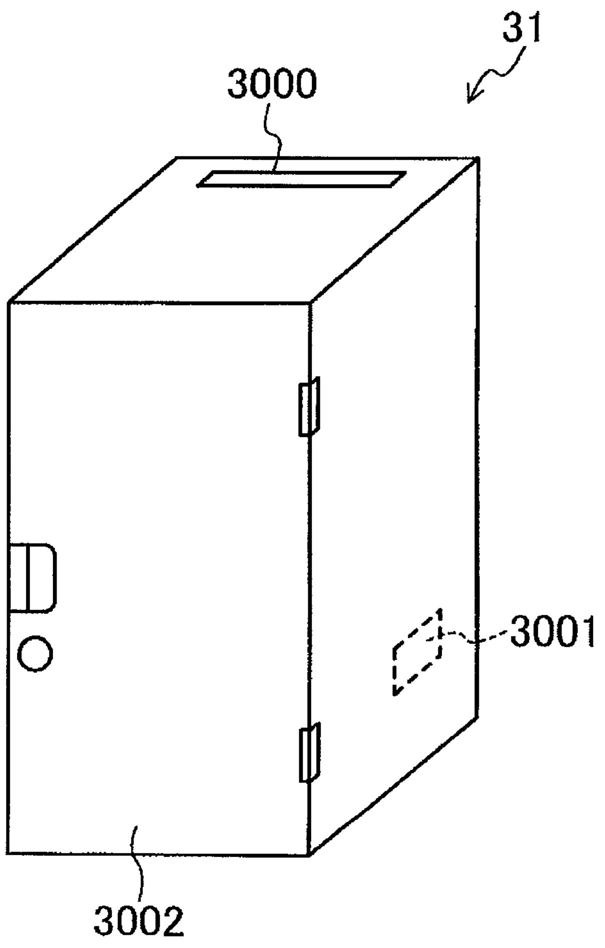
FIG. 4 is a schematic perspective view of a storage cassette.

FIG. 4 shows an example of the storage cassette 31. The first to third storage cassette $\mathbf{31}_{-1}$, $\mathbf{31}_{-2}$, and $\mathbf{31}_{-3}$, the fourth storage cassette $\mathbf{31}_{-4}$, and the reconciliation cassette 33 have similar appearance, and are narrow in the vertical direction. A port 3000 through which the banknotes can pass is formed in an upper surface of each of the storage cassettes 31 to communicate the inside and the outside of the cassette, and the branch path 417 is detachably connected to the port 3000. A swing cassette door 3002 is provided on a side surface of the storage cassette 31. A lock unit 3001 which limits removal of the storage cassette 31 controls opening/closing of the cassette door 3002.

A table 311 which ascends or descends depending on the amount of the banknotes stacked thereon is provided in each of the storage cassettes 31. Thus, each of the first to third storage cassettes $\mathbf{31}_{-1}$, $\mathbf{31}_{-2}$, and $\mathbf{31}_{-3}$ is configured to stack the banknotes sent to the inside of the cassette from the looped transport path 411 through the port 3000 on the table 311 in the order from bottom to top, and to feed the banknotes stacked on the table 311 out of the cassette one by one in the order from top to bottom through the port 3000, i.e., to the looped transport path 411.

The fourth storage cassette $\mathbf{31}_{-4}$ is provided with a divider plate to divide space in the fourth storage cassette $\mathbf{31}_{-4}$ into an upper part (an upper fourth storage cassette $\mathbf{31}_{-4U}$) and a lower part (a lower fourth storage cassette $\mathbf{31}_{-4L}$). A port 3000 of the upper fourth storage cassette $\mathbf{31}_{-4U}$ is formed in an upper surface thereof, while a port 3000 of the lower fourth storage cassette $\mathbf{31}_{-4L}$ is formed in a side surface thereof. The branch path 417 branched from the looped transport path 411 is connected to the port 3000 of the upper fourth storage cassette $\mathbf{31}_{-4U}$, and the branch path 4110 branched from the second connection path 419 is connected to the port 3000 of the lower fourth storage cassette $\mathbf{31}_{-4L}$.

Thus, like the first storage cassette $\mathbf{31}_{-1}$ etc., the upper fourth storage cassette $\mathbf{31}_{-4U}$ is configured to store the banknotes therein, and feed the banknotes therefrom. The lower fourth storage cassette $\mathbf{31}_{-4L}$ is configured to store the banknotes sent to the inside thereof from the looped transport path 411 through the second connection path 419 by stacking the banknotes on the table 311 in the order from bottom to top, and to feed the banknotes stacked on the table 311 one by one in the order from top to bottom to the second connection path 419 and the looped transport path 411.

The reconciliation cassette 33 is used for a reconciliation process performed on each storage cassette 31, and has a volume which is equal to or larger than the storage cassette 31 so that the reconciliation cassette 33 can store all the banknotes stored in each of the storage cassettes 31. The reconciliation cassette 33 is generally empty when the reconciliation process is not performed. In the first safe unit 13, the reconciliation cassette 33 is detachably attached to the casing 131 to be located opposite the fourth storage cassette $\mathbf{31}_{-4}$ relative to the second connection path 419.

The reconciliation cassette 33 is a stacking cassette like the storage cassette 31, and is provided with a port 3000 formed in an upper surface thereof, and contains a table 331 therein like the storage cassette 31. The port 3000 of the reconciliation cassette 33 is connected to the first connection path 418 as described above. The reconciliation cassette 33 is configured to store the banknotes sent from the looped transport path 411 to the inside of the cassette through the port 3000 by stacking the banknotes on the table 331 in the order from bottom to top, and to feed the banknotes stacked on the table 331 one by one in the order from top to bottom to the looped transport path 411 through the port. The reconciliation cassette 33 may be used as one of the storage cassettes 31 (a fifth storage cassette) instead of using the reconciliation cassette 33 for the reconciliation process.

The rejected banknote escrow unit 51 is connected to a branch path which is branched from the second dispensing path 416 connected to the second outlet 231. The escrow unit 51 is a storage unit which temporarily stores the banknotes rejected in the dispensing process, for example. Unlike the stacking storage cassettes 31, the escrow unit 51 is a winding unit (see storage modules 31 of a money handling apparatus of a third type described later).

The collection cassette 53 is detachably attached to the second safe unit 14, and is connected to the looped transport path 411 through the second connection path 419 as described above. The collection cassette 53 is a stacking storage unit. However, unlike the storage cassettes 31 and the reconciliation cassette 33 described above, the collection cassette 53 is elongated in the front-back direction of the apparatus, and includes a note presser (not shown) which moves in the front-back direction. The collection cassette 53 is configured to arrange the banknotes in an upright state in the front-back direction, and the note presser moves according to the amount of the banknotes.

Unlike the storage cassettes 31 and the reconciliation cassette 33, the collection cassette 53 cannot feed the banknotes stored therein. The collection cassette 53 stores some of the banknotes placed in the inlet 211 in the depositing process, but not stored in the storage unit 3, i.e., overflowed banknotes. The banknotes which were unrecognizable and rejected in the dispensing process etc. may also be stored in the collection cassette 53.

Figure 5:
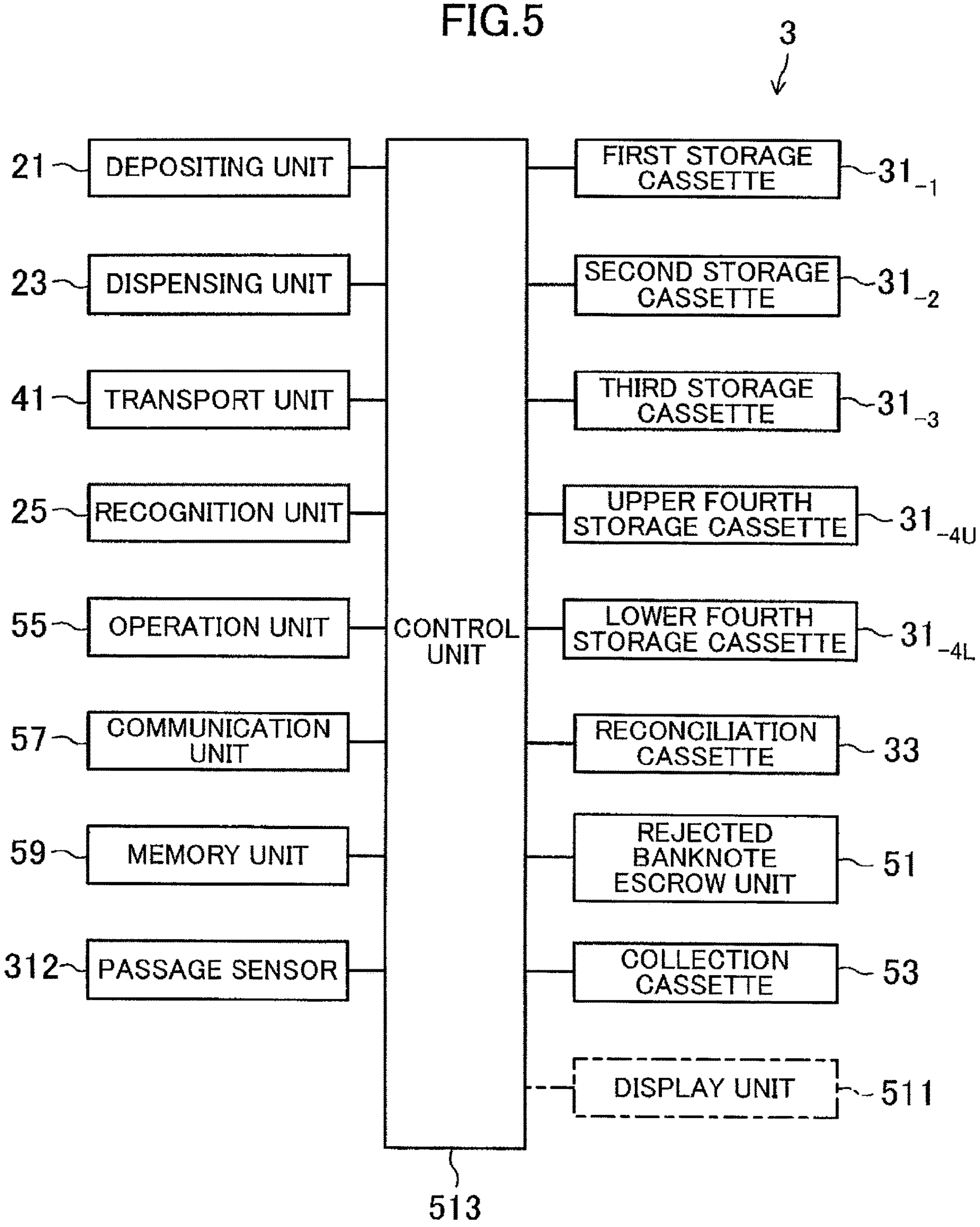
FIG. 5 shows a configuration associated with control of the money handling apparatus of the first type.

FIG. 5 shows a configuration associated with control of the depositing/dispensing machine 1A. The depositing/dispensing machine 1A includes a control unit 513 which may basically be comprised of a well-known microcomputer. The control unit 513 is connected to the depositing unit 21, the dispensing unit 23, the storage unit 3 including the first to fourth storage cassettes 31, the reconciliation cassette 33, the rejected banknote escrow unit 51, the collection cassette 53, and the transport unit 41 so that signals can be sent and received therebetween. Each of the units 21, 23, 3, 33, 41, 51, and 53 includes a sensor which detects the traveling banknotes, like passage sensors 312 provided at the ports 3000 of the storage cassettes 31, the reconciliation cassette 33 and the collection cassette 53, to detect the passage of the banknotes as shown in FIG. 2. Detection signals from the sensors are input to the control unit 513. The control unit 513 outputs control signals based on the input detection signals, and the units 21, 23, 3, 33, 41, 51, and 53 are operated in accordance with the signals.

The control unit 513 is also connected to the recognition unit 25. The recognition unit 25 sends the recognition result and the read serial number to the control unit 513. The control unit 513 is also connected to an operation unit 55 as a human interface for an operator of the depositing/dispensing machine 1A, a communication unit 57 for sending and receiving signals between the depositing/dispensing machine 1A and a higher-ranking machine etc. through LAN or a serial bus, and a memory unit 59 for storing various types of information, e.g., general-purpose storage devices such as a hard disk drive, a flash memory.

The memory unit 59 records at least an inventory amount which is the respective numbers of the banknotes of different denominations or the amount of the banknotes stored in the depositing/dispensing machine 1A. The memory unit 59 also records the inventory amount of each storage module 31. Specifically, the memory unit 59 has counters. An actual inventory amount counter configured to count the banknotes in real-time in storing and feeding the banknotes in and from the cassette is provided in each of the storage cassettes 31, the reconciliation cassette 33, and the collection cassette 53. Further, a counter which can count the banknotes is provided as an in-storage inventory amount counter configured to count the banknotes when the depositing or dispensing process is finished.

The depositing/dispensing machine 1A is configured to manage the banknotes using the serial numbers. The memory unit 59 records a serial number list in which the serial numbers of the banknotes stored in each unit are arranged in the stored order, and each of the serial numbers is associated with a consecutive number corresponding to the number of the stored banknotes. The processes performed by the depositing/dispensing machine 1A are recorded as a log in the memory unit 59.

The depositing/dispensing machine 1A may be provided with a display unit 511 made of a flat panel display for displaying various types of information as shown in FIG. 2. The display unit 511 is also connected to the control unit 513. The display unit 511 may be a touch panel display, and the display unit 511 may be integrated with the operation unit 55.

The control unit 513 controls the units 21, 23, 25, 3, 33, 41, 51, 53, 55, 57, 59, and 511 based on a command sent from a higher-ranking terminal T through the communication unit 57, and/or various commands received through the operation unit 55.

(Functions of Money Handling Apparatus of First Type)

The depositing/dispensing machine 1A can perform various counting processes such as a dispensing process. The depositing/dispensing machine 1A has other various functions, and main functions will be described below.

(LED Display Function)

LEDs of the operation unit 55 can be blinked or lit depending on a state of the depositing/dispensing machine 1A. The operation unit 55 is provided with a plurality of LEDs of different colors, such as red, blue, etc. (not shown). The LEDs are configured to blink or remain lit in various ways depending on the state of the depositing/dispensing machine 1A, e.g., when the removal of the banknotes is waited for, or an error has occurred. Various states of the depositing/dispensing machine 1A can be distinguished at a glance by combining a cycle of the blink, when to light the LEDs, and the color of light.

(Power Saving Function)

To save power consumption, current supply to a unit which does not need to be operated can be stopped depending on the state of the depositing/dispensing machine 1A. For example, when the operation of the depositing/dispensing machine 1A is stopped for a certain period, current supply to some units is automatically stopped. When predetermined operation is performed at the higher-ranking terminal T or the operation unit 55, the machine can be returned to the original state.

(Shut Down Function)

When trouble has occurred in the depositing/dispensing machine 1A, a troubled part can be shut down so that the machine can continuously be used. For example, the shut down function includes commanded shut down in which the control unit 513 shuts the troubled part down based on a command sent from the higher-ranking terminal T and/or the operation unit 55 (hereinafter may be referred to as the higher-ranking terminal T etc.), and automatic shut down in which the control unit 513 shuts the storage cassette 31 down when the storage cassette 31 is broken and detached.

In the commanded shut down, when the trouble has occurred in the depositing/dispensing machine 1A, an error code indicating where the trouble has occurred, or what the error is sent to inform an operator of details of the trouble by the error code through the higher-ranking terminal T etc. Then, the operator inputs a command to start the shut down to the depositing/dispensing machine 1A by operating the higher-ranking terminal T etc. Then, the control unit 513 electrically separates the troubled part. Then, the control unit 513 checks whether the other parts than the shut down part are normally operated or not. When it is determined that the other parts are normally operated, the depositing/dispensing machine 1A can continuously be used.

In the automatic shut down, when the storage cassette 31 is detached, the detached storage cassette 31 is automatically electrically separated so that the depositing/dispensing machine 1A can continuously be used.

When the storage cassette 31 is electrically separated, and there is another storage cassette 31 to which the same denomination is allocated as the detached storage cassette 31, the storage cassette 31 to which the same denomination is allocated is used in place of the detached storage cassette 31. When there is no storage cassettes 31 to which the same denomination is allocated as the detached storage cassette 31, the banknote which is to be stored in the detached storage cassette 31 is handled as the overflowed banknote, or the rejected banknote, and is transported to a certain destination. In the dispensing process, the banknotes stored in the detached storage cassette 31 cannot be fed out. Thus, information that the cassette is empty is displayed on the display unit, for example.

(Occupying Function)

When a plurality of higher-ranking terminals T are directly or indirectly connected to the depositing/dispensing machine 1A, one of them can exclusively control the depositing/dispensing machine 1A. When one of the higher-ranking terminals T occupies the depositing/dispensing machine 1A, the higher-ranking terminal T can control the depositing/dispensing machine 1A. When one of the higher-ranking terminals T occupies the depositing/dispensing machine 1A, the other higher-ranking terminals T cannot occupy the depositing/dispensing machine 1A. The depositing/dispensing machine 1A can be occupied by inputting a command to start the occupation by operating the higher-ranking terminal T etc.

(Direct Depositing Process)

A direct depositing process is performed to directly store the normal banknotes deposited (stored) in the depositing/dispensing machine 1A in the storage cassette 31. Each of the banknotes placed in the inlet 211 is stored in any of the storage cassettes 31 based on the results of the recognition by the recognition unit 25, and the predetermined types (denomination, fitness, etc.) of the banknotes allocated to the storage cassette 31.

Figure 6:
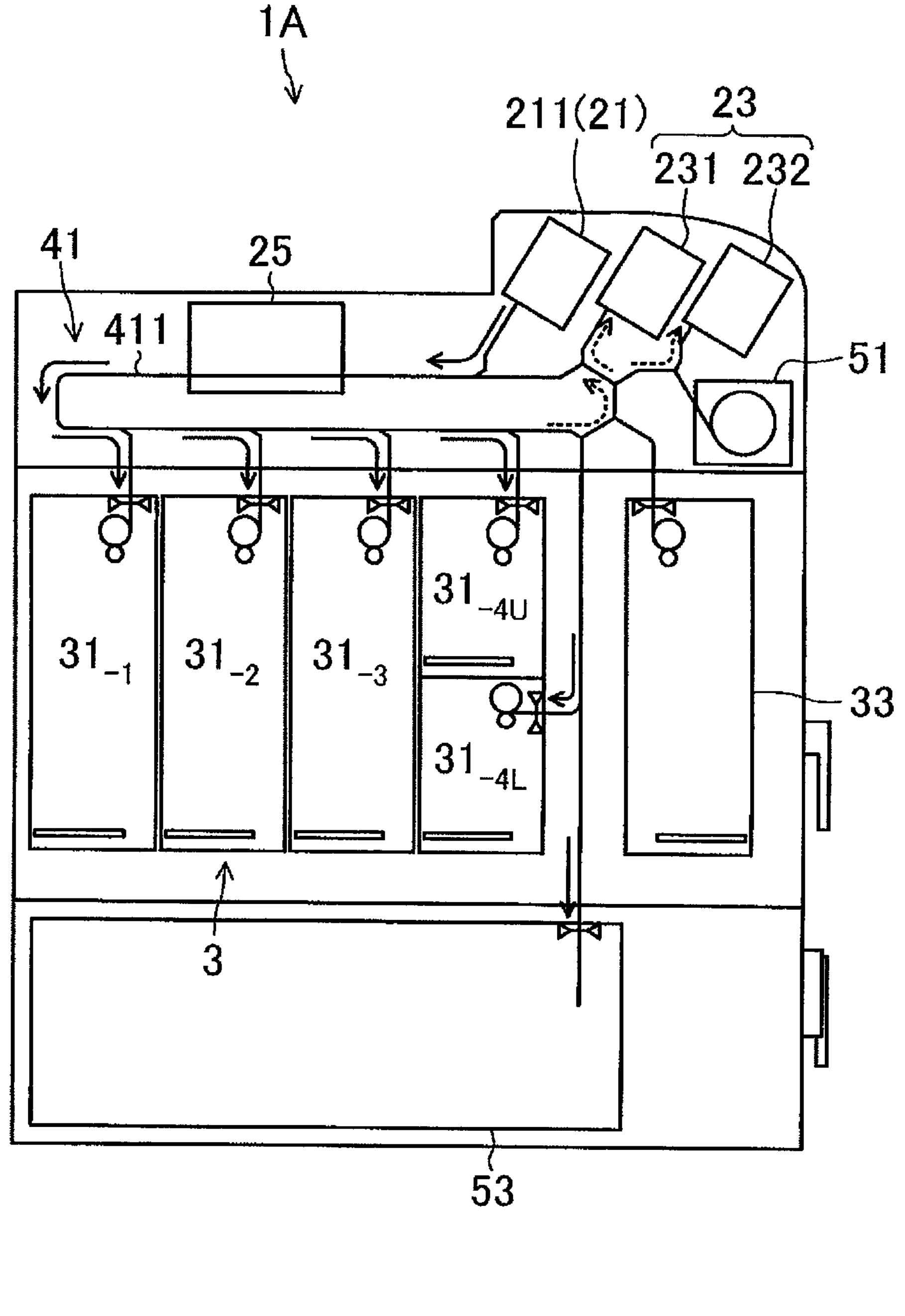
FIG. 6 shows how the money handling apparatus of the first type is operated in a direct depositing process.

FIG. 6 shows how the depositing/dispensing machine 1A is operated in the depositing process. When the banknotes are placed in the inlet 211, a command to start the depositing process is input to the depositing/dispensing machine 1A by operating the higher-ranking terminal T etc. As indicated by solid arrows in FIG. 6, the feeding mechanism of the depositing unit 21 feeds the banknotes in the inlet 211 one by one, and the transport unit 41 transports the banknotes to the recognition unit 25. The recognition unit 25 recognizes and counts the banknotes, and reads the serial numbers of the banknotes (a set of the recognition, the counting, and the reading may be referred to as the recognition in short).

The transport unit 41 transports the banknotes which are recognized as acceptable as normal banknotes, and all digits of the serial numbers of which are read to the predetermined storage cassette 31 based on the recognition results and the predetermined types of the banknotes allocated to the storage cassette as indicated by solid arrows in FIG. 6. Specifically, each of the banknotes is stored in any one of the first to fourth storage cassettes 31 based on the denomination or fitness.

The banknotes of the denomination which is not allocated to the storage cassette 31 (normal banknotes) and unfit banknotes are stored in the collection cassette 53. When the storage cassette 31 to which the banknotes are allocated is full, the normal banknotes are stored in the collection cassette 53.

The transport unit 41 dispenses the rejected banknotes (including the banknotes all digits of the serial numbers of which cannot be recognized in this example) to the second outlet 232 as indicated by dashed arrows in FIG. 6. The banknotes rejected in the depositing process are placed again in the inlet 211, and are recognized again by the recognition unit 25.

When the storage cassettes 31 and the collection cassette 53 become full in the depositing process, and the banknotes cannot be stored any more, these banknotes are dispensed to the first outlet 231 as indicated by the dashed arrows in FIG. 6. The rejected banknotes may be dispensed to the first outlet 231, and the banknotes which cannot be stored may be dispensed to the second outlet 232.

The inventory amount recorded in the memory unit 59 is updated after the depositing process is finished. Simultaneously, the serial number list in which the serial numbers of the banknotes stored in each of the storage cassettes 31 are arranged in the stored order is updated as the banknotes are stored. The order of the serial numbers in the serial number list is the order in which the banknotes passed the recognition unit 25.

(Bypassed Depositing Process)

In a bypassed depositing process, the depositing/dispensing machine 1A determines the amount of the deposited banknotes of certain denomination, but the deposited banknotes are actually managed outside the depositing/dispensing machine 1A. For example, a large number of banknotes of small denomination, such as one-dollar banknotes, are handled. Thus, when such banknotes are stored in the depositing/dispensing machine 1A, the machine will become full in an instant. Accordingly, the banknotes of the small denomination are counted in the depositing process like the banknotes of other denominations, and recognized as being deposited in the depositing/dispensing machine 1A. However, the banknotes of the small denomination are not actually stored in the depositing/dispensing machine 1A, but dispensed. The dispensed banknotes of the small denomination are separately managed outside the depositing/dispensing machine 1A. In this way, a larger number of the banknotes of the small denomination can be handled, thereby improving convenience of the machine.

Figure 7:
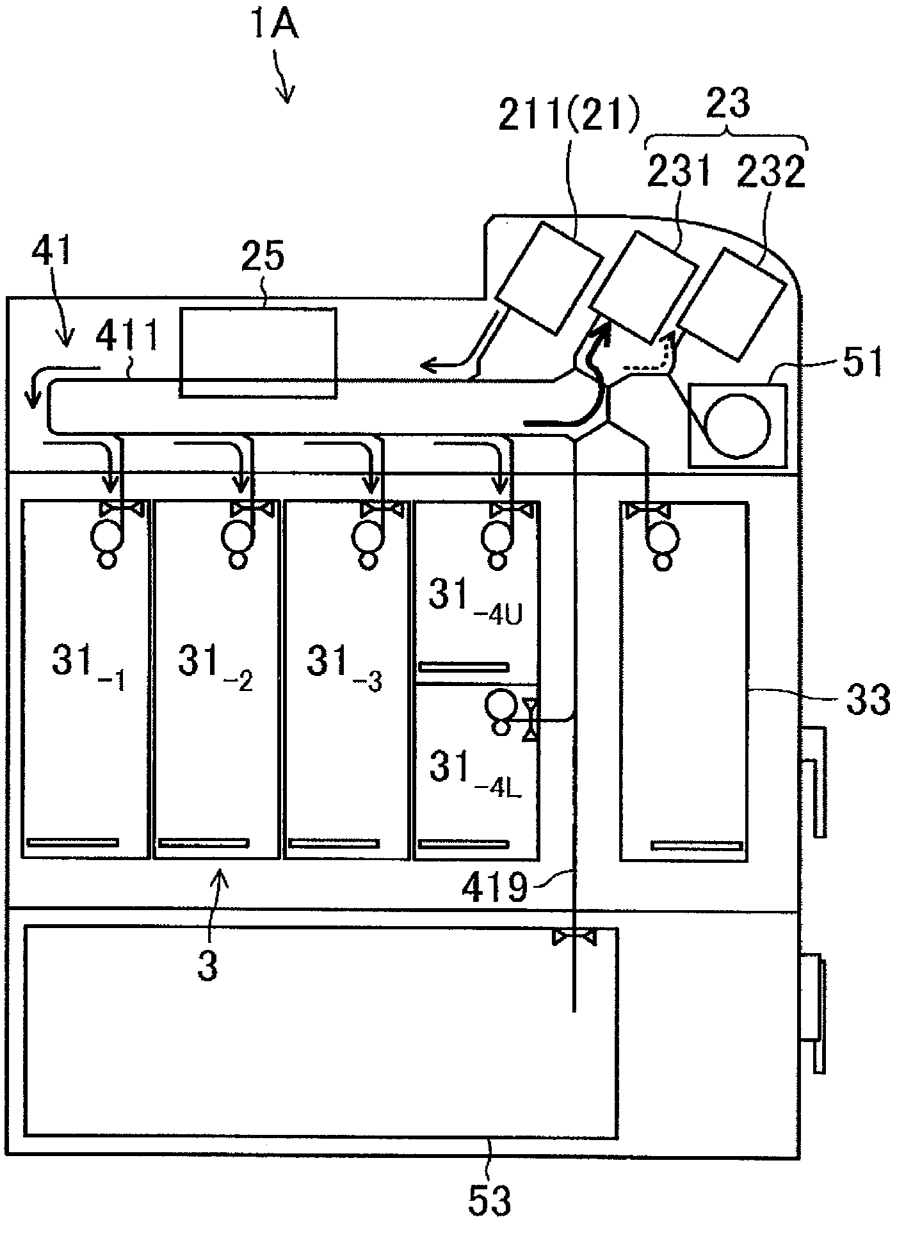
FIG. 7 shows how the money handling apparatus of the first type is operated in a bypassed depositing process.

Specifically, as shown in FIG. 7, the bypassed depositing process is started by performing predetermined operation at the higher-ranking terminal T etc. when the banknotes are placed in the inlet 211. As indicated by solid arrows in FIG. 7, the feeding mechanism of the depositing unit 21 feeds the banknotes in the inlet 211 one by one, and the transport unit 41 transports the banknotes to the recognition unit 25. As indicated by thick solid arrows in FIG. 7, the transport unit 41 dispenses the normal banknotes of the denomination to be bypassed to the first outlet 231 after the amount of the normal banknotes is determined in the same manner as the banknotes of the other denominations. The dispensed banknotes are separately managed outside the depositing/dispensing machine 1A. The normal banknotes of the other denominations are handled in the same manner as in the direct depositing process described above.

The transport unit 41 dispenses the rejected banknotes to the second outlet 232 as indicated by dashed arrows in FIG. 7. The rejected banknotes may be dispensed to the first outlet 231, and the normal banknotes of the denomination to be bypassed may be dispensed to the second outlet 232.

(Refilling Process through Inlet)

Figure 8:
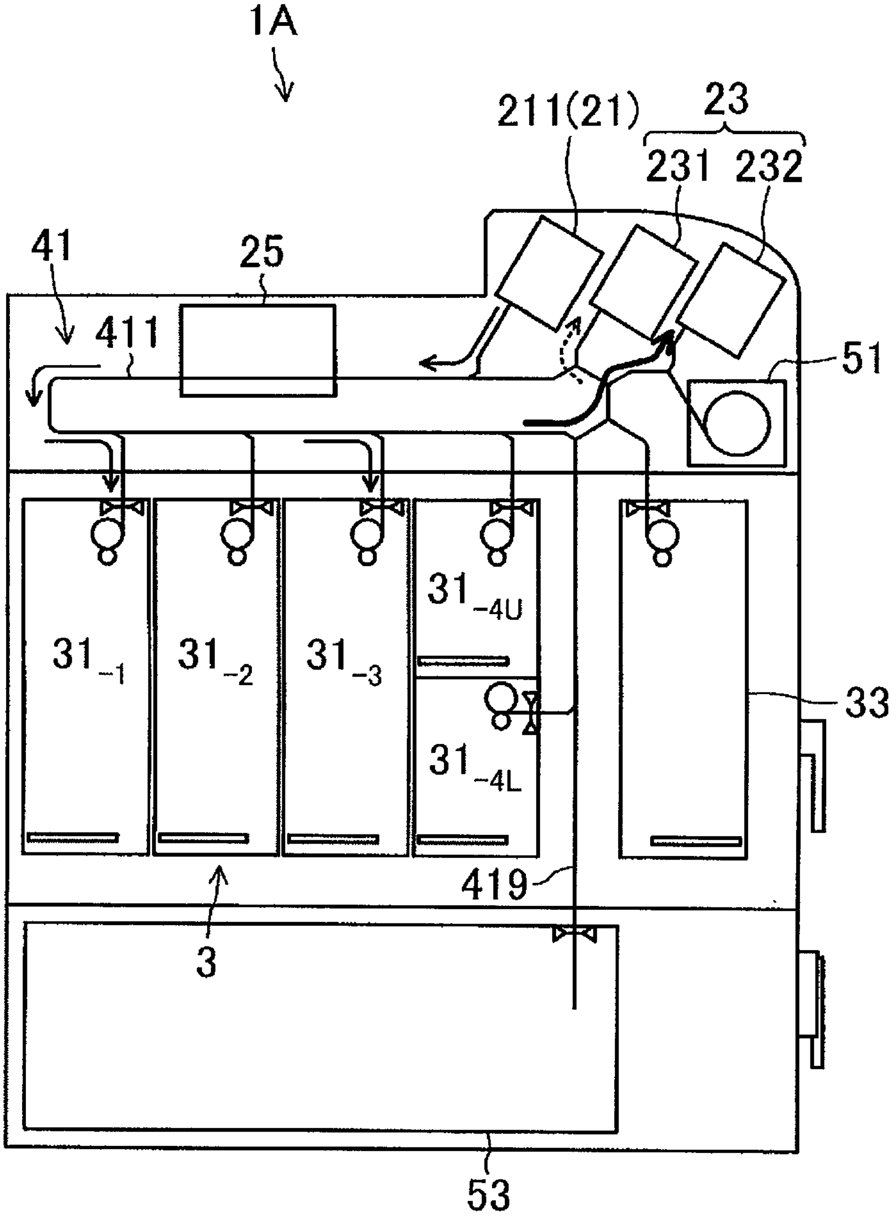
FIG. 8 shows how the money handling apparatus of the first type is operated in a refilling process through inlet.

A refilling process through the inlet is performed to refill the storage cassette 31 with the banknotes from outside. Only the fit banknotes can refill the storage cassette 31. Specifically, as shown in FIG. 8, the banknotes placed in the inlet 211 are recognized, and only the fit banknotes of the denomination to be handled by the depositing/dispensing machine 1A are stored in the corresponding storage cassette 31. The other banknotes, such as the unfit banknotes, the rejected banknotes, etc., are dispensed to the first outlet 231 or the second outlet 232.

The operation of the depositing/dispensing machine 1A in the refilling process through the inlet is fundamentally the same as that in the direct depositing process. However, the transport unit 41 transports only the banknotes which are recognized as the fit banknotes of the denomination to be handled in the depositing/dispensing machine 1A by the recognition unit 25 to the corresponding storage cassette 31 as indicated by solid arrows in FIG. 8. The transport unit 41 transports the other banknotes, such as the unfit banknotes, the rejected banknotes, or the banknotes recognized as those not to be handled in the depositing/dispensing machine 1A by the recognition unit 25, to the second outlet 232 as indicated by thick solid arrows in FIG. 8. The transport unit 41 transports the banknotes which cannot be stored in the depositing/dispensing machine 1A even after second recognition, such as the banknotes of the denomination which is not allocated to the storage cassette 31, or the banknotes whose corresponding storage cassette 31 is full, as indicated by dashed arrows in FIG. 8.

(Change Preparation Process)

A change preparation process is performed to dispense the specified number or the number less than the specified number of the fit banknotes of the denomination specified as change. For example, in depositing the proceeds of the preceding day, the fit banknotes which will be used as the change in the next day are dispensed.

Figure 9:
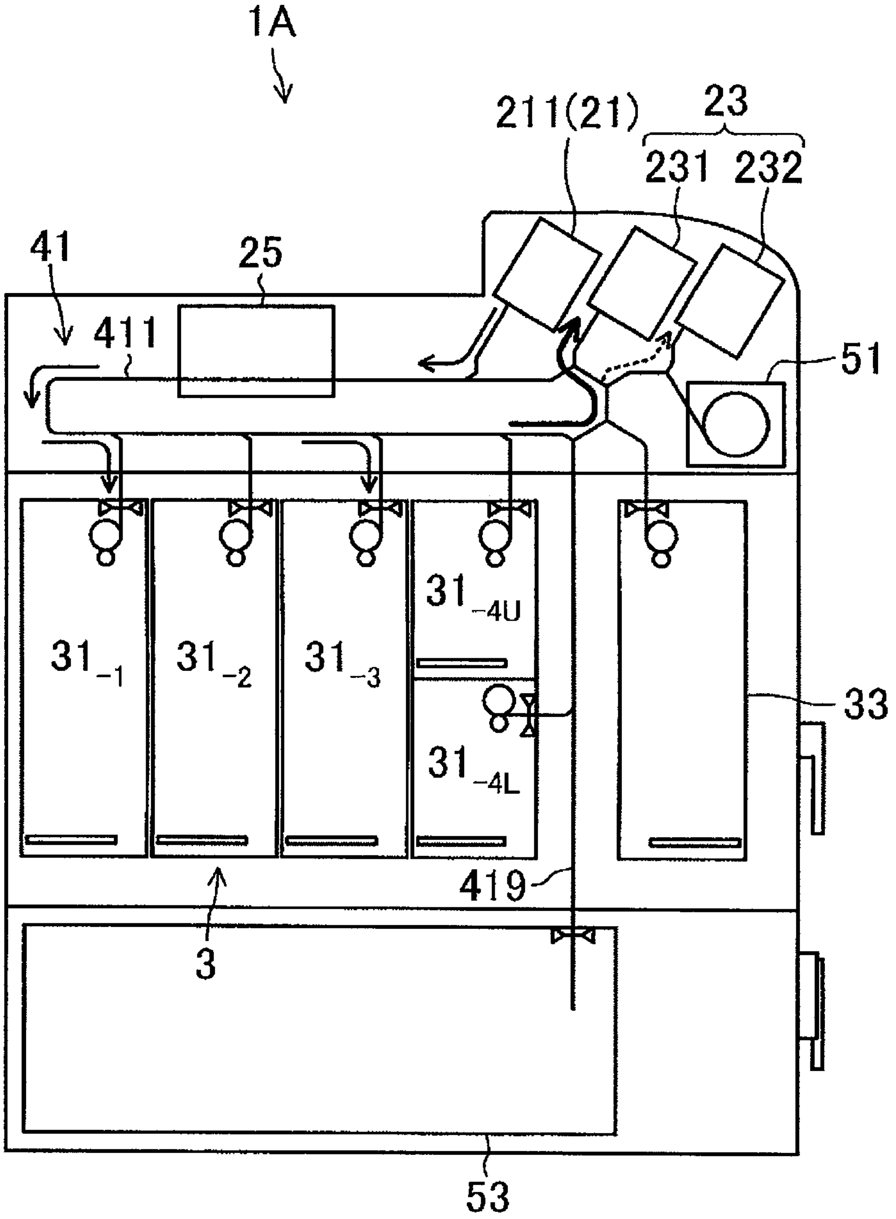
FIG. 9 shows how the money handling apparatus of the first type is operated in a change preparation process.

Specifically, the change preparation process is started by performing predetermined operation at the higher-ranking terminal T etc. when the banknotes are placed in the inlet 211. As shown in FIG. 9, when the banknotes are placed in the inlet 211, the transport unit 41 transports the banknotes one by one to the recognition unit 25. The recognition unit 25 recognizes the transported banknotes. When the banknotes are recognized as the fit banknotes of the denomination specified as the change, the depositing/dispensing machine 1A determines the amount of the specified number of the deposited banknotes, and the transport unit 41 transports the banknotes to the first outlet 231 as indicated by thick solid arrows in FIG. 9.

The banknotes recognized by the recognition unit 25 are not the fit banknotes of the denomination specified as the change, e.g., when they are the unfit banknotes of the denomination specified as the change, or the banknotes of the denomination which is not specified as the change, these banknotes are handled in the same manner as in the direct depositing process as indicated by solid arrows in FIG. 9, and are stored in the depositing/dispensing machine 1A. When the number of the banknotes of the denomination specified as the change exceeds the specified number, the excess banknotes are handled in the same manner as in the direct depositing process, and are stored in the depositing/dispensing machine 1A. The banknotes which are not to be handled in the depositing/dispensing machine 1A, and the rejected banknotes are dispensed to the second outlet 232 as indicated by dashed arrows in FIG. 9.

After the banknotes placed in the inlet 211 are all fed, the number of the fit banknotes of the denomination specified as the change may be smaller than the specified number. In such a case, a command to dispense the banknotes is sent, and the depositing/dispensing machine 1A dispenses the fit banknotes until the specified number of the banknotes is dispensed.

(Dispensing Process)

Figure 10:
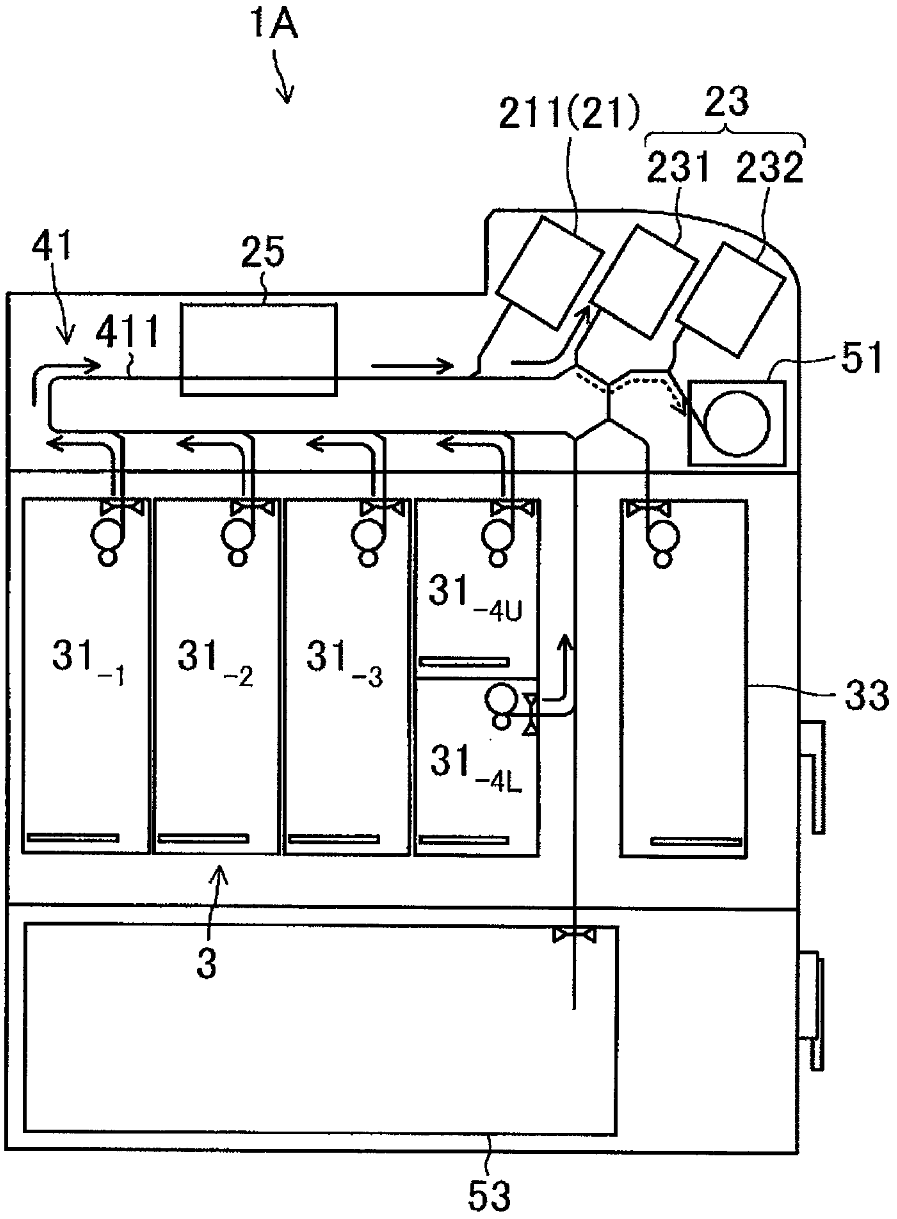
FIG. 10 shows how the money handling apparatus of the first type is operated in a dispensing process.

A dispensing process is performed to dispense the normal banknotes stored in the depositing/dispensing machine 1A. FIG. 10 shows the details of the dispensing process.

Specifically, the dispensing process is started by performing predetermined dispensing operation of specifying at least the denomination and the number of the banknotes at the higher-ranking machine T etc. The storage unit 3 feeds the specified number of the banknotes of the specified denomination from the storage cassette 31 storing the banknotes as indicated by solid arrows in FIG. 10. The transport unit 41 transports the fed banknotes to the recognition unit 25, and the recognition unit 25 recognizes the banknotes and reads the serial numbers of the banknotes. Then, the normal banknotes are dispensed to the first outlet 231.

When the banknotes are not recognizable by the recognition unit 25 and are rejected in the dispensing process, the rejected banknotes are transported to the escrow unit 51 as indicated by dashed arrows in FIG. 10, and are stored therein. The banknotes stored in the escrow unit 51 are stored in the storage cassette 31 or the collection cassette 53 after the dispensing process is finished, if necessary.

When a series of processes is finished, the lift moves to the dispensing position by a command from the higher-ranking telt sinal T etc., and the removal of the banknotes dispensed to the first outlet 231 is waited for. When the banknotes are removed, the lift returns to the standby position.

(Bypassed Dispensing Process)

In a bypassed dispensing process, when the banknotes of a certain denomination, such as one dollar banknotes, are stored outside the depositing/dispensing machine 1A, the amount of the banknotes are determined as the dispensed banknotes by the depositing/dispensing machine 1A. The bypassed dispensing process corresponds to the bypassed depositing process described above.

In the bypassed dispensing process, the amount of the fit banknotes to be dispensed in the bypassed dispensing process is determined, and then the fit banknotes are dispensed to the first outlet 231. The other banknotes are dispensed to the second outlet 232. Thus, the banknotes to be dispensed in the bypassed dispensing process can be dispensed together with the other banknotes.

Figure 11:
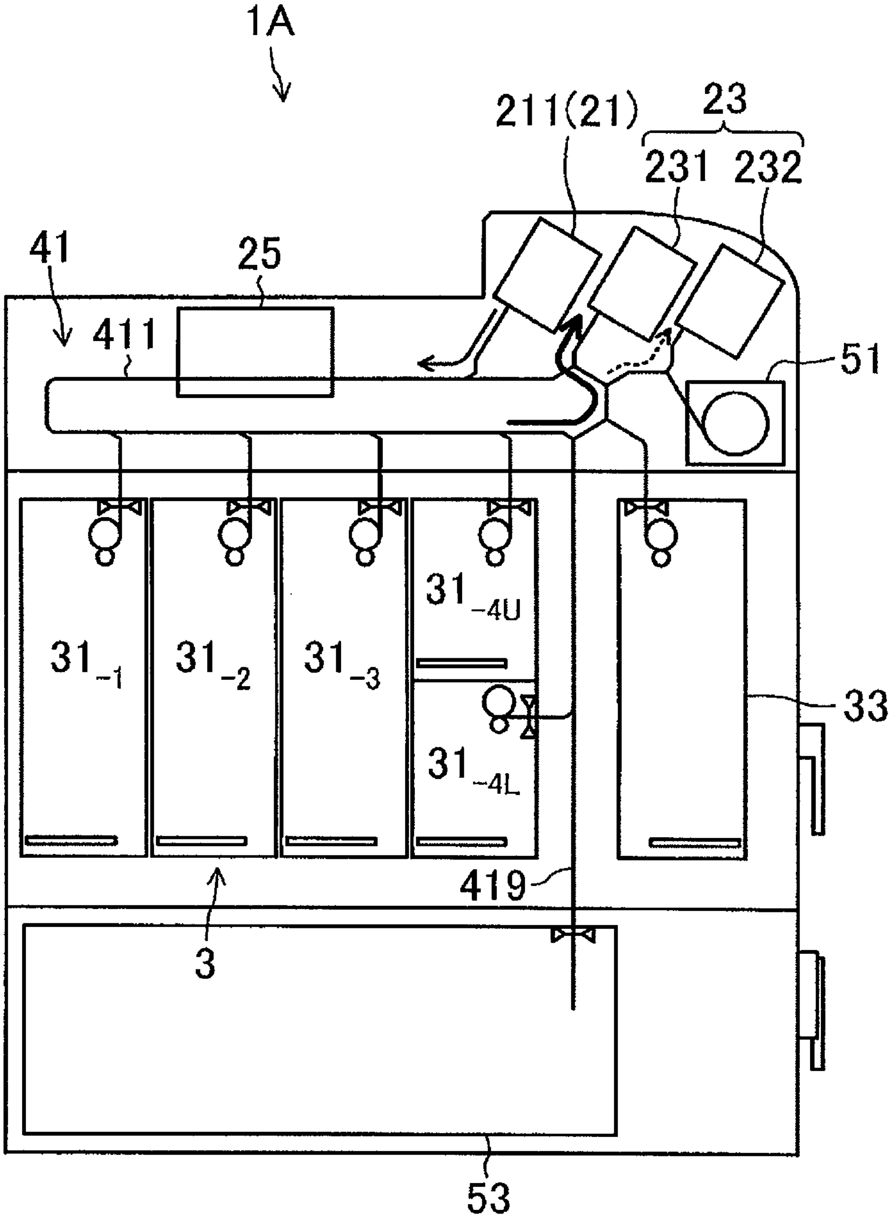
FIG. 11 shows how the money handling apparatus of the first type is operated in a bypassed dispensing process.

Specifically, as shown in FIG. 11, the banknotes including the banknotes to be dispensed in the bypassed dispensing process are placed in the inlet 211. The bypassed dispensing process is started by performing predetermined operation at the higher-ranking tei iiinal T etc., for example. At this time, the number of the banknotes to be dispensed is specified, such as 5 one-dollar banknotes, etc. As indicated by solid arrows in FIG. 11, the feeding mechanism of the depositing unit 21 feeds the banknotes in the inlet 211 one by one, and the transport unit 41 transports the banknotes to the recognition unit 25. The recognition unit 25 recognizes the banknotes.

After the amount of the dispensed fit banknotes of the denomination to be bypassed is determined in the same manner as the banknotes of the other denominations, the transport unit 41 dispenses the banknotes to the first outlet 231 as indicated by thick solid arrows in FIG. 11. When the first outlet 231 is filled with the banknotes, the banknotes are removed to perform the process again. The dispensed banknotes are separately managed outside the depositing/dispensing machine 1A.

The other banknotes, such as the unfit banknotes of the denomination to be dispensed in the bypassed dispensing process, the normal banknotes of the other denominations than the specified denomination, and the rejected banknotes, are dispensed to the second outlet 232 as indicated by dashed arrows in FIG. 11. When all the banknotes in the inlet 211 are fed, e.g., when only 4 one-dollar banknotes are dispensed to the first outlet 231, although the dispensing of 5 one-dollar banknotes is commanded, i.e., 1 banknote is lacking, the banknotes are additionally placed in the inlet 211 to perform the bypassed dispensing process again. When the specified number of the fit banknotes of the denomination to be dispensed in the bypassed dispensing process is dispensed to the first outlet 231, the bypassed dispensing process is finished.

When the bypassed dispensing process is included in the dispensing process of the other banknotes, the dispensing process as described above is performed to dispense the specified number of the banknotes of the specified denomination.

(Continuous Dispensing Process)

A continuous dispensing process is performed to continuously dispense the same amount of the banknotes using the two outlets 231 and 232. In the continuous dispensing process, when any one of the outlets 231 (232) is empty, the next dispensing process is immediately started. Thus, time required for the process can be shortened.

Specifically, the continuous dispensing process is started by performing predetermined operation of specifying the denomination and number of the banknotes to be dispensed at the higher-ranking terminal T etc. The depositing/dispensing machine 1A determines whether the first outlet 231 or the second outlet 232 is empty or not based on a command to start the continuous dispensing process sent from the higher-ranking terminal T etc. every time the process is performed, and dispenses the banknotes to the empty outlet 231 (232) in the same manner as the dispensing process described above. When the single dispensing process is finished, the lift of the outlet 231 (232) to which the banknotes are dispensed moves to the dispensing position, and the banknotes can be removed from the outlet.

When the first dispensing process is finished, and the higher-ranking terminal T etc. sends a command to continuously dispense the banknotes, the dispensing of the banknotes to the other outlet 232 (231) is started without waiting for the removal of the dispensed banknotes from the outlet 231 (232). At this time, when the banknotes are present in the other outlet 232, the dispensing process is started after the banknotes are removed.

(Rejected Banknote Releasing Process)

A rejected banknote releasing process is performed to empty each of the storage cassettes 31 by dispensing the rejected banknotes remaining in each of the storage cassettes 31 to the outside of the depositing/dispensing machine 1A. In the rejected banknote releasing process, the same process as the continuous dispensing process described above is performed, and the rejected banknotes are dispensed together with the banknotes dispensed in the continuous dispensing process. Specifically, in the continuous dispensing process, the rejected banknotes are stored in the escrow unit 51, and are stored in the storage cassette 31 or the collection cassette 53, if necessary, after the dispensing process is finished. However, in the rejected banknote releasing process, the rejected banknotes remaining in each of the storage cassettes 31 are also dispensed to the first outlet 231 or the second outlet 232. Specifically, the transport unit 41 transports the banknotes recognized by the recognition unit 25 to the selected outlet 231 (232) irrespective of the recognition results.

In the rejected banknote releasing process, a process of returning the rejected banknotes from the escrow unit 51 to the storage cassette 31 after the dispensing process is finished is no longer necessary. This can simplify the process.

(Reconciliation Process)

The reconciliation process is a process for identifying the banknotes stored in the storage cassette 31. The depositing/dispensing machine 1A can perform a full reconciliation process of feeding all the banknotes stored in the storage cassette 31, and a partial reconciliation process of feeding some of the banknotes stored in the storage cassette 31.

[Full Reconciliation Process]

The full reconciliation process is performed when it is detected that the storage cassette 31 is detached from the apparatus, and its door is once opened. When the storage cassette 31 is opened, the number or the order of the banknotes stored in the opened storage cassette 31 may be uncertain. The full reconciliation process is also performed when the storage cassette 31 is replaced. The full reconciliation process is performed when a command to perform the full reconciliation process is sent by the higher-ranking terminal T etc. The full reconciliation process may be performed on a single storage cassette 31, or may sequentially be performed on all the storage cassettes 31.

Figure 12B:
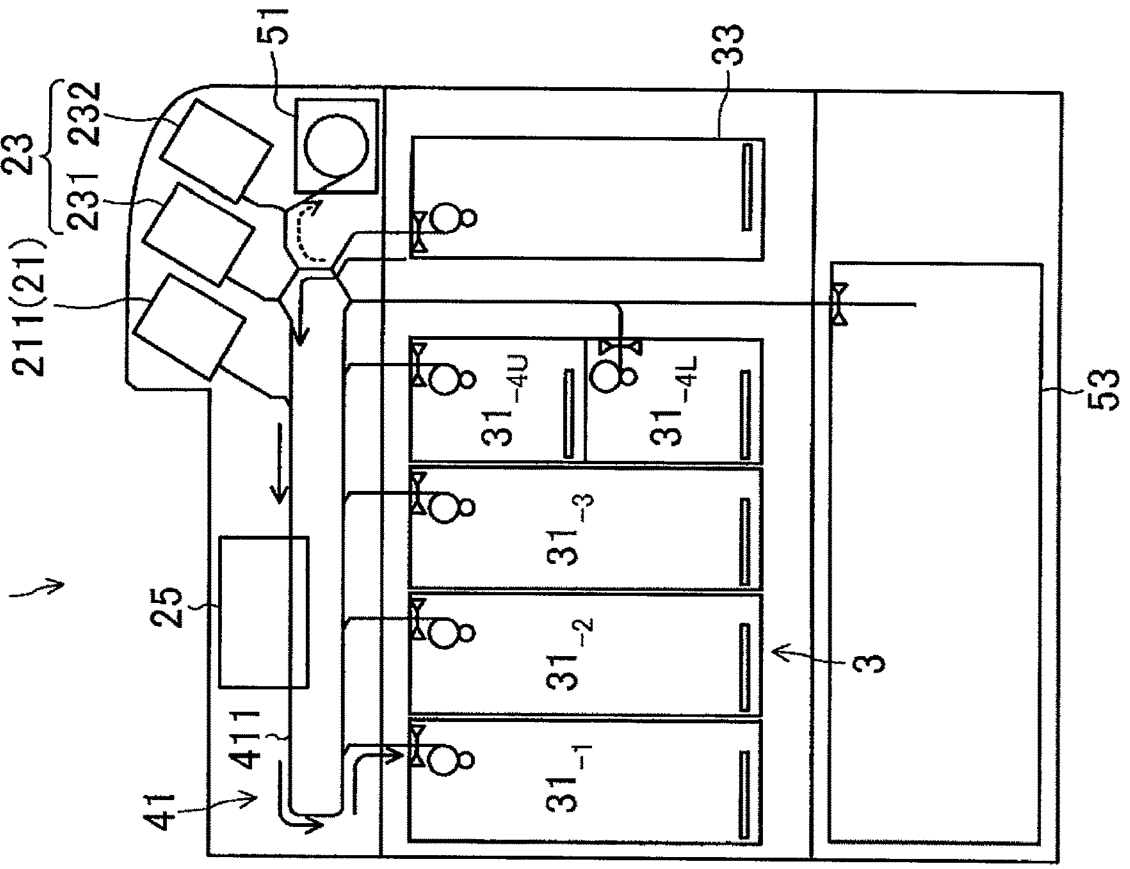
FIGS. 12A and 12B show how the money handling apparatus of the first type is operated in a full reconciliation process.
Figure 12A:
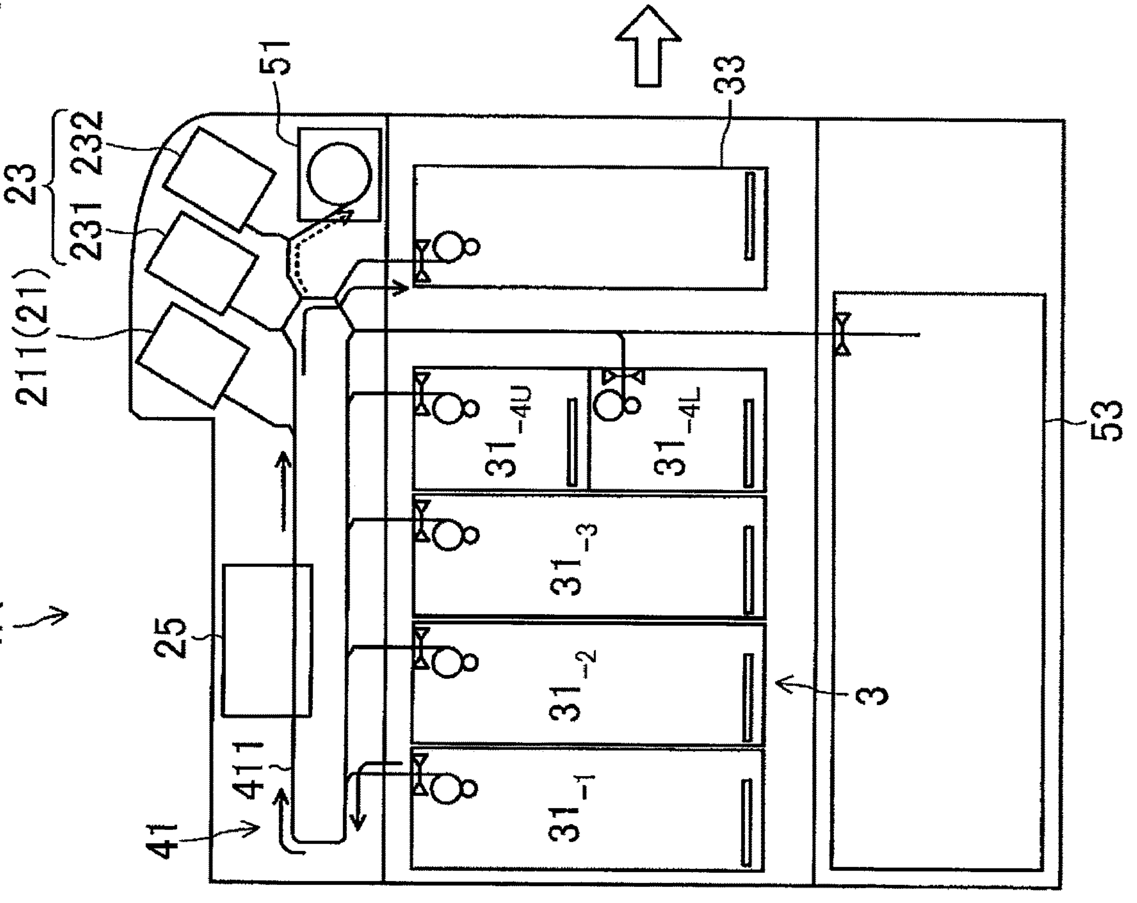

FIGS. 12A and 12B show operation of the depositing/dispensing machine 1A in the full reconciliation process. In the full reconciliation process, as shown in FIG. 12A, the banknotes are fed one by one from the target storage cassette 31 (the first storage cassette $31_{-1}$ in the example shown in FIGS. 12A and 12B). The transport unit 41 transports the fed banknotes to the recognition unit 25, and the recognition unit 25 recognizes the banknotes. The banknotes which have been recognized as the normal banknotes and all digits of the serial numbers of which have been read are transported to the reconciliation cassette 33 as indicated by solid arrows in FIG. 12A, and stored therein. The rejected banknotes are transported to the escrow unit 51 as indicated by dashed arrows in FIG. 12A, and stored therein.

After all the banknotes stored in the target storage cassette 31 are fed and recognized, the banknotes stored in the reconciliation cassette 33 are fed one by one, and transported to the recognition unit 25 through the looped transport path 411 as indicated by solid arrows in FIG. 12B. After the recognition unit 25 recognizes the banknotes again, the normal banknotes are stored in the original storage cassette 31 again, i.e., the target storage cassette 31.

Thus, the banknotes stored in the storage cassette 31 are identified, the inventory amount and the serial number list corresponding to the storage cassette 31 stored in the memory unit 59 are updated. When the banknotes are rejected when they are returning from the reconciliation cassette 33 to the storage cassette 31, the rejected banknotes are transported to the escrow unit 51 as shown in the dashed arrows in FIG. 12B, and stored therein.

A transport path through which the rejected banknotes are transported to the escrow unit 51 partially overlaps with a transport path through which the banknotes fed from the reconciliation cassette 33 pass. Thus, when the banknotes are rejected by the recognition unit 25, the feeding of the banknotes from the reconciliation cassette 33 is stopped, and the rejected banknotes are transported to the escrow unit 51. Then, the feeding of the banknotes from the reconciliation cassette 33 is restarted.

In the full reconciliation process, the banknotes can be counted when the banknotes are transported from the storage cassette 31 to the reconciliation cassette 33, and when the banknotes are transported from the reconciliation cassette 33 to the storage cassette 31 (first count and second count).

[Partial Reconciliation Process]

The partial reconciliation process is performed when irregular transport occurs while the banknotes are traveling from or to the storage cassette 31. When such irregular transport occurs, the number of the banknotes stored in the storage cassette 31 may be different from the counted number. Thus, the banknotes stored in the storage cassette 31 need to be identified. Examples of the irregular transport include the case where the transported banknotes are overlapped, or the case where the transported banknotes are jammed.

When the banknotes are overlapped or jammed, the inventory amount of the storage cassette 31 is uncertain. Thus, the partial reconciliation process needs to be performed on the storage cassette 31 to identify the inventory amount.

In the partial reconciliation process, the serial number list is used so that the banknotes stored in the storage cassette 31 can be identified by feeding only some of the banknotes stored in the storage cassette 31. As compared with the full reconciliation process, a load of the reconciliation process can be reduced, and time required for the process can significantly be reduced.

In the stacking storage cassette 31, the order of the banknotes may change in storing the banknotes. In such a case, the banknotes stored in the storage cassette 31 cannot precisely be identified even when only a single banknote is fed from the storage cassette 31, and the serial number thereof is identified. In the depositing/dispensing machine 1A, the serial numbers of two or more banknotes are checked against the serial number list so that the banknotes can be identified even when the order of the banknotes has changed. In the partial reconciliation process, at least two banknotes are fed. The depositing/dispensing machine 1A feeds 5 banknotes. All or some digits of the serial numbers are read.

The banknotes fed from the storage cassette 31 are transported by the transport unit 41 to the recognition unit 25 in the same manner as the full reconciliation process, and the recognition unit 25 recognizes the banknotes in real-time. When the banknotes have been recognized as the normal banknotes, and their serial numbers have been read, the banknotes are transported to the reconciliation cassette 33, and stored therein (see FIG. 12A). The rejected banknotes are transported to the escrow unit 51. When 5 successive banknotes whose serial numbers have been read are fed from the storage cassette 31, the feeding of the banknotes is stopped.

When the serial number of a certain banknote has not been read by the recognition unit 25, an additional banknote is fed from the storage cassette 31. For example, when the serial number of the third fed banknote is not read, 3 banknotes are additionally fed, and the partial reconciliation is performed on 5 successive banknotes including the fourth to fifth fed banknotes and the additional 3 banknotes. When the banknote is rejected, at least 5 banknotes are additionally fed.

When the target group of the 5 banknotes which will be checked against the serial number list is determined, the target group is checked against the serial number list, and a group of the serial numbers in the serial number list corresponding to the target group (a reference group) is determined. The target group corresponds to the banknotes fed from the storage cassette 31. Accordingly, the reference group indicates a boundary between the banknotes fed from the storage cassette 31 and the banknotes remaining in the storage cassette 31 in the serial number list. Therefore, when the reference group is identified in the serial number list, the banknotes remaining in the storage cassette 31 can be identified based on the serial number list.

Figure 13:
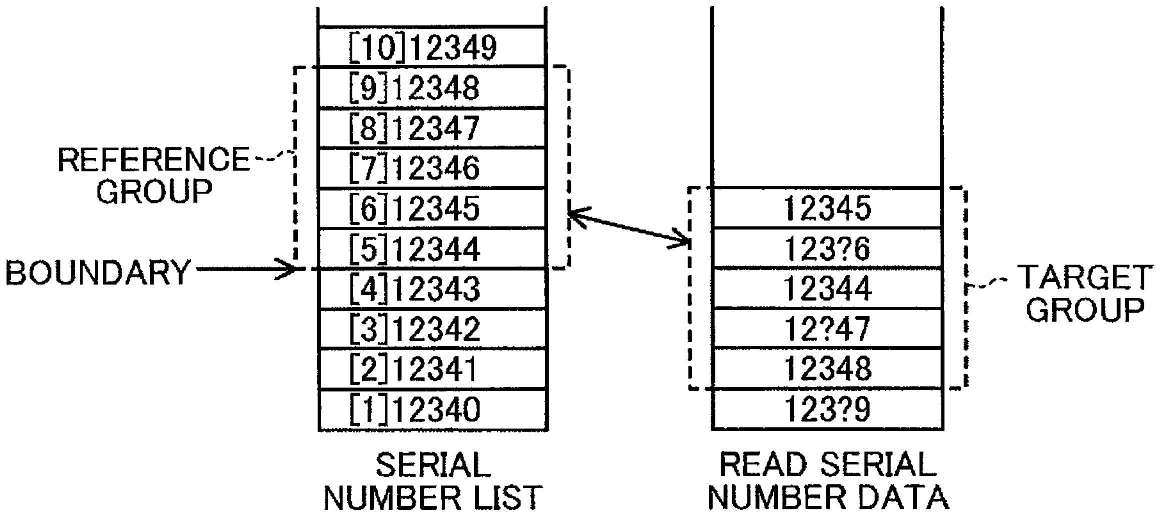
FIG. 13 shows how the money handling apparatus of the first type is operated in a partial reconciliation process.

Referring to FIG. 13, how to check the target group against the serial number list will be described below. For example, a target group including 5 successive banknotes including the banknote last fed from the storage cassette 31 is checked against the serial number list.

In the serial number list shown in FIG. 13, "12340" etc. are the serial numbers. The number indicated in an upper column is higher in the stored order. The numbers in the brackets are consecutive numbers of the banknotes in the storage cassette 31, and correspond to the number of the banknotes stored in the storage cassette 31. Read serial number data is data of the serial number read by the recognition unit 25, and data in the upper column corresponds to the banknote fed later. That is, the data can be considered as the serial numbers of the banknotes arranged in the stored order.

Each of the serial numbers in the target group is checked against the serial numbers in the serial number list from the higher order serial number, i.e., from the serial number of the banknote stacked in an upper level in the storage cassette 31. In this step, the serial number which is in the highest order in the serial number list is identified. The serial number in the highest order is "12348" in the example shown in the drawing.

The fourth highest serial number relative to the highest order serial number in the serial number list (hereinafter this serial number is referred to as the lowest order serial number) is identified. The serial number "12344" is the lowest order serial number in the example shown in the drawing. Then, it is determined whether the serial number which shares all digits with the lowest order serial number is contained in the target group or not. Also in this step, the order of the serial number in the target group does not matter. Then, three serial numbers between the highest order serial number and the lowest order serial number in the serial number list are checked against the serial numbers in the target group, irrespective of the order of the serial numbers. In this checking, it is determined whether the serial numbers share only some of the digits or not. For example, three of the digits of the serial number are masked in the checking. Specifically, even when the serial numbers do not share three digits, it is determined that the serial numbers match each other when the serial numbers share the other digits.

Thus, as shown in FIG. 13, a reference group in which all the serial numbers in the serial number list which match the serial numbers in the target group are contained in any order is identified. Then, information of the serial numbers contained in the reference group, and the serial numbers in the order higher than the reference group is deleted from the serial number list. By updating the serial number list in this way, the banknotes remaining in the storage cassette 31 are identified.

Then, as shown in FIG. 12B, the banknotes contained in the reconciliation cassette 33 are fed one by one, and transported to the recognition unit 25. The recognition unit 25 recognizes the banknotes, and the normal banknotes whose serial numbers have been read are stored in the original storage cassette 31. The rejected banknotes are transported to the escrow unit 51.

In the partial reconciliation process, the banknotes can be counted when the banknotes are transported from the storage cassette 31 to the reconciliation cassette 33, and when the banknotes are transported from the reconciliation cassette 33 to the storage cassette 31 (first count and second count). Then, the inventory amount recorded in the memory unit 59 is updated, and the serial number list corresponding to the target storage cassette 31 is updated. Then, the reconciliation process is finished.

(Counting Process)

In a counting process, the banknotes placed in the inlet 211 are recognized and counted, and the normal banknotes of the denomination specified in the depositing/dispensing machine 1A are dispensed to the first outlet 231, and the other banknotes are dispensed to the second outlet 232.

Figure 14:
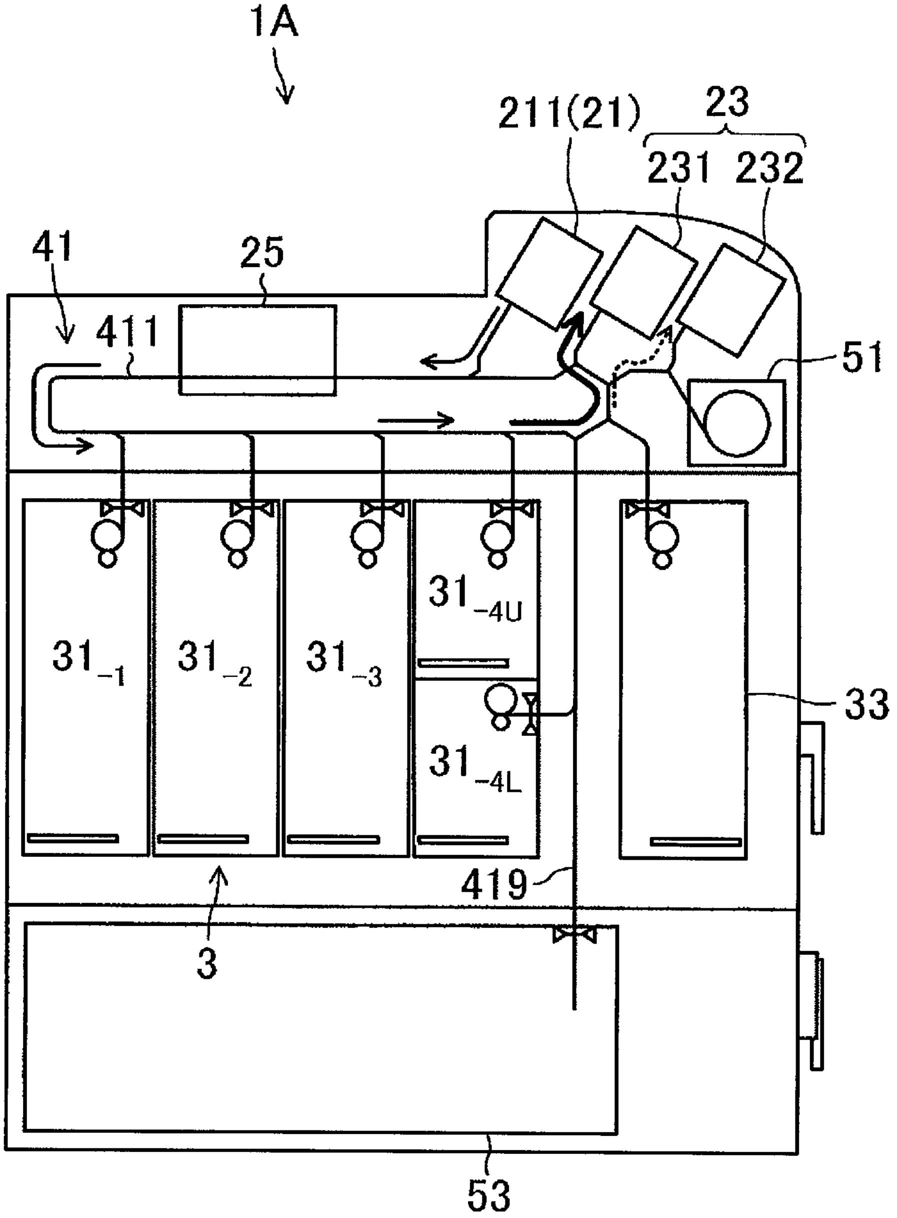
FIG. 14 shows how the money handling apparatus of the first type is operated in a counting process.

Specifically, as shown in FIG. 14, the counting process is started by performing predetermined operation at the higher-ranking terminal T etc., and the inlet 211 waits for the banknotes to be placed therein. When it is detected that the banknotes are placed in the inlet 211, the higher-ranking terminal T etc. commands the control unit 513 to start the counting process, and the banknotes are fed from the inlet 211 as indicated by solid arrows in FIG. 14. The banknotes fed from the inlet 211 are transported by the transport unit 41 to the recognition unit 25, and the recognition unit 25 recognizes the banknotes. As a result of the recognition, the normal banknotes are dispensed to the first outlet 231 as indicated by thick solid arrows in FIG. 14.

The other banknotes, such as the banknotes of the denomination not to be handled by the depositing/dispensing machine 1A, and the rejected banknotes, are dispensed to the second outlet 232 as indicated by dashed arrows in FIG. 14. The result of the count of the normal banknotes is displayed on the display unit 511 etc. The normal banknotes may be dispensed to the second outlet 232, and the other banknotes may be dispensed the first outlet 231.

(Sorting Counting Process)

In a sorting counting process, the banknotes placed in the inlet 211 are recognized and counted, and then the normal banknotes of a certain denomination among the denominations specified in the depositing/dispensing machine 1A are dispensed to the first outlet 231, and the other banknotes are dispensed to the second outlet 232.

The sorting counting process is performed in two patterns. In one of the two patterns, among the banknotes of the denominations specified by the higher-ranking terminal T etc., the denomination of the banknote which is recognized first as the normal banknote by the recognition unit 25 is regarded as the target denomination, and the number of the normal banknotes of the target denomination specified by the higher-ranking terminal T etc. is dispensed to the first outlet 231 (Pattern 1). In the other pattern, the denomination specified by the higher-ranking terminal T etc. is regarded as the target denomination, and the number of the normal banknotes of the target denomination specified by the higher-ranking terminal T etc. is dispensed to the first outlet 231 (Pattern 2).

Specifically, the sorting counting process is started by performing predetermined operation at the higher-ranking terminal T etc., and the inlet 211 waits for the banknotes to be placed therein. When it is detected that the banknotes are placed in the inlet 211, the sorting counting process is started based on a command from the higher-ranking terminal T etc. The details of the process are the same as the counting process described above. As indicated by thick solid arrows in FIG. 14, the specified number of the normal banknotes of the denomination which is first recognized as the normal banknote by the recognition unit 25 are dispensed to the first outlet 231 in Pattern 1, and the specified number of the normal banknotes of the denomination specified by the higher-ranking terminal T etc. are dispensed to the first outlet 231 in Pattern 2. The other banknotes are dispensed to the second outlet 232 as indicated by dashed arrows in FIG. 14. The sorting counting process is finished when the specified number of the banknotes is dispensed to the first outlet 231.

(Refilling Process through Reconciliation Cassette)

In a refilling process through the reconciliation process, the banknotes stored in the reconciliation cassette 33 are recognized. Then, only the fit banknotes of the denominations specified in the depositing/dispensing machine 1A are stored in the storage cassette 31, and the other banknotes are dispensed to the second outlet 232. In the refilling process through the reconciliation cassette, the banknotes for refilling the storage cassette 31 are stored together in the reconciliation cassette 33 so that the banknotes can refill the corresponding storage cassette 31 at one time.

Specifically, the refilling process through the reconciliation cassette is started by performing predetermined operation at the higher-ranking terminal T etc., and a command to refill the banknotes through the reconciliation cassette is waited for. The operator opens the first door 133, places the refilling banknotes in the reconciliation cassette 33, and closes the first door 133. Then, the refilling process is started based on a command to perform the refilling through the reconciliation cassette from the higher-ranking terminal T etc.

Figure 15:
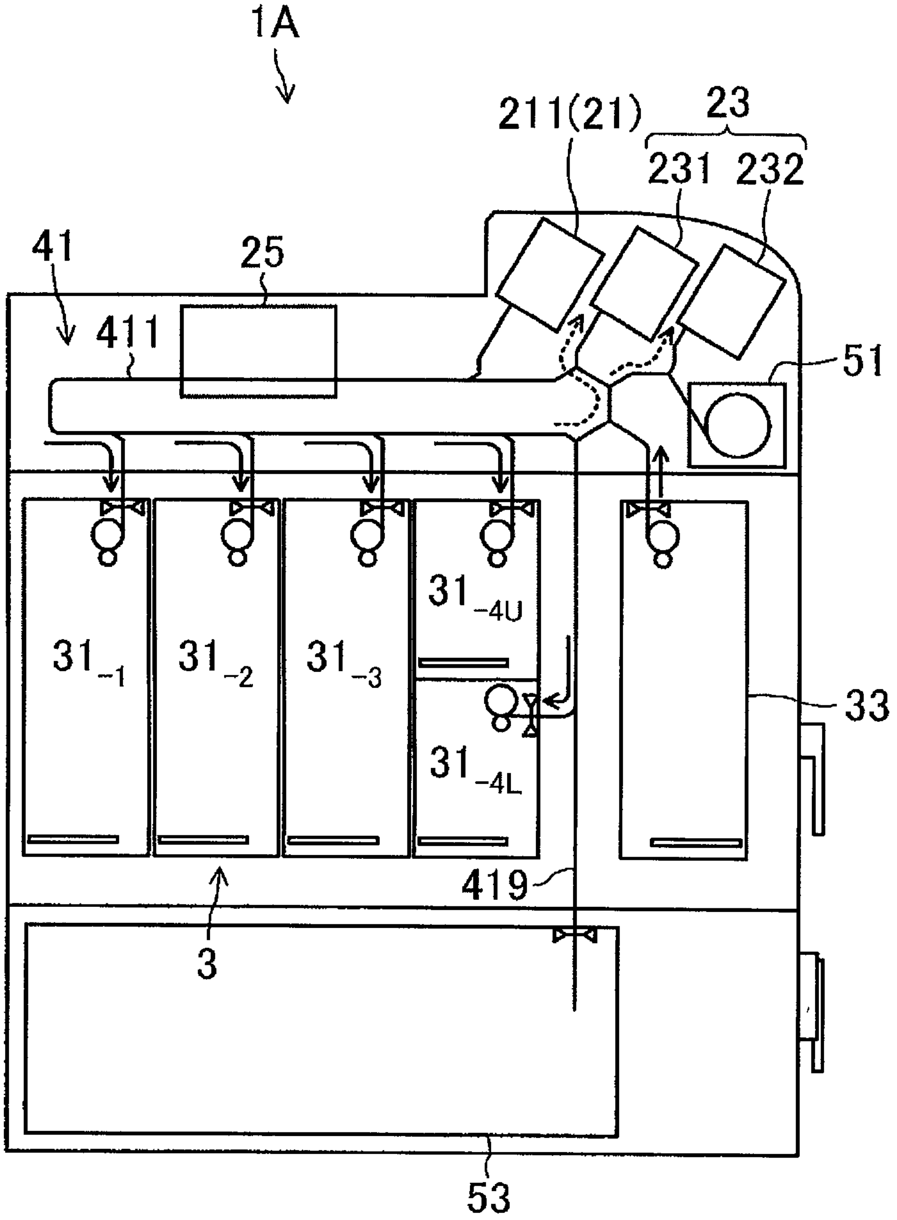
FIG. 15 shows how the money handling apparatus of the first type is operated in a refilling process through reconciliation cassette.

FIG. 15 shows how the depositing/dispensing machine 1A is operated in the refilling process through the reconciliation cassette. As shown in FIG. 15, the transport unit 41 feeds the banknotes from the reconciliation cassette 33, and transports the banknotes to the recognition unit 25 as indicated by solid arrows in FIG. 15. The transport unit 41 stores the fit banknotes in the predetermined storage cassette 31 based on the recognition result or the predetermined types (denomination, fitness, etc.) of the banknotes allocated to the storage cassette 31 as indicated by solid arrows in FIG. 15. The banknotes except for the banknotes of the specified denomination, such as the unfit banknotes and the rejected banknotes, are dispensed to the first outlet 231 or the second outlet 232 as indicated by dashed arrows in FIG. 15. For example, the unfit banknotes are dispensed to the second outlet 232, and the rejected banknotes and the other banknotes are selectively dispensed to the first outlet 231.

A transport path through which the banknotes are transported to the first outlet 231 etc. partially overlaps with a transport path through which the banknotes fed from the reconciliation cassette 33 pass. Thus, when the banknotes are rejected by the recognition unit 25, the feeding of the banknotes from the reconciliation cassette 33 is stopped, and the rejected banknotes are transported to the first outlet 231 etc. Then, the feeding of the banknotes from the reconciliation cassette 33 is restarted.

(Collection Process)

Figure 16:
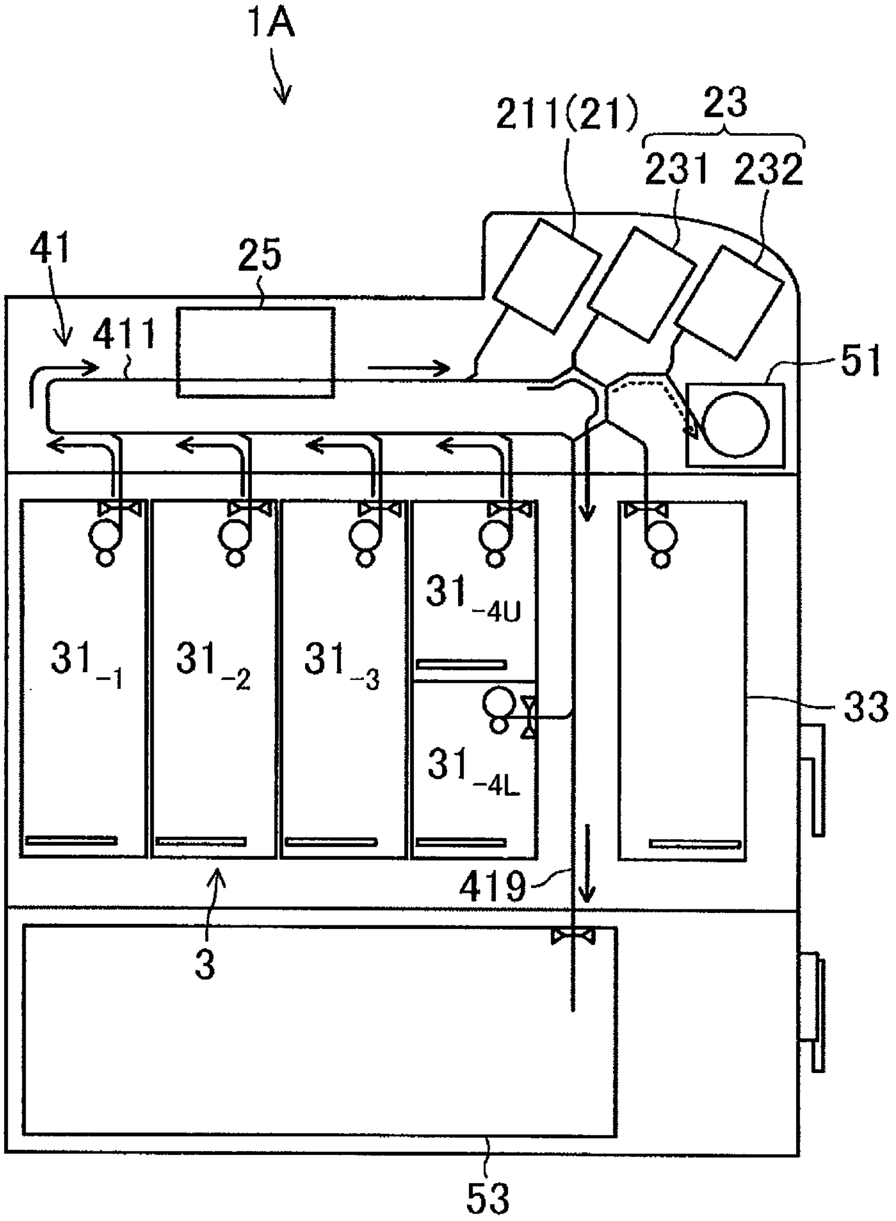
FIG. 16 shows how the money handling apparatus of the first type is operated in a collection process.

The collection process is a process for transporting the banknotes stored in the storage cassette 31 to the collection cassette 53. Specifically, the collection process is started by performing predetermined operation at the higher-ranking machine T etc. When the first to third storage cassettes $\mathbf{31}_{-1}$, $\mathbf{31}_{-2}$, $\mathbf{31}_{-3}$ or the upper fourth storage cassette $\mathbf{31}_{-4U}$ stores the banknotes of the specified denomination, the storage unit 3 sequentially feeds the banknotes of the specified denomination from the storage cassette 31 storing the banknotes as indicated by solid arrows in FIG. 16. The transport unit 41 transports the fed banknotes to the recognition unit 25. After the recognition unit 25 has recognized the banknotes, the normal banknotes are transported from the looped transport path 411 to the collection cassette 53 through the second connection path 419, and stored therein. The rejected banknotes are stored in the escrow unit 51 as indicated by dashed arrows in FIG. 16.

Figure 17B:
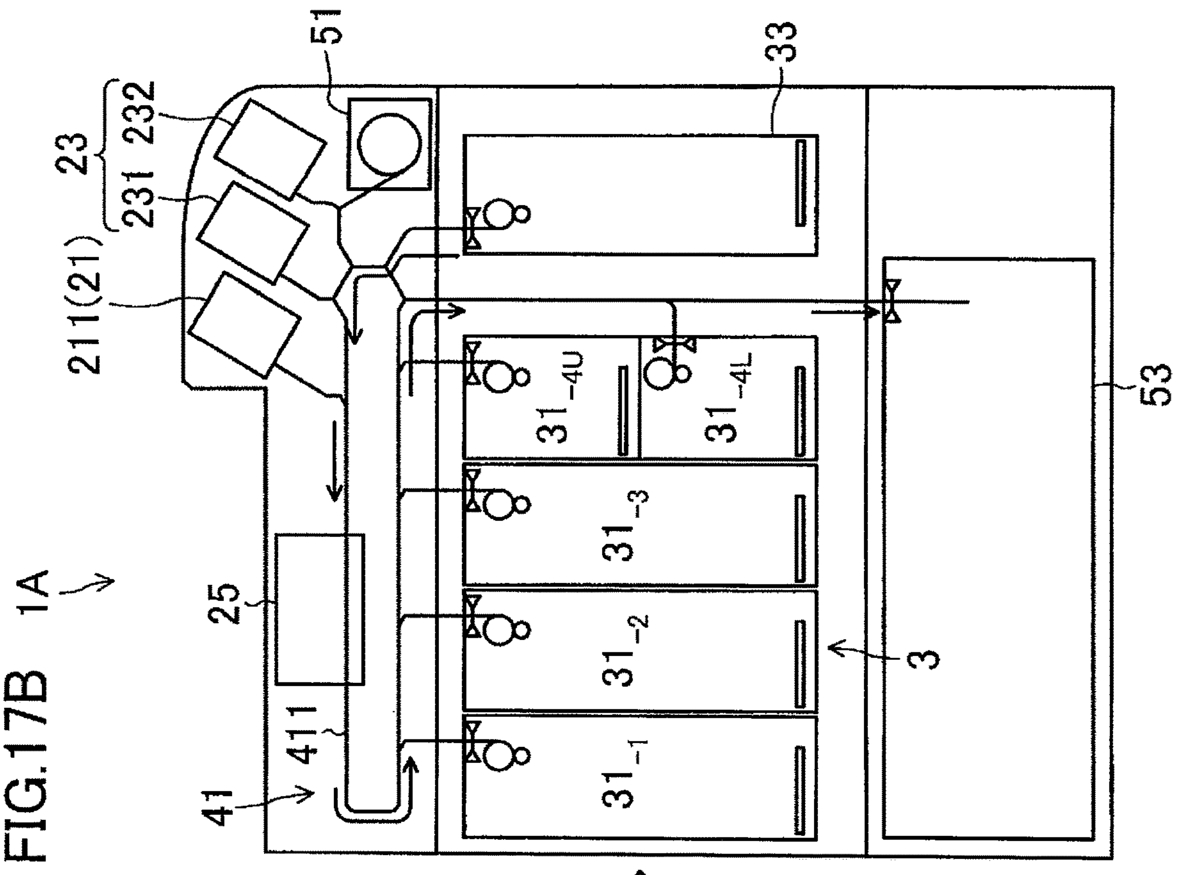
FIGS. 17A and 17B show how the money handling apparatus of the first type is operated in the collection process.
Figure 17A:
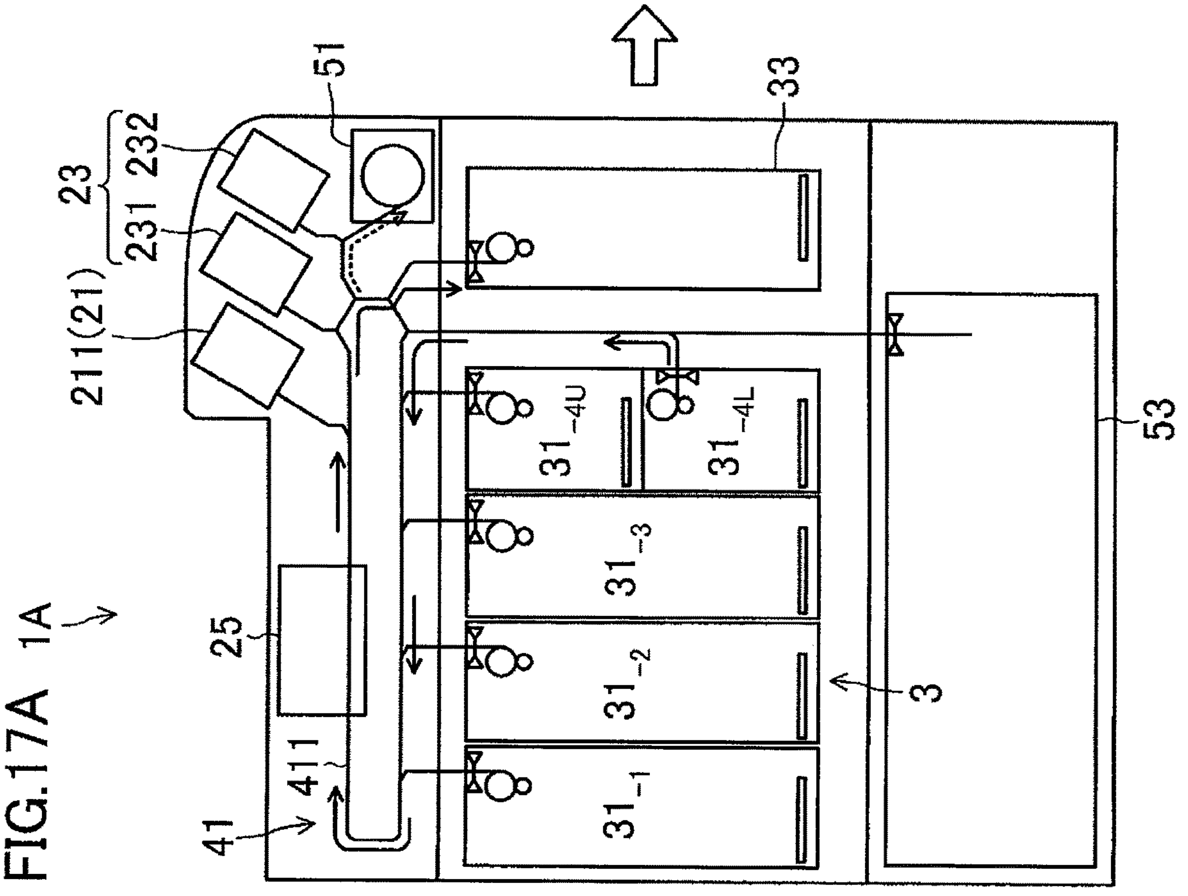

When the banknotes of the specified denomination are stored in the lower fourth storage cassette $\mathbf{31}_{-4L}$, the transport unit 41 transports the banknotes fed from the lower fourth storage cassette $\mathbf{31}_{-4L}$ to the recognition unit 25 through the second connection path 419 and the looped transport path 411 as shown in FIG. 17A. After the recognition unit 25 has recognized the banknotes, the normal banknotes are transported to the reconciliation cassette 33. The rejected banknotes are stored in the escrow unit 51 as indicated by dashed arrows in FIG. 17A.

After all the banknotes fed from the lower fourth storage cassette $\mathbf{31}_{-4L}$ are stored in the reconciliation cassette 33, the reconciliation cassette 33 feeds the banknotes one by one as indicated by solid arrows in FIG. 17B. The transport unit 41 transports the fed banknotes to the collection cassette 53 through the looped transport path 411 and the second connection path 419. Thus, the banknotes in the lower fourth storage cassette $\mathbf{31}_{-4L}$ are stored in the collection cassette 53.

(Rejected Banknote Transporting Process)

In a rejected banknote transporting process, the banknotes stored in the escrow unit 51 are recognized, and then transported to the storage cassette 31 or the collection cassette 53. The rejected banknote transport process is performed based on a command from the higher-ranking terminal T etc., or determination by the depositing/dispensing machine 1A. The rejected banknote transport process is performed in 3 patterns. In a first pattern, the rejected banknote transport process is performed after the dispensing process or the continuous dispensing process. In a second pattern, the rejected banknote transport process is performed in the dispensing process, or in the continuous dispensing process. In a third pattern, the rejected banknote transport process is performed in the full reconciliation process.

In the first pattern, when the banknote is rejected in the dispensing process or in the continuous dispensing process, the rejected banknote is temporarily stored in the escrow unit 51, and the depositing/dispensing machine 1A is in a standby state. In this case, based on a command from the higher-ranking terminal T etc., the banknotes stored in the escrow unit 51 are fed and recognized, and the normal banknotes of the denomination allocated to the storage cassette 31 are stored in the corresponding storage cassette 31. The other banknotes, such as the rejected banknotes, the banknotes of the denominations which are not allocated to the storage cassette 31, are transported to the collection cassette 53, and stored therein.

In the second pattern, when the escrow unit 51 becomes full in the dispensing process or in the continuous dispensing process, the rejected banknotes are no longer stored in the escrow unit 51. In such a case, based on determination by the depositing/dispensing machine 1A, specifically, the control unit 513, the number of the banknotes stored in the storage cassette 31 from which the banknotes are fed is determined, and the dispensing process etc. is stopped. Then, like in the first pattern, the banknotes are fed from the escrow unit 51. The normal banknotes are stored in the corresponding storage cassette 31, and the other banknotes are stored in the collection cassette 53.

In the third pattern, when the banknote is rejected in the full reconciliation process, the rejected banknote is temporarily stored in the escrow unit 51 after the full reconciliation process is finished. In this case, like in the first pattern, the banknotes stored in the escrow unit 51 are fed, and stored in the storage cassette 31 or the collection cassette 53.

(Restoring Counting Process)

In a restoring counting process, the banknotes fed outside the depositing/dispensing machine 1A are restored in the collection cassette 53 by performing a recovery process when an error has occurred in the rejected banknote transporting process. Specifically, after the recognition of the banknotes placed in the inlet 211, the normal banknotes of the denominations allocated to the storage cassettes 31 are transported to the collection cassette 53. The other banknotes, such as the rejected banknotes, the normal banknotes of the denominations which are not allocated to the storage cassettes 31, and the banknotes transported after the collection cassette 53 has become full, are selectively dispensed to the first outlet 231 or the second outlet 232.

In the restoring counting process, the counter is not updated even after the banknotes are transported to the collection cassette 53. Thus, the normal banknotes of the denominations which are allocated to the storage cassettes 31 are dispensed to the first outlet 231 etc., if they are not added to the collection cassette 53.

(Reset Function)

A reset function is a function of recovering the depositing/dispensing machine 1A based on a command from the higher-ranking terminal T etc., or determination by the depositing/dispensing machine 1A. Processes associated with the reset function are, for example, removal of the banknotes on the transport path, validation and recovery of the machine, returning of the banknotes in the escrow unit 51, etc.

Specifically, when the banknote remains on the transport path, such as the looped transport path 411 etc., the transport unit 41 dispenses the remaining banknote at low speed to the first outlet 232 etc. Then, the depositing/dispensing machine 1A performs validation of each unit. If some units are misaligned from their home positions, they are returned to the home positions. The recognition unit 25 is reset. Finally, when the banknote is contained in the escrow unit 51, the banknote is dispensed to the first outlet 231 etc.

When the sensor provided in each of the units, such as the passage sensors 312, has detected an error, the depositing/dispensing machine 1A transmits to the higher-ranking terminal T etc. an error code, or information about a location of a cause of the error, if the cause (e.g., a jammed banknote) needs to be removed. Thus, a message inducing the recovery process is displayed on the display unit 511 etc., based on the error code etc. The operator can recover the depositing/dispensing machine 1A in accordance with the message.

(Counter and Serial Number Management Function)

A counter and serial number management function is a function of managing the actual number of the banknotes in each storage unit of the depositing/dispensing machine 1A. This function is used in the partial reconciliation process etc. described above. FIG. 18A shows a table of counters set in the memory unit 59 of the depositing/dispensing machine 1A. An actual inventory amount counter configured to count the banknotes in real-time in storing and feeding the banknotes in and from each cassette 31, 33, and 53 is provided in each of the first to fourth storage cassettes 31, the reconciliation cassette 33, and the collection cassette 53. Each of the counters can count the banknotes of 128 denominations, and has a capacity of 2 bytes per denomination. Further, a counter which can count the banknotes of 128 denominations and has a capacity of 2 bytes per denomination is provided as an in-storage inventory amount configured to count the banknotes when the depositing or dispensing process is finished. Counts of these counters increase or decrease based on the detection results of the passage sensor 312.

The memory unit 59 of the depositing/dispensing machine 1A stores a serial number list in which the serial numbers of the banknotes stored in each unit are arranged in the stored order, and each of the serial numbers is associated with a consecutive number corresponding to the number of the stored banknotes. FIG. 18B shows a table of the serial number lists. A capacity of 3000 banknotes, 16 bytes per banknote, is allocated to each of the first to fourth storage cassettes 31 and the reconciliation cassette 33. A capacity of 5000 banknotes, 16 bytes per banknote, is allocated to the collection cassette 53. A capacity of 220 banknotes, 16 bytes per banknote, is allocated to the dispensing unit 23. A capacity of 520 banknotes, 16 bytes per banknote, is allocated to the rejected banknote escrow unit 51.

For example, when the passage sensor 312 detects the banknote passing through the port 3000 of the storage cassette 31, the counter of the storage cassette 31 increases or decreases the number of the banknotes of the denomination in the storage cassette 31 based on information of the denomination of the detected banknote. When the passage sensor 312 detects the banknote passing through the port 3000 of the storage cassette 31, the serial numbers of the banknotes in the storage cassette 31 are sequentially stored in the serial number list of the storage cassette 31, or deleted, based on information of the serial number of the detected banknote. The counter and the serial number list are updated after the depositing process etc. is finished as described above.

[Money Handling Apparatus of Second Type]

(Configuration of Money Handling Apparatus of Second Type)

Figure 19:
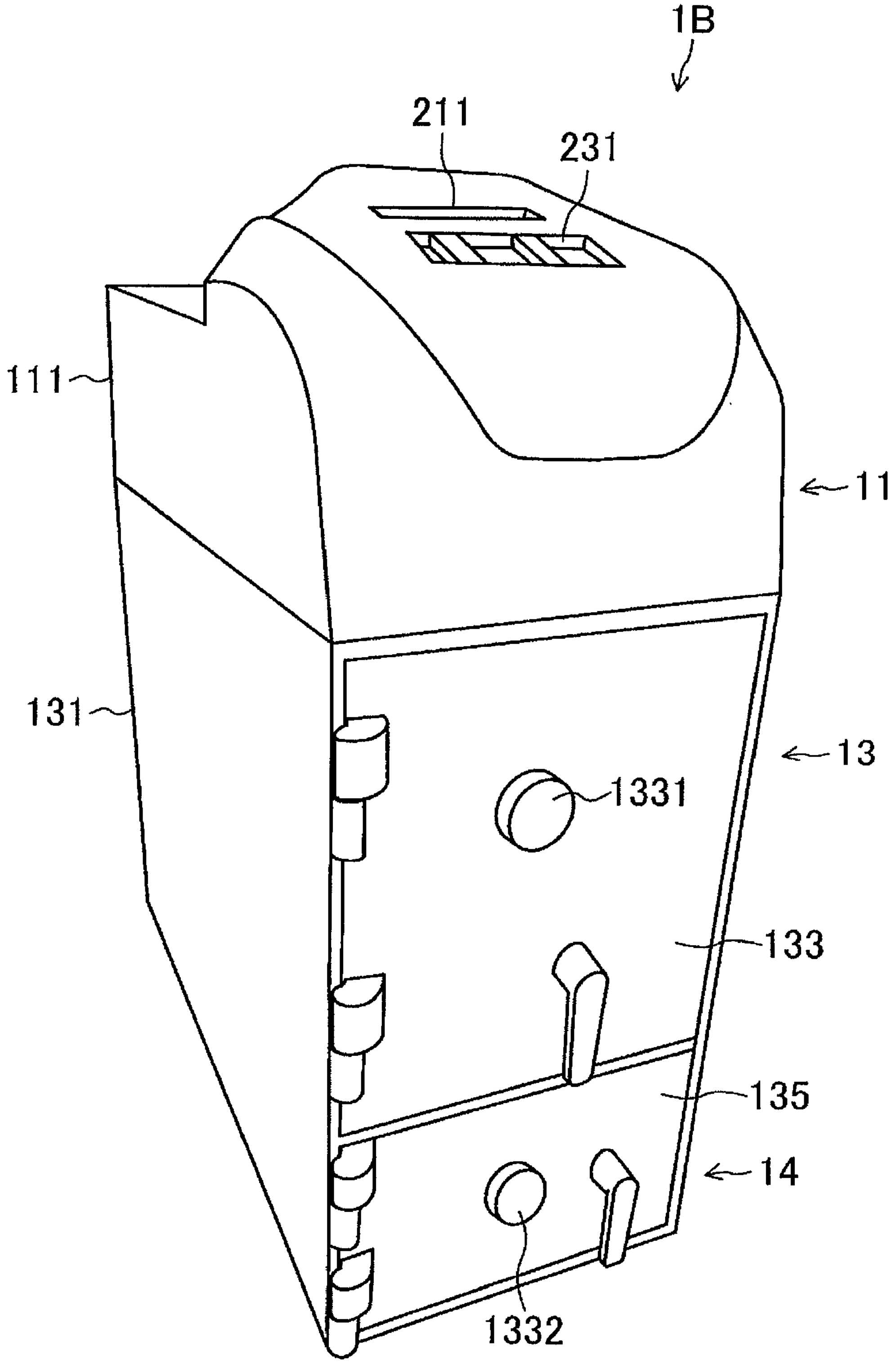
FIG. 19 is a schematic perspective view of a money handling apparatus of a second type.
Figure 20:
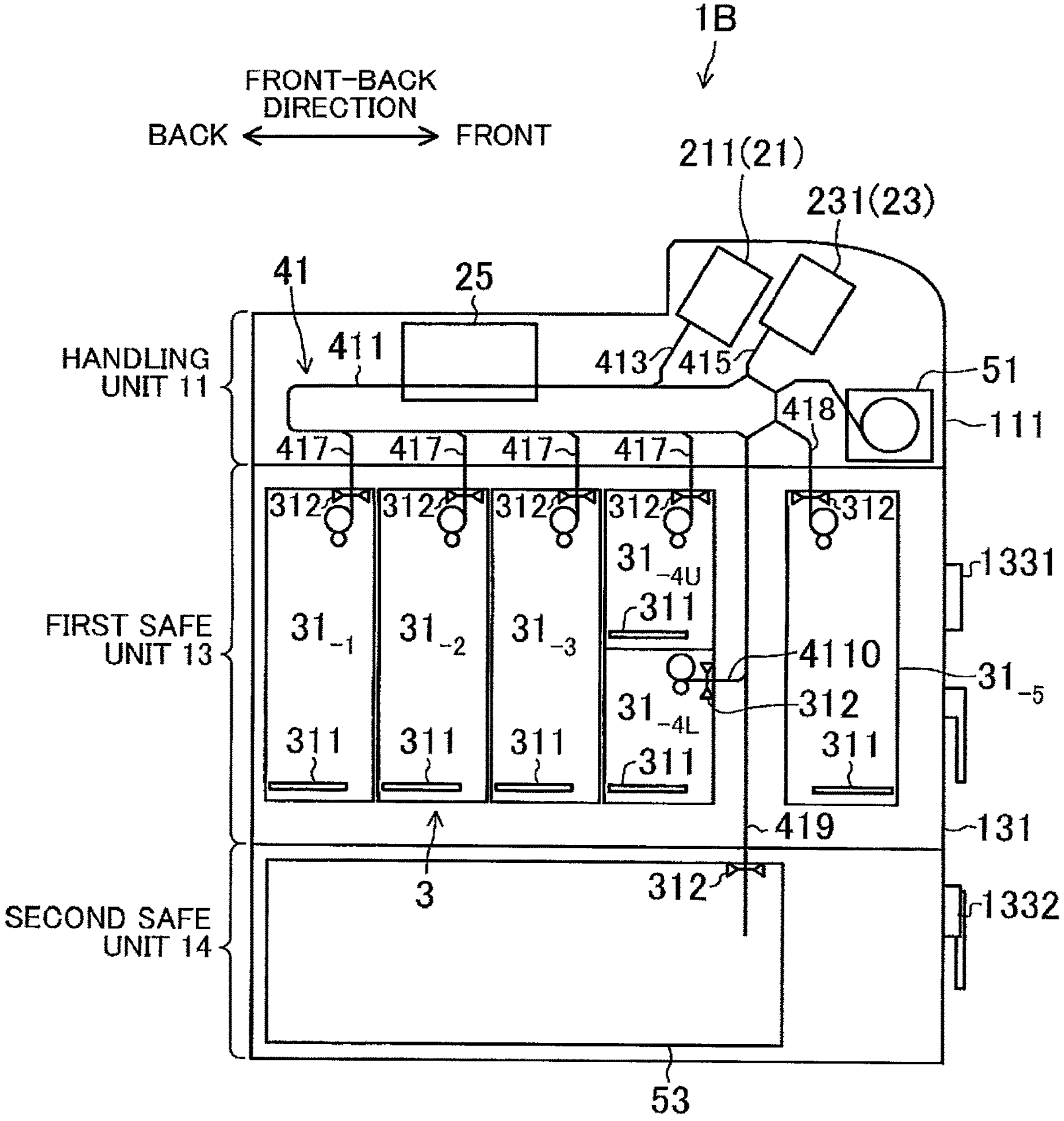
FIG. 20 schematically shows an internal structure of the money handling apparatus of the second type.

FIGS. 19 and 20 show a basic configuration of a money handling apparatus of a second type (hereinafter merely referred to as a depositing/dispensing machine 1B). The depositing/dispensing machine 1B is also a so-called circulating depositing/dispensing machine. In the following description (including the description of a third type described later), the same configuration and functions as those of the first type will be described with the same reference characters, and will not be described in detail.

Basic configuration of the depositing/dispensing machine 1B is almost similar to that of the depositing/dispensing machine 1A. Specifically, the depositing/dispensing machine 1B is also broadly divided into an upper handling unit 11, a first safe unit 13 in the middle, and a lower second safe unit 14. An upper casing 111 constituting the handling unit 11 contains a depositing unit 21 having an inlet 211, a dispensing unit 23 having an outlet 231, a recognition unit 25, an escrow unit 51, and a transport unit 41 including a looped transport path 411. A protective casing 131 arranged below the upper casing 111 constitutes the first and second safe units 13 and 14. A security level of the protective casing 131 is higher than that of the upper casing 111.

The depositing/dispensing machine 1B is different from the depositing/dispensing machine 1A in that the dispensing part 23 has only a single outlet 23, and the reconciliation cassette 33 is replaced with a storage cassette 31, for example. The depositing/dispensing machine 1B shown in FIGS. 19 and 20 includes the second safe unit 14 and a collection cassette 53. However, the depositing/dispensing machine 1B of a different type may not have the second safe unit 14 and the collection cassette 53. Thus, the depositing/dispensing machine 1B configured differently from the depositing/dispensing machine 1A is different in some functions as compared with the depositing/dispensing machine 1A, and some functions same as those of the depositing/dispensing machine 1A may be performed in a different way.

In the depositing/dispensing machine 1B shown in FIGS. 19 and 20, the first safe unit 13 includes a storage unit 3 including 5 stacking storage cassettes 31, and the second safe unit 14 includes the collection cassette 53. A first door 133 for opening and closing the first safe unit 13, and a second door 135 for opening and closing the second safe unit 14 are provided in a front surface of the protective casing 131. Like the depositing/dispensing machine 1A, a first electronic lock 1331 is provided on a front surface of the first door 133, and a second electronic lock 1332 is provided on a front surface of the second door 135.

The configurations of the recognition unit 25, the transport unit 41, the depositing unit 21, the dispensing unit 23, the storage cassette 31, the escrow unit 51, the collection cassette 53, etc., are fundamentally the same as those of the recognition unit 25 etc. of the depositing/dispensing machine 1A. However, since the depositing/dispensing machine 1B has only a single outlet, the single outlet is regarded as the first outlet 231 of the depositing/dispensing machine 1A. The reconciliation cassette 33 provided in the depositing/dispensing machine 1A is replaced with a fifth storage cassette 31(31$_{-5}$).

Figure 21:
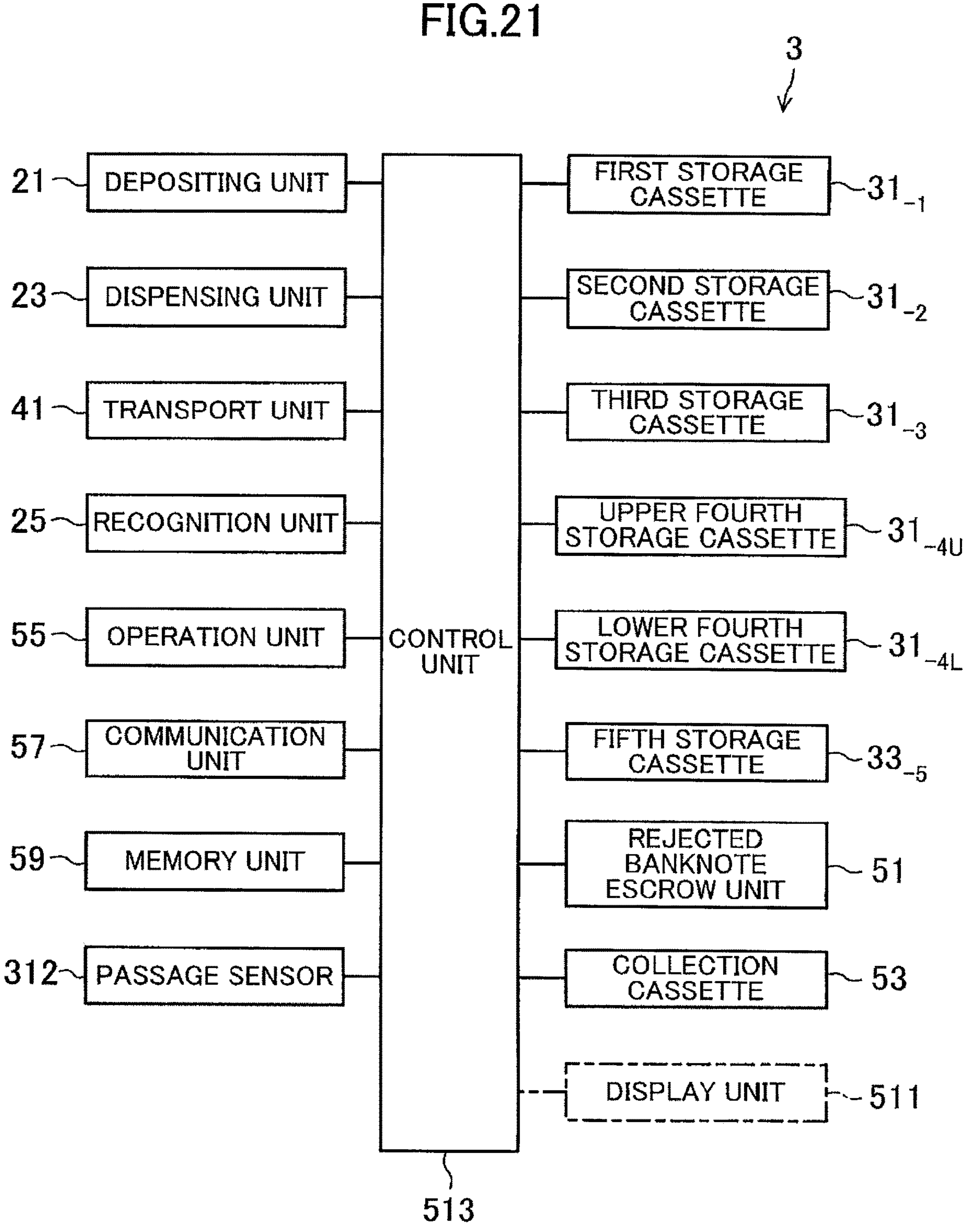
FIG. 21 shows a configuration associated with control of the money handling apparatus of the second type.

FIG. 21 shows a configuration associated with control of the depositing/dispensing machine 1B. Except for the fifth storage cassette 31$_{-5}$ provided in place of the reconciliation cassette 33, the depositing/dispensing machine 1B is almost the same as the depositing/dispensing machine 1A. Each of the units has the similar function.

(Functions of Money Handling Apparatus of Second Type)

Various functions of the depositing/dispensing machine 1B will be described below. The depositing/dispensing machine 1B can also perform various counting processes, such as a dispensing process, and a shut down function etc. However, the depositing/dispensing machine 1B cannot perform the bypassed depositing process, the change preparation process, the bypassed dispensing process, and the continuous dispensing process because the depositing/dispensing machine 1B has only the single outlet. Further, the depositing/dispensing machine 1B cannot perform the refilling process through the reconciliation cassette and the full reconciliation process because the depositing/dispensing machine 1B does not have the reconciliation cassette 33.

(Shut Down Function)

When trouble has occurred in the depositing/dispensing machine 1B, a troubled part can be shut down so that the machine can continuously be used. The shut down function includes commanded shut down, and automatic shut down as described in detail in connection with the depositing/dispensing machine 1A.

(Counter and Serial Number Management Function)

Like the depositing/dispensing machine 1A, the depositing/dispensing machine 1B has a counter and serial number management function. Details of the function are the similar to those described in connection with the depositing/dispensing machine 1A.

(Direct Depositing Process)

A direct depositing process is performed to directly store the normal banknotes deposited (stored) in the depositing/dispensing machine 1B in the storage cassette 31 in the same manner as in the depositing/dispensing machine 1A. Each of the banknotes placed in the inlet 211 is stored in any one of the storage cassettes 31 based on the results of the recognition by the recognition unit 25, and the predetermined types of the banknotes allocated to the storage cassette 31.

Figure 22:
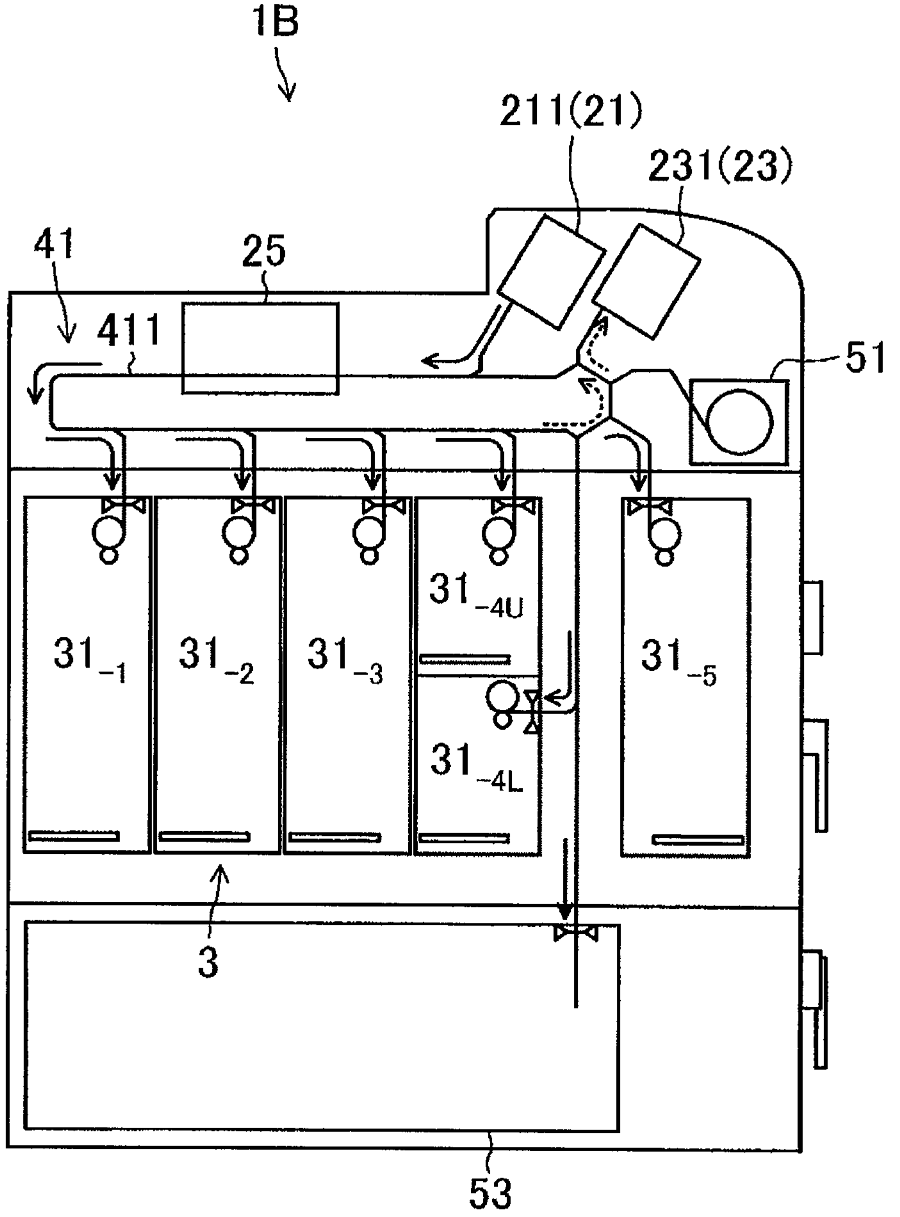
FIG. 22 shows how the money handling apparatus of the second type is operated in a direct depositing process.

FIG. 22 shows how the depositing/dispensing machine 1B is operated in the depositing process. When the banknotes are placed in the inlet 211, a command to start the depositing process is input to the depositing/dispensing machine 1B by operating the higher-ranking terminal T etc. As indicated by solid arrows in FIG. 22, the feeding mechanism of the depositing unit 21 feeds the banknotes in the inlet 211 one by one, and the transport unit 41 transports the banknotes to the recognition unit 25. The recognition unit 25 recognizes the banknotes. The transport unit 41 stores the normal banknotes in the predetermined storage cassette 31 based on the results of the recognition and the predetermined types of the banknotes allocated to the storage cassette 31 as indicated by solid arrows in FIG. 22.

The banknotes (normal banknotes) of the denominations which are not allocated to the storage cassettes 31, the unfit banknotes, and the overflowed banknotes are stored in the collection cassette 53. The rejected banknotes are dispensed to the outlet 231 as indicated by dashed arrows in FIG. 22. When the outlet 231 has become full, removal of the banknotes is waited for. When the banknotes are removed from the outlet 231, the depositing process is restarted.

The overflowed banknotes may be dispensed to the outlet 231 instead of being stored in the collection cassette 53.

(Counting Process)

In a counting process, the banknotes placed in the inlet 211 are recognized and counted, and the normal banknotes of the denomination specified to be received by the depositing/dispensing machine 1B are dispensed to the outlet 231, and the other banknotes are temporarily stored in the escrow unit 51. Different from the depositing/dispensing machine 1A, the depositing/dispensing machine 1B has only the single outlet 231. Thus, the escrow unit 51 is used to perform this process.

Figure 23:
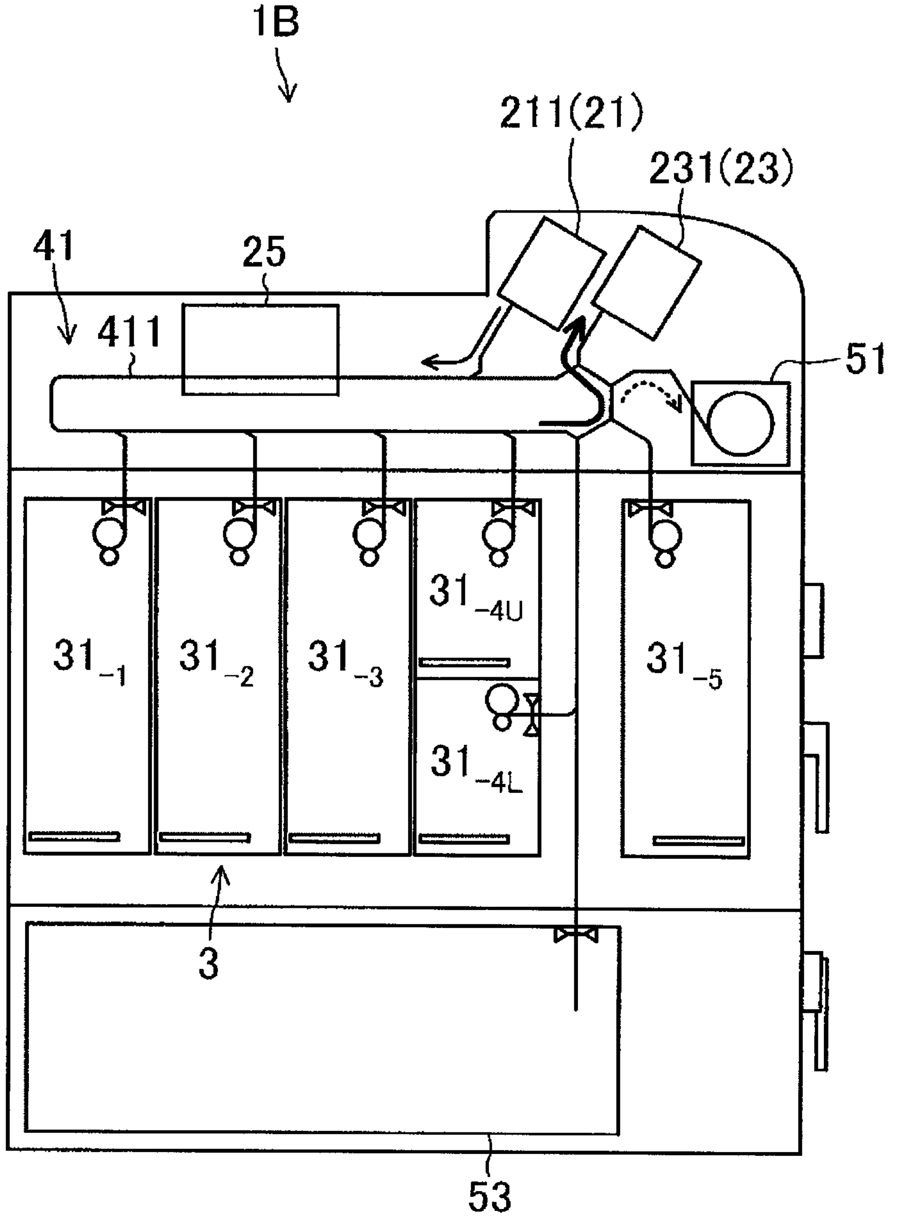
FIG. 23 shows how the money handling apparatus of the second type is operated in a counting process.

Specifically, as shown in FIG. 23, the counting process is started by performing predetermined operation at the higher-ranking terminal T etc., and the inlet 211 waits for the banknotes to be placed therein. When it is detected that the banknotes are placed in the inlet 211, the higher-ranking terminal T etc. commands the control unit 513 to start the counting process, and the banknotes in the inlet 211 is fed as indicated by solid arrows in FIG. 23. The banknotes fed from the inlet 211 are transported by the transport unit 41 to the recognition unit 25, and are recognized by the recognition unit 25.

As a result of the recognition, the normal banknotes are dispensed to the first outlet 231 as indicated by thick solid arrows in FIG. 23. The other banknotes, such as the banknotes of the denomination not to be handled by the depositing/dispensing machine 1B, and the rejected banknotes, are transported to the escrow unit 51 as indicated by dashed arrows in FIG. 23, and stored therein. The result of the count of the normal banknotes etc. is displayed on the display unit 511 etc. Before performing the counting process, a rejected banknote transporting process described later is preferably performed to dispense the banknotes in the escrow unit 51.

(Refilling Process through Inlet)

Figure 24:
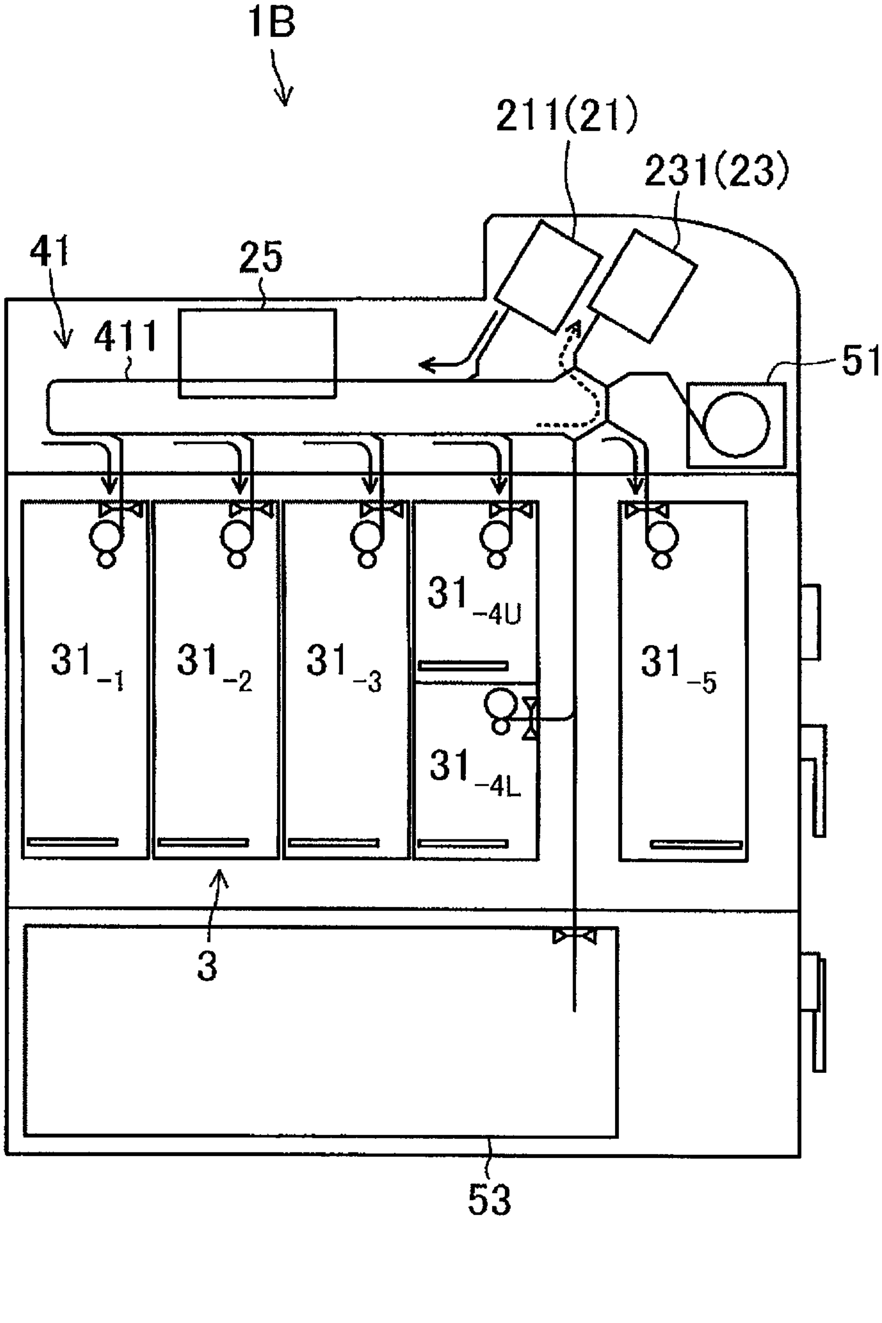
FIG. 24 shows how the money handling apparatus of the second type is operated in a refilling process through inlet.

A refilling process through the inlet is performed to refill the storage cassette 31 with the banknotes from outside. In the same manner as in the depositing/dispensing machine 1A, only the fit banknotes can refill the storage cassette 31. Specifically, as shown in FIG. 24, the banknotes placed in the inlet 211 are recognized, and only the fit banknotes of the allocated denomination are stored in the corresponding storage cassette 31. The other banknotes, such as the unfit banknotes and the rejected banknotes, are dispensed to the outlet 231.

The refilling process through the inlet performed by the depositing/dispensing machine 1B is fundamentally the same as that performed by the depositing/dispensing machine 1A. As indicated by solid arrows in FIG. 24, the transport unit 41 transports the banknotes which are recognized as the fit banknotes of the denomination allocated to each of the storage cassettes 31 to the corresponding storage cassettes 31. The other banknotes are transported to the outlet 231 as indicated by dashed arrows in FIG. 24.

(Dispensing Process)

A dispensing process is performed to dispense the banknotes stored in the depositing/dispensing machine 1B. Specifically, the dispensing process is started by performing predetermined operation of specifying the number and the denomination of the banknotes at the higher-ranking terminal T etc.

Figure 25:
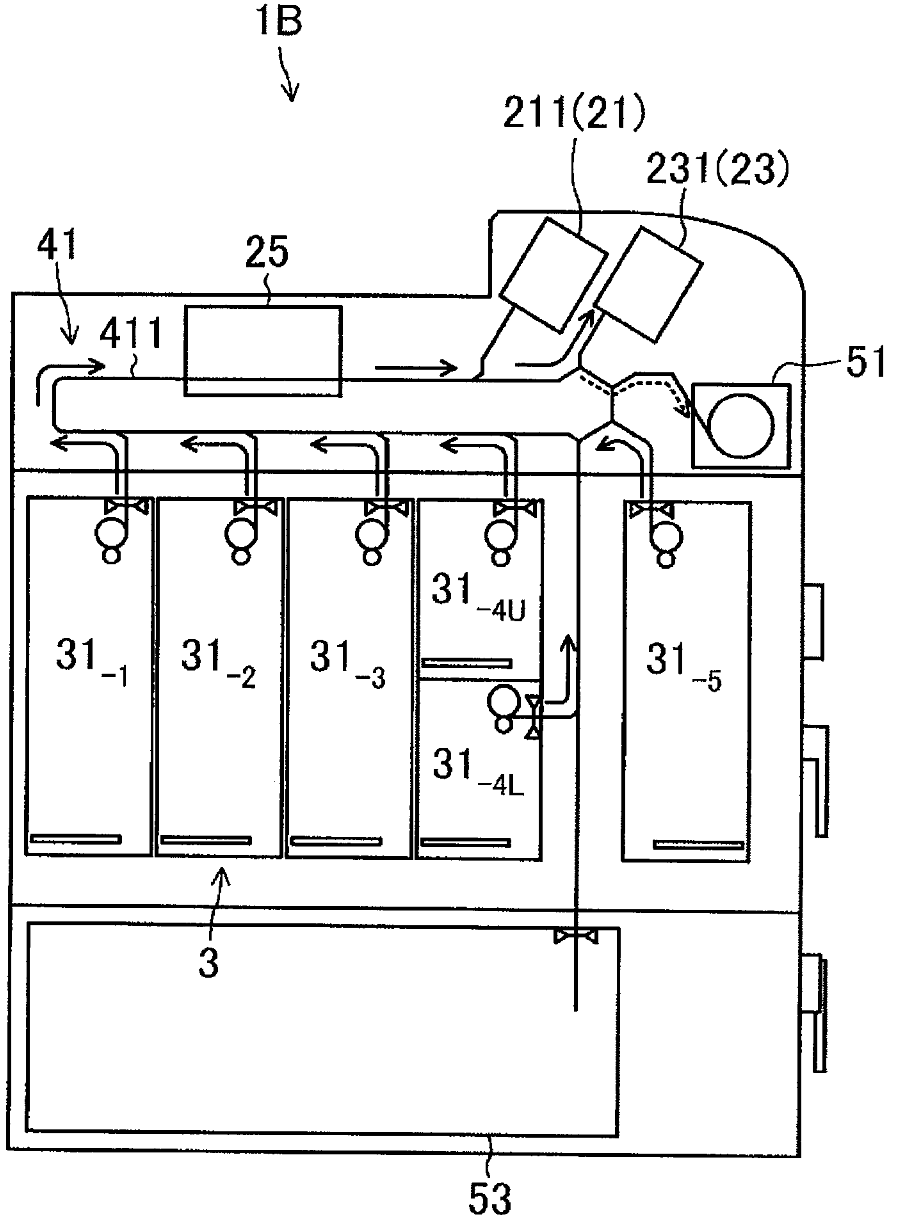
FIG. 25 shows how the money handling apparatus of the second type is operated in a dispensing process.

FIG. 25 shows how the depositing/dispensing machine 1B is operated in the dispensing process. As indicated by solid arrows in FIG. 25, the storage unit 3 feeds the specified number of the banknotes of the specified denomination from the storage cassette storing them. The transport unit 41 transports the fed banknotes to the recognition unit 25 through the looped transport path 411 etc. After the recognition unit 25 has recognized the banknotes, the normal banknotes are dispensed to the outlet 231.

The rejected banknotes are transported to the escrow unit 51 as indicated by dashed arrows in FIG. 25, and stored therein. The banknotes stored in the escrow unit 51 are stored in the storage cassette 31 or the collection cassette 53, if necessary, after the dispensing process.

(Rejected Banknote Releasing Process)

A rejected banknote releasing process is performed to empty each of the storage cassettes 31 by dispensing the rejected banknotes remaining in each of the storage cassettes 31 to the outside of the depositing/dispensing machine 1B. Specifically, in the rejected banknote releasing process, the rejected banknotes remaining in each of the storage cassettes 31 are dispensed to the outlet 231. Specifically, the transport unit 41 transports the banknotes recognized by the recognition unit 25 to the outlet 231 irrespective of the recognition results.

(Rejected Banknote Transporting Process)

In a rejected banknote transporting process, the banknotes stored in the escrow unit 51 are recognized, and then transported to the storage cassette 31 or the collection cassette 53 in the same manner as in the depositing/dispensing machine 1A. The depositing/dispensing machine 1B of the different type which does not have the collection cassette 53 does not perform this process.

The rejected banknote transporting process is performed based on a command from the higher-ranking terminal T etc., or determination of the depositing/dispensing machine 1B. The depositing/dispensing machine 1B performs the rejected banknote transporting process in two patterns. In a first pattern, the rejected banknote transporting process is performed after the dispensing process. In a second pattern, the rejected banknote transporting process is performed in the dispensing process. Details of the first and second patterns are similar to those of the first pattern of the depositing/dispensing machine 1A.

(Restoring Counting Process)

In a restoring counting process, the banknotes dispensed outside the depositing/dispensing machine 1B are restored in the collection cassette 53 by performing a recovery process when an error has occurred in the rejected banknote transporting process in the same manner as in the depositing/dispensing machine 1A. As described in the rejected banknote transporting process, the depositing/dispensing machine 1B of the different type which does not have the collection cassette 53 does not perform this process.

Specifically, the banknotes placed in the inlet 211 are recognized, and the normal banknotes of the denominations allocated to the storage cassettes 31 are transported to the collection cassette 53. The other banknotes, such as the rejected banknotes, the normal banknotes of the denominations which are not allocated to the storage cassettes 31, and the banknotes transported after the collection cassette 53 has become full, are dispensed to the outlet 231. The counter is not updated even after the banknotes are transported to the collection cassette 53.

(Collection Process)

The collection process is a process for transporting the banknotes stored in the storage cassette 31 to the collection cassette 53. Specifically, the collection process is started by performing predetermined collection operation at the higher-ranking machine T etc. Details of the fundamental process performed in the depositing/dispensing machine 1B are similar to those of the depositing/dispensing machine 1A. However, the process is not performed on the lower fourth storage cassette $\mathbf{31}_{-4L}$ because a temporary storage for the lower fourth storage cassette $\mathbf{31}_{-4L}$ is not provided unlike the depositing/dispensing machine 1A.

Figure 26:
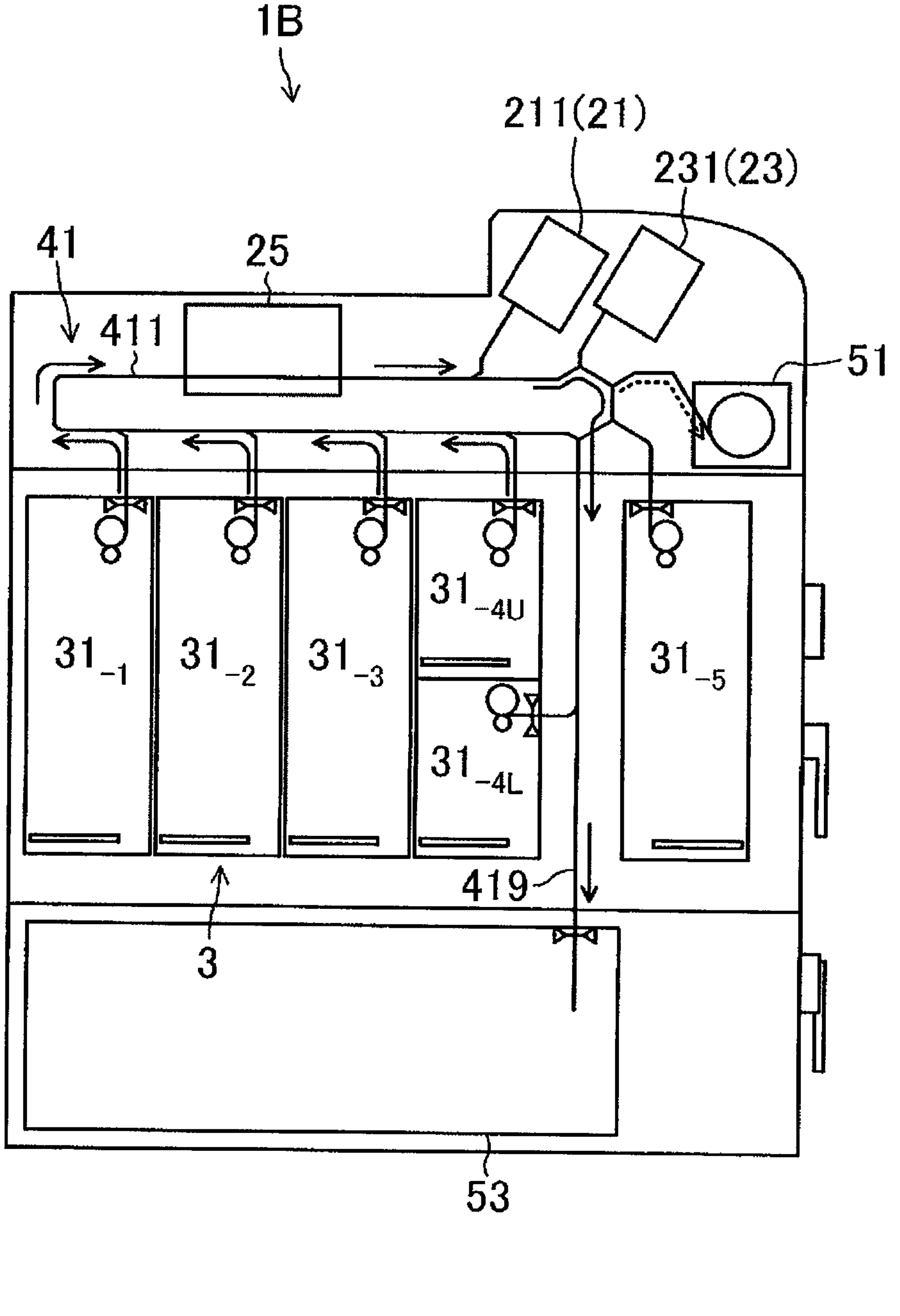
FIG. 26 shows how the money handling apparatus of the second type is operated in a collection process.

FIG. 26 shows how the depositing/dispensing machine 1B is operated in the collection process. As indicated by solid arrows in FIG. 26, in collecting the banknotes from the first to third storage cassettes $\mathbf{31}_{-1}$, $\mathbf{31}_{-2}$, and $\mathbf{31}_{-3}$, or the upper fourth storage cassette $\mathbf{31}_{-4U}$, the storage unit sequentially feeds the banknotes of the specified denomination from the storage cassette storing them. The transport unit 41 transports the fed banknotes to the recognition unit 25. The banknotes recognized as the normal banknotes by the recognition unit 25 are transported from the looped transport path 411 to the collection cassette 53, and stored in the collection cassette 53. The banknotes rejected by the recognition unit 25 are stored in the escrow unit 51 as indicated by dashed arrows in FIG. 26.

Figure 27:
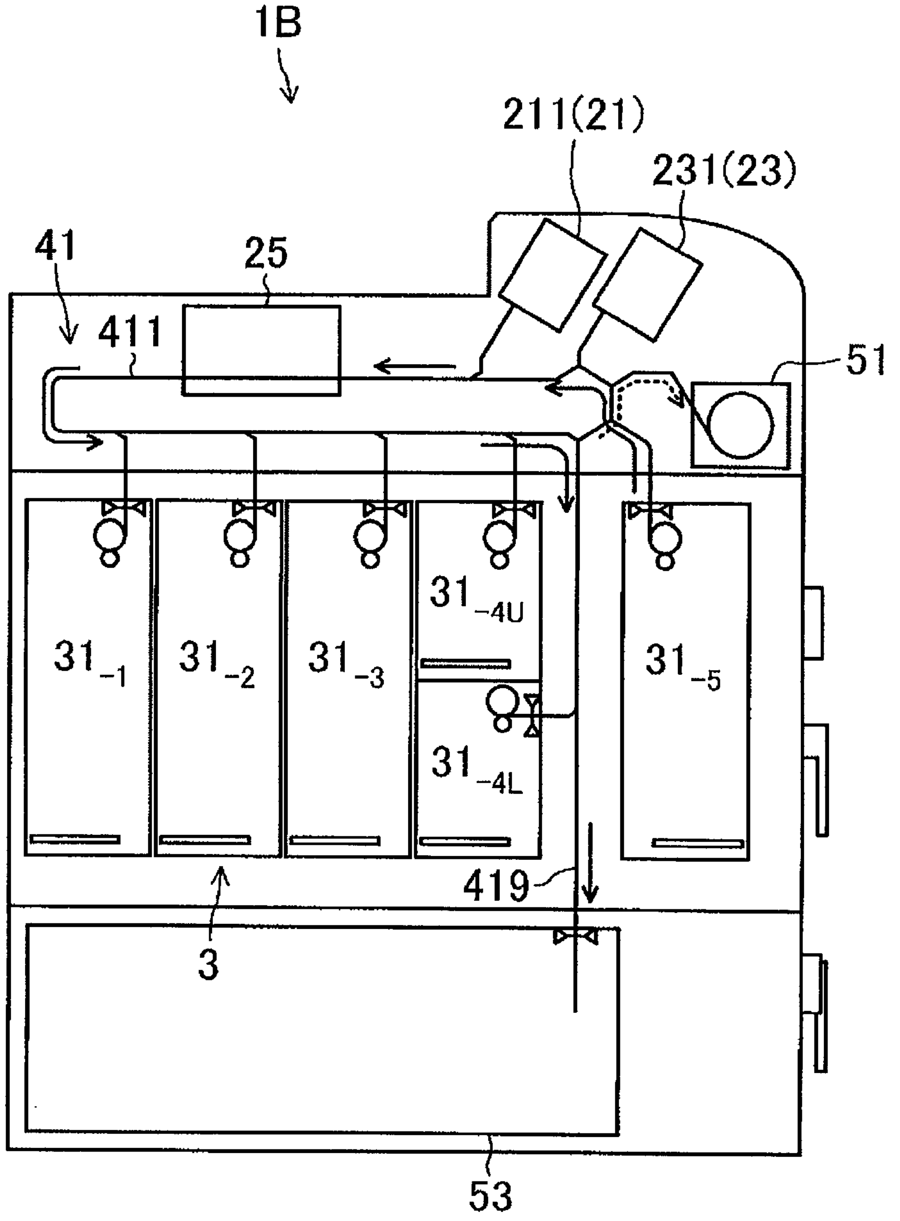
FIG. 27 shows how the money handling apparatus of the second type is operated in the collection process.

As indicated by solid arrows in FIG. 27, in collecting the banknotes from the fifth storage cassette $\mathbf{31}_{-5}$, the banknotes fed from the fifth storage cassette $\mathbf{31}_{-5}$ are transported to the recognition unit 25 in a reverse direction through the looped transport path 411. The banknotes recognized as the normal banknotes by the recognition unit 25 are transported in the reverse direction from the looped transport path 411 to the collection cassette 53, and stored therein. The banknotes rejected by the recognition unit 25 are stored in the escrow unit 51 as indicated by dashed arrows in FIG. 27.

(Partial Reconciliation Process)

As described in connection with the depositing/dispensing machine 1A, the reconciliation process is performed to identify the banknotes stored in the storage cassette 31. The depositing/dispensing machine 1B does not have the reconciliation cassette 33, and cannot perform the full reconciliation process. Thus, the partial reconciliation process is performed using the escrow unit 51.

Figure 28B:
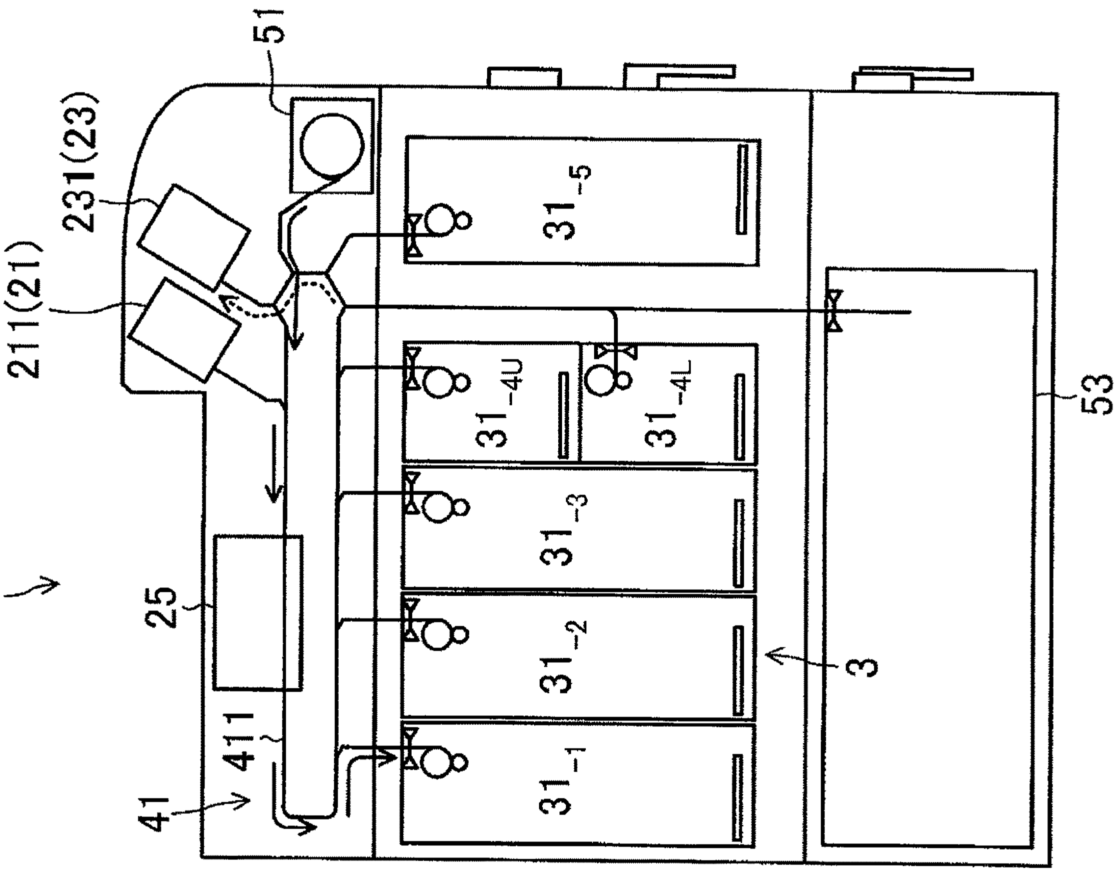
FIGS. 28A and 28B show how the money handling apparatus of the second type is operated in a reconciliation process.
Figure 28A:
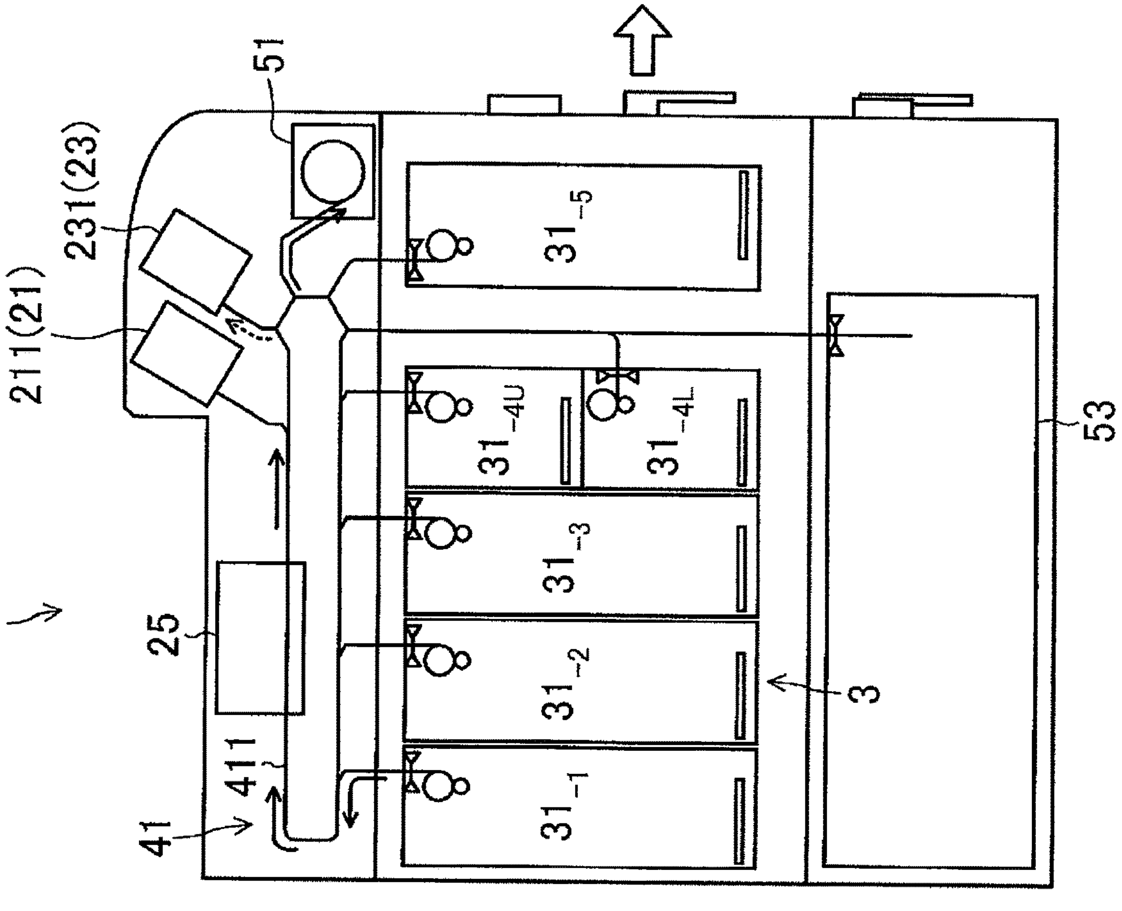

FIGS. 28A and 28B show how the depositing/dispensing machine 1B is operated in the reconciliation process. As shown in FIG. 28A, the banknotes are fed one by one from the target storage cassette 31 (the first storage cassette $\mathbf{31}_{-1}$ in the example of FIG. 28). The transport unit 41 transports the fed banknotes to the recognition unit 25, and the recognition unit 25 recognizes the banknotes. When a plurality of normal banknotes (e.g., 5 banknotes) are successively fed from the storage cassette 31 (they form a target group), the feeding of the banknotes is stopped. The normal banknotes are transported to the escrow unit 51, and stored therein. The rejected banknotes are dispensed to the outlet 231 as indicated by dashed arrows in FIG. 28A.

As described in connection with the depositing/dispensing machine 1A, the target group is checked against the serial number list. When a reference group including all the serial numbers which match the serial numbers in the target group is identified in the serial number list, the serial number list is updated, and the banknotes stored in the storage cassette 31 are identified.

Then, as shown in FIG. 28B, the banknotes stored in the escrow unit 51 are fed one by one, and transported to the recognition unit 25. The recognition unit 25 recognizes the banknotes. Then, the normal banknotes whose serial numbers have been read are stored in the original storage cassette 31 as indicated by solid arrows in FIG. 28B. The rejected banknotes are dispensed to the outlet 231 as indicated by dashed arrows in FIG. 28B. A transport path through which the rejected banknotes are transported to the outlet 231 partially overlaps with a transport path through which the banknotes fed from the escrow unit 51 pass. Thus, when the banknotes are rejected by the recognition unit 25, the feeding of the banknotes from the escrow unit 51 is stopped, and the rejected banknotes are transported to the outlet 231, and then the feeding of the banknotes from the escrow unit 51 is restarted. The rejected banknotes transported to the outlet 231 are removed by a permitted person, and are manually handled.

(Returning Process)

A returning process is performed to dispense the banknotes in the escrow unit 51 to the outlet 231. For example, in recovery from an error or trouble, when the banknote is rejected in the partial reconciliation process, or when the escrow unit 51 has become full, the returning process is performed to empty the escrow unit 51 before the counting process or the partial reconciliation process.

Figure 29:
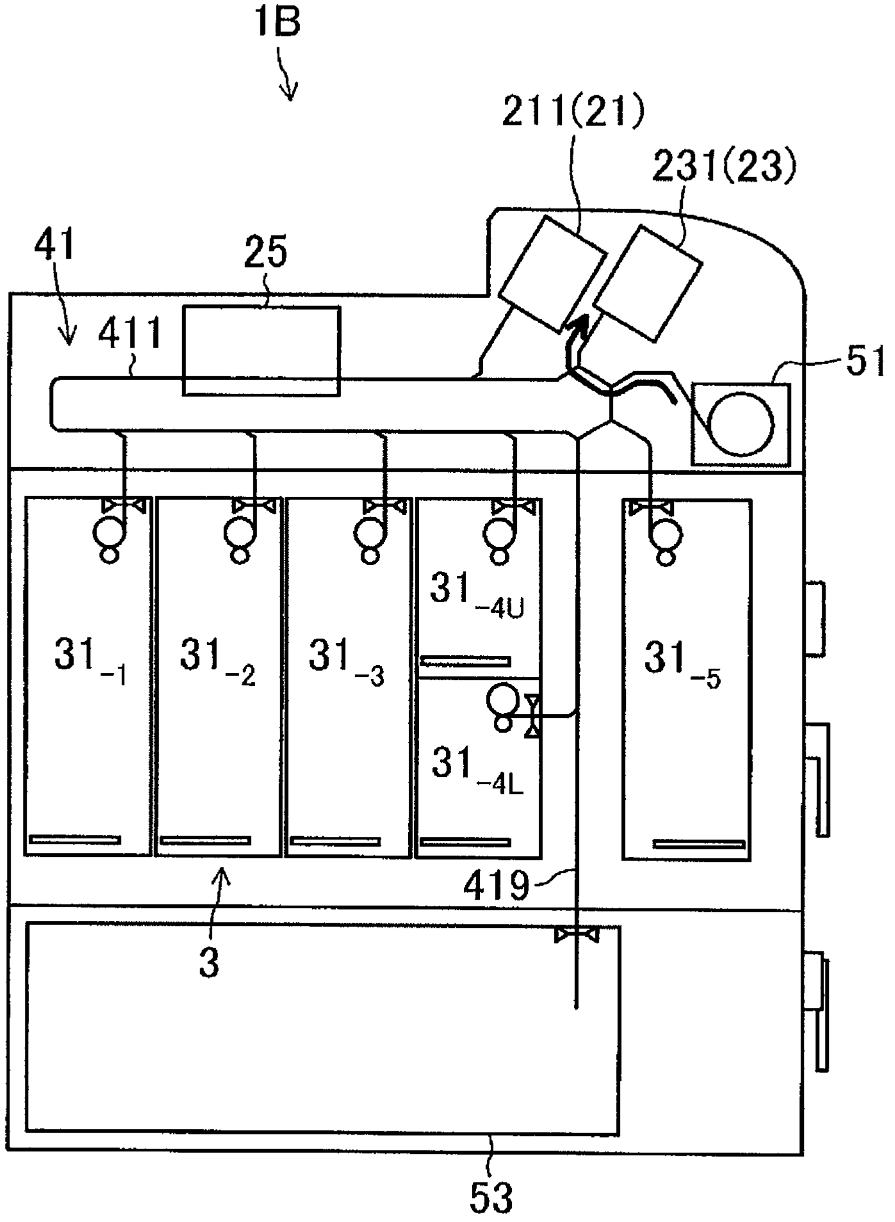
FIG. 29 shows how the money handling apparatus of the second type is operated in a returning process.

FIG. 29 shows how the depositing/dispensing machine 1B is operated in the returning process. In the returning process, as indicated by solid arrows in FIG. 29, the banknotes in the escrow unit 51 are directly dispensed to the outlet 231 without recognition. Specifically, the transport unit 41 does not transport the banknotes to the recognition unit 25 through the looped transport path 411, but directly transports the banknotes to the outlet 231 through the shortest path.

[Money Handling Apparatus of Third Type]

(Configuration of Money Handling Apparatus of Third Type)

Figure 30:
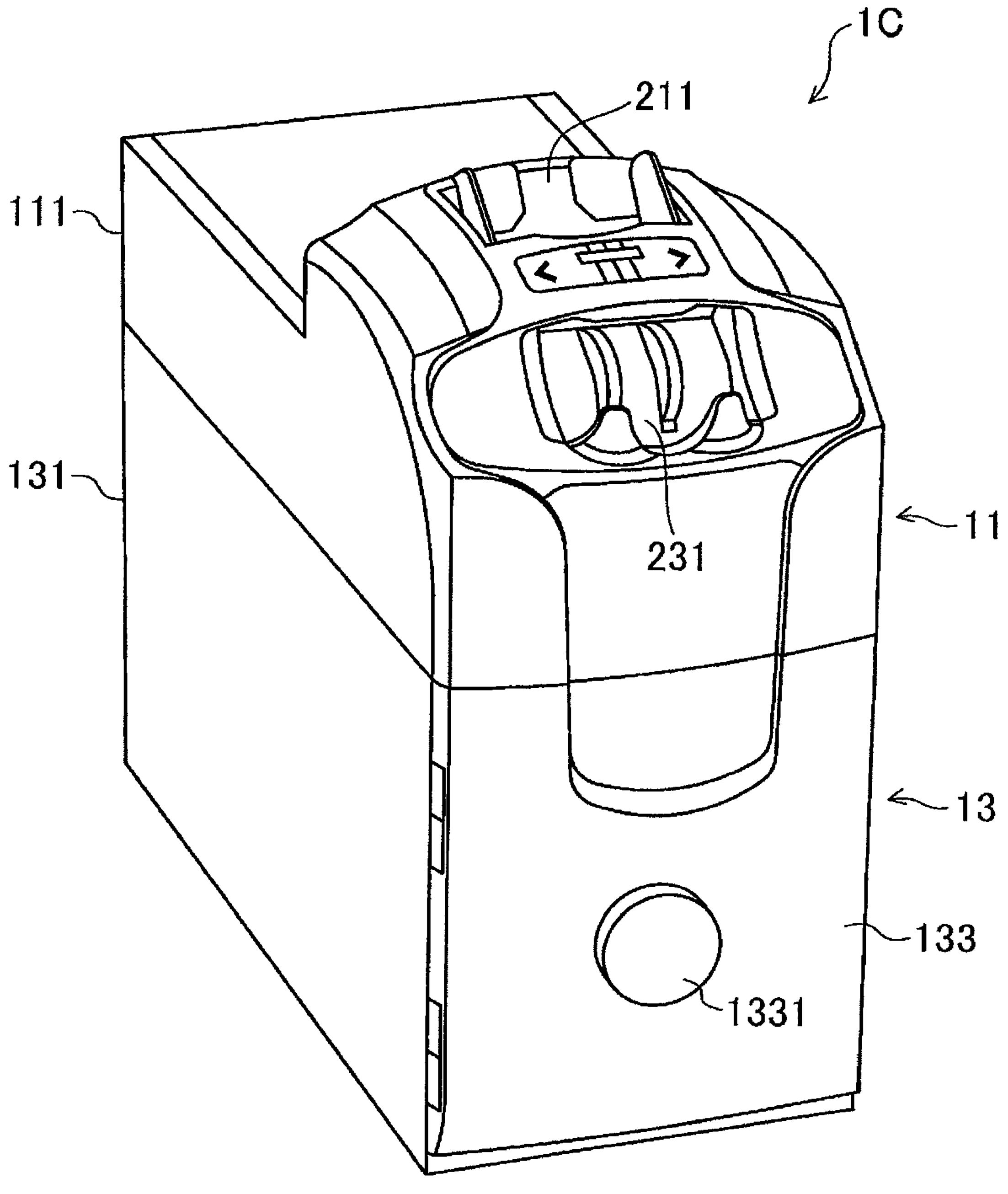
FIG. 30 is a schematic perspective view of a money handling apparatus of a third type.
Figure 31:
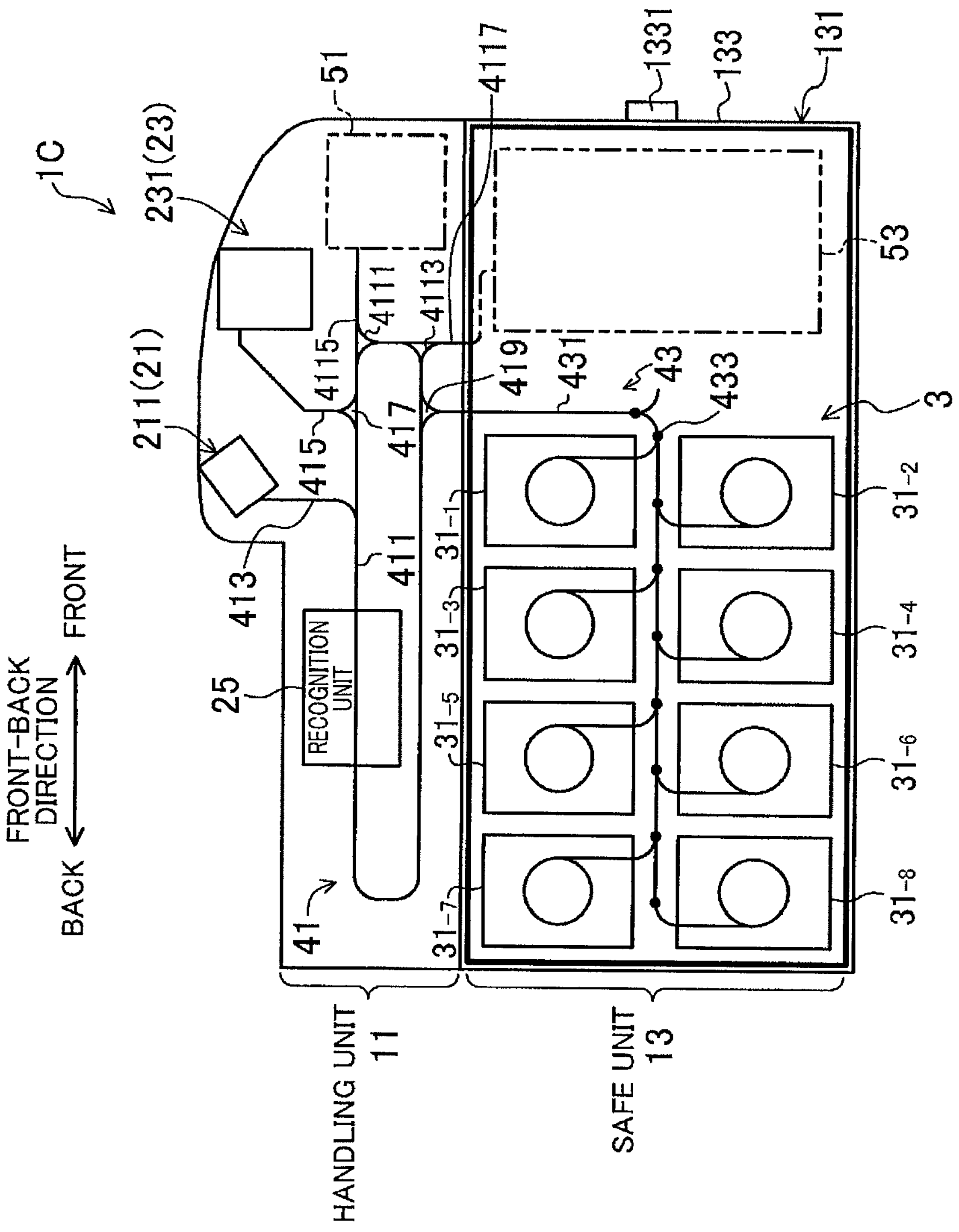
FIG. 31 schematically shows an internal structure of the money handling apparatus of the third type.

FIGS. 30 and 31 show a money handling apparatus of a third type (hereinafter may be referred to as a depositing/dispensing machine 1C). The depositing/dispensing machine 1C is also a circulating depositing/dispensing machine.

The depositing/dispensing machine 1C is broadly divided into an upper handling unit 11 and a lower safe unit 13 (this safe unit corresponds to the first safe unit of the depositing/dispensing machine of the first type). A casing 111 constituting the handling unit 11 contains a depositing unit 21 having an inlet 211, a dispensing unit 23 having an outlet 231, a recognition unit 25, and a transport unit 41 including a looped transport path 411.

A protective casing 131 constituting the safe unit 13 contains a storage unit 3 including a plurality of winding storage modules 31 (8 storage modules in this example) corresponding to the storage cassettes 31 of the first type, and a lower transport unit 43 including a transport path 431 connecting the looped transport path 411 and the storage modules 31. A door 133 for opening/closing the safe unit 13, and an electronic lock 1331 are provided on a front surface of the protective casing 131.

Configuration and functions of the recognition unit 25 are the same as those of the depositing/dispensing machine 1A. The recognition unit 25 recognizes authenticity, fitness, and denomination of each banknote. However, the depositing/dispensing machine 1C does not necessarily recognize the serial numbers of the banknotes. The recognition unit 25 of the depositing/dispensing machine 1C is configured to recognize and count the banknotes (the recognition and the counting may be referred to as the recognition in short).

The transport unit 41 (hereinafter may be referred to as an upper transport unit 41 to be distinguished from the lower transport unit 43) includes the looped transport path 411 in the casing 111. The looped transport path 411 and the inlet 211 are connected through a depositing path 413. A dispensing path 415 through which the banknotes traveling on the looped transport path 411 are selectively transported to the outlet 231 by operation of a diverter 417 is connected to the looped transport path 411.

The looped transport path 411 is provided with a plurality of diverters. Specifically, a first diverter 419 is provided at a junction between the looped transport path 411 and the transport path 431 of the lower transport unit 43. The first diverter 419 selectively sends the banknotes transported on the looped transport path 411 clockwise or counterclockwise to the transport path 431 of the lower transport unit 43, or transports the banknotes fed from the storage unit 3 and transported through the transport path 431 clockwise or counterclockwise on the looped transport path 411.

A second diverter 4111 is provided at a junction between the looped transport path 411 and a connection path 4115. The connection path 4115 connects the escrow unit 51 depicted in a phantom line and the looped transport path 411. The second diverter 4111 sends the banknotes traveling on the looped transport path 411 clockwise or counterclockwise to the connection path 4115, or transports the banknotes fed from the escrow unit 51 clockwise or counterclockwise on the looped transport path 411.

A third diverter 4113 is provided at a junction between the looped transport path 411 and a cassette connection path 4117. The cassette connection path 4117 connects the collection cassette 53 depicted in a phantom line and the looped transport path 411. The third diverter 4113 selectively sends the banknotes traveling clockwise or counterclockwise on the looped transport path 411 to the cassette connection path 4117.

As described above, the storage unit 3 includes first to eighth winding (i.e., tape-type) storage modules $31_{-1}$-$31_{-8}$ in the example shown in the drawings. In the following description, a set of the eight storage modules will be indicated by a reference character "31," while the first, second, third, . . . storage modules will be indicated by reference characters "$31_{-1}$, $31_{-2}$, $31_{-3}$, . . . " The number of the storage modules 31 is not particularly limited as long as more than one storage module is provided. In this example, two rows of four storage modules 31 arranged in a front-back direction of the machine are vertically stacked.

For example, a single denomination of the banknote may be allocated to each of the storage modules 31 so that the storage modules 31 can store the banknotes of different denominations (single denomination setting). Alternatively, two or more denominations may be allocated to a single storage module 31 so that the storage module 31 can store the banknotes of different denominations (multiple denomination setting). The storage unit 3 may include the storage modules 31 to each of which the single denomination is allocated, or may include both of the storage module 31 to which the single denomination is allocated, and the storage module 31 to which multiple denominations are allocated. Unless otherwise specified, each of the storage modules 31 of the depositing/dispensing machine 1C is a single denomination storage module.

The winding storage module 31 includes a tape for guiding the banknotes, a guide, a reel for winding the tape and the banknotes, and a substantially rectangular casing containing the tape, the guide, and the reel as described in Japanese Patent Publication No. 2000-123219. Alternatively, the winding storage module 31 includes two tapes for sandwiching the banknotes, a reel for winding the two tapes sandwiching the banknotes, and a casing containing the tapes and the reel as described in Patent Publication No. PCT/JP2009/066729 which is filed by the applicant.

In either configuration, the winding storage module 31 winds the banknotes one by one to store them, and feeds the banknotes one by one in a reverse order of the storing order, i.e., the last stored banknote is first fed. Each of the storage modules 31 is provided with a detection sensor (not shown) for detecting the passage of the banknote near a port 3000 formed in the storage module to communicate the inside and the outside of the casing. The detection sensor corresponds to the passage sensor 312 of the money handling apparatus of the first type described above.

Like the looped transport path 411 of the upper transport unit 41, the transport path 431 of the lower transport unit 43 includes a combination of a roller, a belt, and a guide. The transport path 431 also allows long edge feed of the banknotes one by one. The transport path 431 extends vertically downward from the first diverter 419 on the looped transport path 411, and a lower end thereof is branched forward and rearward in a front-back direction of the machine 1C. The branch path extending rearward of the machine 1C is arranged between the two vertically stacked rows of the storage modules 31. The storage modules 31 are connected to the branch path through sorters 433, respectively. Each of the sorters 433 is controlled by a control unit 513 to sort the banknotes by the denomination and/or the fitness recognized by the recognition unit 25, and to store the sorted banknotes in the plurality of storage modules 31.

An escrow unit 51 for temporarily retaining the banknotes, and a collection cassette 53 detachably provided in the protective casing 131 of the safe unit 13 can optionally be attached to the depositing/dispensing machine 1C.

The escrow unit 51 is placed in empty space in the casing 111 forward of the looped transport path in the front-back direction as shown in a phantom line in FIG. 31. The escrow unit 51 is connected to the second diverter 4111 through the connection path 4115 as described above. In this example, the escrow unit 51 is a winding unit including two tapes, and stores the banknotes so that the last stored banknote is first fed, like the storage modules 31 described above.

The collection cassette 53 is detachably placed in empty space in the protective casing 131 forward of the storage modules in the front-back direction as shown in a phantom line in FIG. 31. The collection cassette 53 is connected to the third diverter 4113 on the looped transport path 411 through the cassette connection path 4117 as described above. Unlike the winding storage modules 31 and the escrow unit 51, the collection cassette 53 contains an ascending/descending table therein to store the banknotes stacked thereon.

The banknotes stored in the collection cassette 53 cannot be fed out of the cassette. The collection cassette 53 stores the overflowed banknotes. The collection cassette 53 may store the banknotes rejected in the dispensing process etc. When the collection cassette 53 is not attached, the overflowed or rejected banknotes are dispensed to the outlet 231.

Additional winding storage modules 31 may be placed in the empty space in the protective casing 131 in place of the collection cassette 53. For example, two additional storage modules 31 may vertically be stacked in the empty space. Each of the two storage modules 31 is connected to the branch path extending from the lower end of the transport path 431 forward in the front-back direction of the machine through the sorter described above.

Figure 32:
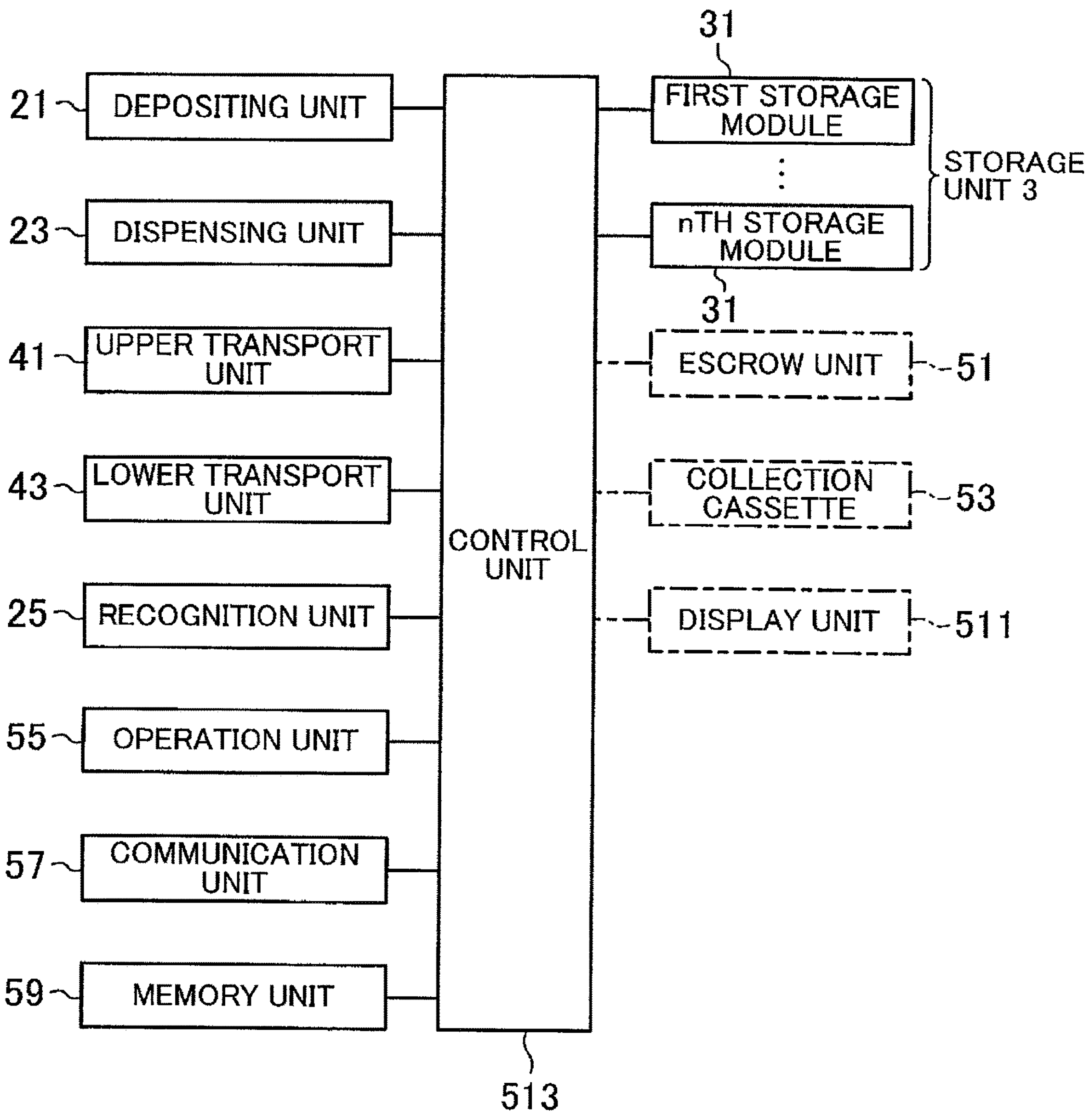
FIG. 32 shows a configuration associated with control of the money handling apparatus of the third type.

FIG. 32 shows a configuration associated with control of the depositing/dispensing machine 1C. The control unit 513 is connected to the depositing unit 21, the dispensing unit 23, the storage unit 3 including the first to the nth storage modules 31, the upper transport unit 41, and the lower transport unit 43 so that signals can be sent and received therebetween. Although not shown, sensors for detecting the banknotes traveling on the transport path, like the passage sensor 312 of the money handling apparatus of the first type, are connected to the control unit 513, and detection signals from the sensors are input to the control unit 513. The control unit 513 outputs control signals based on the input detection signals, and the units 21, 23, 3, 41, and 43 are operated in accordance with the signals.

The control unit 513 is also connected to the recognition unit 25, an operation unit 55, a communication unit 57, and a memory unit 59. The memory unit 59 stores at least an inventory amount which is the respective numbers of the banknotes of different denominations or the amount of the banknotes stored in the depositing/dispensing machine 1C. The memory unit 59 stores the inventory amount of each storage module 31.

When the escrow unit 51 and the collection cassette 53 are attached to the depositing/dispensing machine 1C, the escrow unit 51 and the collection cassette 53 are also connected to the control unit 513, and are operated by the control signals output from the control unit 513. A display unit 511 may optionally be connected to the control unit 513.

The control unit 513 controls the units 21, 23, 25, 3, 41, 43, 51, 53, 55, 57, 59, and 511 based on a command sent from the higher-ranking machine T through the communication unit 57, and/or various commands sent through the operation unit 55. Thus, the depositing/dispensing machine 1C can perform various counting processes, such as the depositing process, and other processes. Basic functions of the depositing/dispensing machine 1C will be described below.

(Function of Money Handling Apparatus of Third Type)

Like the depositing/dispensing machine 1A, the depositing/dispensing machine 1C has the LED display function, the power saving function, the shut down function, and the occupying function. The depositing/dispensing machine 1C can perform various counting processes, such as the direct depositing process etc., like the depositing/dispensing machine 1A. However, details of the processes may be different due to the difference in configuration. Thus, the processes will be described in detail below.

(Direct Depositing Process)

A direct depositing process is performed to deposit (store) the banknotes in the depositing/dispensing machine 1C. The banknotes placed in the inlet 211 are stored in any one of the storage modules 31 based on the results of the recognition by the recognition unit 25, and the predetermined types (denomination, fitness, etc.) of the banknotes allocated to the storage modules 31.

Figure 33:
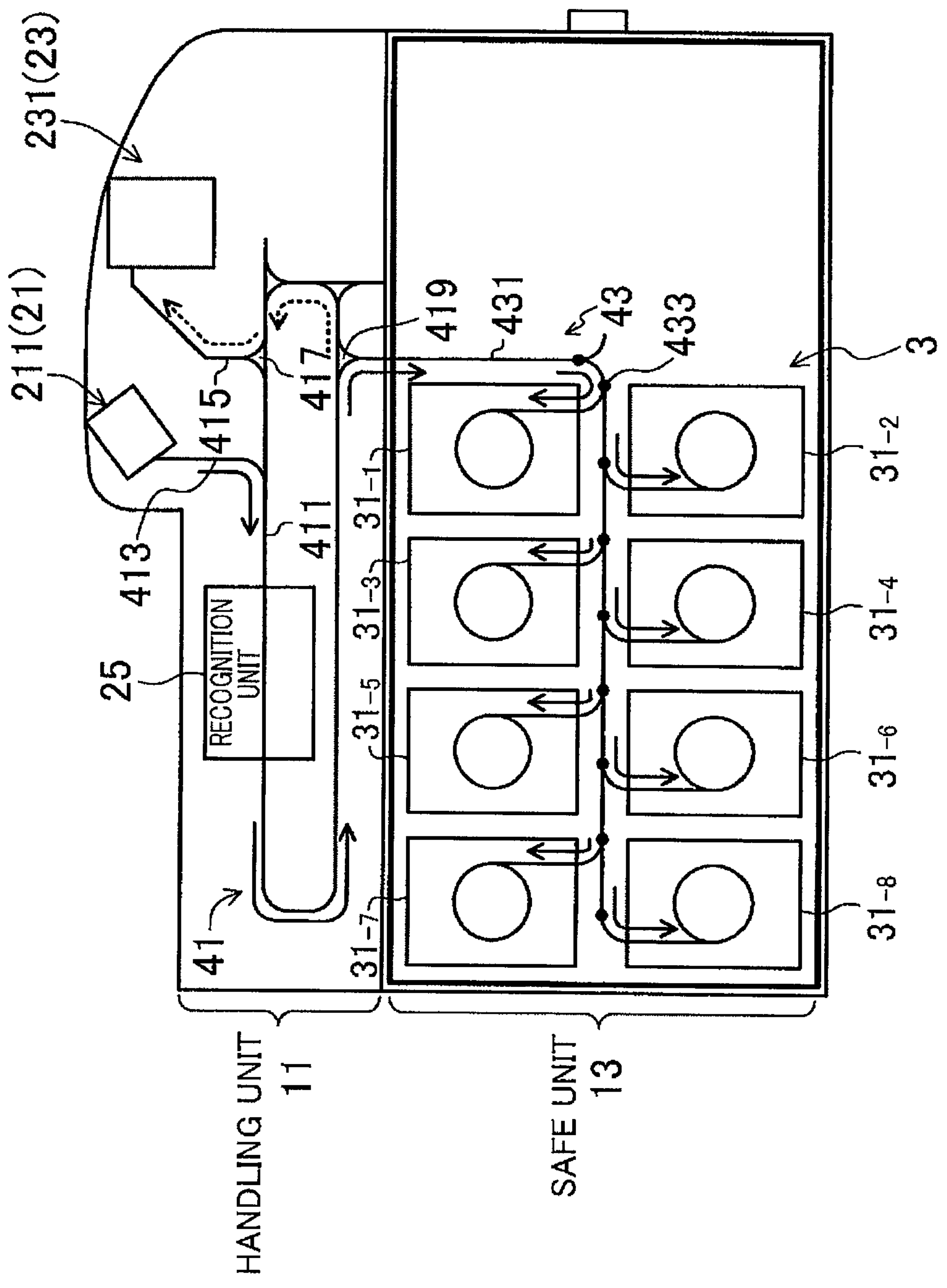
FIG. 33 shows how the money handling apparatus of the third type is operated in a direct depositing process.

FIG. 33 shows how the depositing/dispensing machine 1C is operated in the depositing process. When the banknotes are placed in the inlet 211, a command to start the depositing process is input to the depositing/dispensing machine 1C by operating the higher-ranking terminal T etc. As indicated by solid arrows in FIG. 33, the depositing unit 21 feeds the banknotes in the inlet 211 one by one, and the upper transport unit 41 transports the banknotes to the recognition unit 25. The recognition unit 25 recognizes the banknotes.

The banknotes recognized as the normal banknotes are transported by the upper transport unit 41 from the looped transport path 411 to the lower transport unit 43 through the first diverter 419. The lower transport unit 43 stores the normal banknotes in the predetermined storage module 31 based on the results of the recognition by the recognition unit 25, and the predetermined types allocated to the storage modules 31. Specifically, the normal banknotes are stored in any one of the storage modules 31 based on the denomination or fitness.

The banknotes recognized as the rejected banknotes are transported by the upper transport unit 41 from the looped transport path 411 to the dispensing path 415 through the diverter 417 as indicated by dashed arrows in FIG. 33. Thus, the rejected banknotes are dispensed to the outlet 231. The banknotes rejected in the depositing process are placed in the inlet 211 again, and are recognized again.

The overflowed banknotes are dispensed to the outlet 231. When the depositing/dispensing machine 1C is provided with the collection cassette 53, the overflowed banknotes are stored in the collection cassette 53. After the depositing process is finished, the inventory amount stored in the memory unit 59 is updated.

(Depositing Process)

In a depositing process, when the depositing/dispensing machine 1C is provided with the escrow unit 51, the banknotes are not directly stored in the storage module 31, but are temporarily stored in the escrow unit 51. Then, the banknotes are stored in the predetermined storage module 31 after checking the results of the counting.

Figure 34:
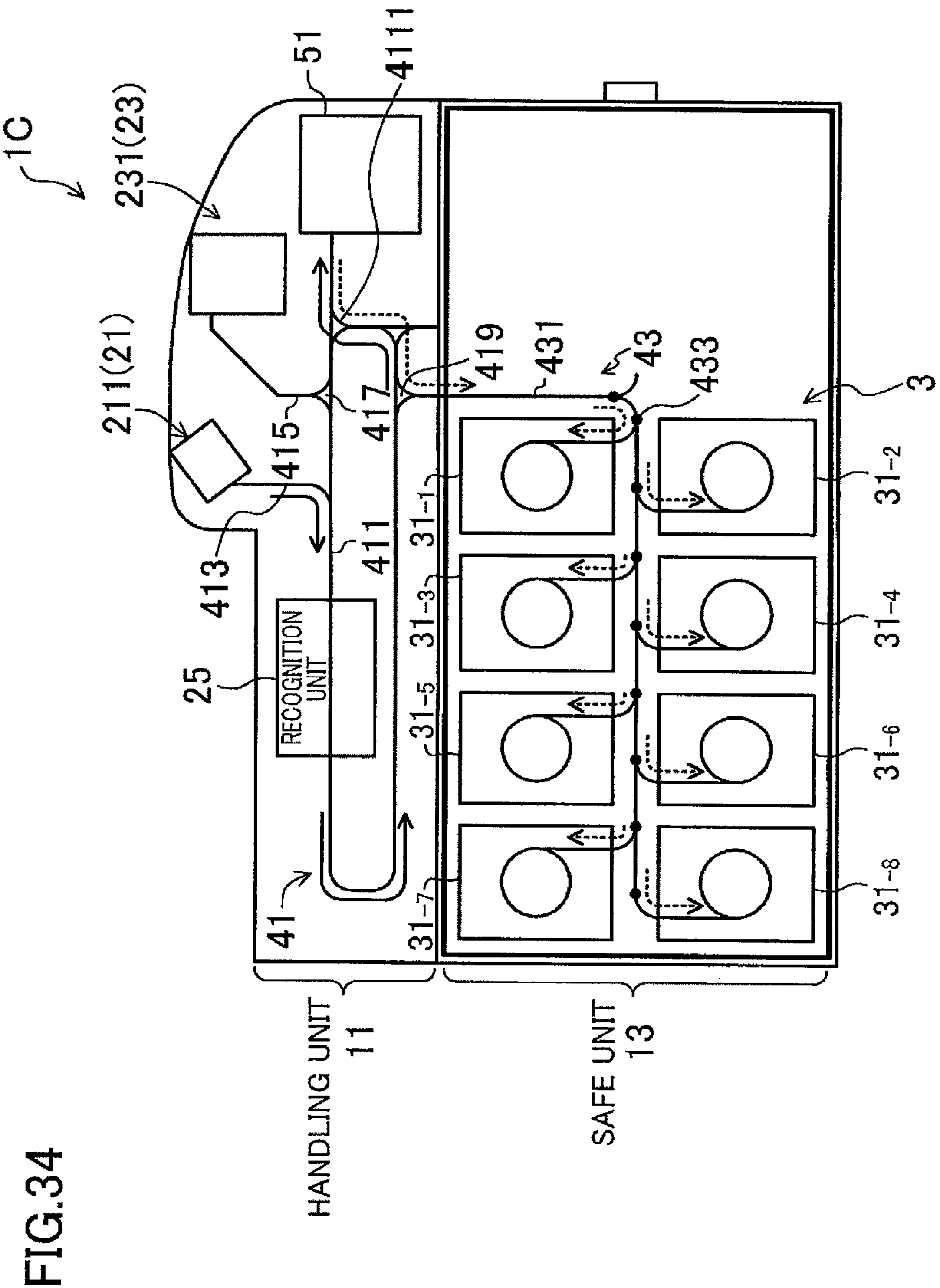
FIG. 34 shows how the money handling apparatus of the third type is operated in a depositing process.

FIG. 34 shows an example of the depositing process. In this case, the normal banknotes are transported from the looped transport path 411 to the escrow unit 51 through the second diverter 4111 as indicated by solid arrows in FIG. 34, and stored therein. The rejected banknotes are dispensed to the outlet 231.

When all the banknotes placed in the inlet 211 are fed, and all the banknotes to be deposited are recognized, the higher-ranking terminal T etc. displays the results of the counting. An operator checks the results of the counting, and performs predetermined storing operation at the higher-ranking terminal T etc. Then, the escrow unit 51 feeds the banknotes stored therein one by one as indicated by dashed arrows in FIG. 34. The upper transport unit 41 transports the banknotes from the looped transport path 411 to the lower transport unit 43 through the first diverter 419.

The lower transport unit 43 stores the banknotes in the corresponding storage modules 31 based on the denomination and fitness according to the results of the recognition by the recognition unit 25, and the predetermined types allocated to the storage modules 31. When the operator has performed canceling operation instead of the storing operation, the banknotes stored in the escrow unit 51 are dispensed to the outlet 231.

(Sorting Counting Process)

In a sorting counting process, the banknotes placed in the inlet 211 are recognized and counted, and then the denomination of the banknote which is recognized first as the fit banknote by the recognition unit 25 is selected as the target denomination to be handled in the sorting counting process. The banknotes of the target denomination are stored in the escrow unit 51, and the banknotes of the other denominations are dispensed to the outlet 231. This process can be performed when the depositing/dispensing machine 1C is provided with the escrow unit 51.

Figure 35:
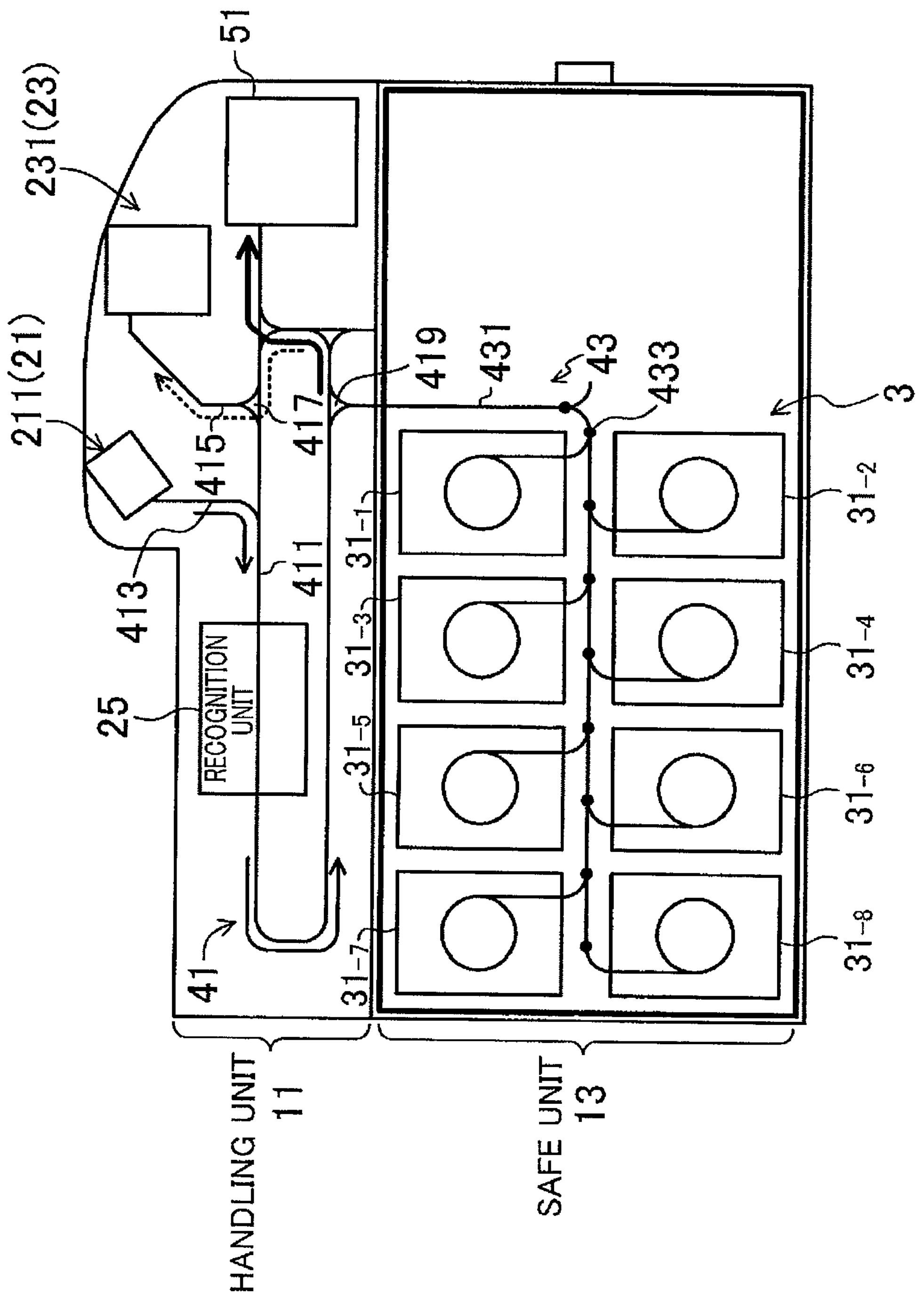
FIG. 35 shows how the money handling apparatus of the third type is operated in a sorting counting process.

FIG. 35 shows how the sorting counting process is performed. When the banknotes are placed in the inlet 211, the sorting counting process is started by performing predetermined operation at the higher-ranking terminal T etc. As indicated by solid arrows in FIG. 35, the depositing unit 21 feeds the banknotes in the inlet 211 one by one, and the upper transport unit 41 transports the banknotes to the recognition unit 25. The recognition unit 25 recognizes the banknotes.

Then, as indicated by thick solid arrows in FIG. 35, the upper transport unit 41 transports the normal banknotes of the same denomination as the banknote which is recognized first as the fit banknote by the recognition unit 25 to the escrow unit 51, and stores the normal banknotes therein. The other banknotes are all dispensed to the outlet 231 as indicated by dashed arrows in FIG. 35. The banknotes of the target denomination stored in the escrow unit 51 are dispensed to the outlet 231 in a returning process described later.

The depositing/dispensing machine 1C is capable of checking the orientation of the banknotes. Thus, in the sorting counting process, the banknotes of the same orientation can be selected and stored in the escrow unit 51, and the banknotes of the target denomination can be arranged with the same surfaces facing the same direction.

(Counting Process)

In a counting process, the banknotes placed in the inlet 211 are recognized and counted, and dispensed to the outlet 231.

Figure 36:
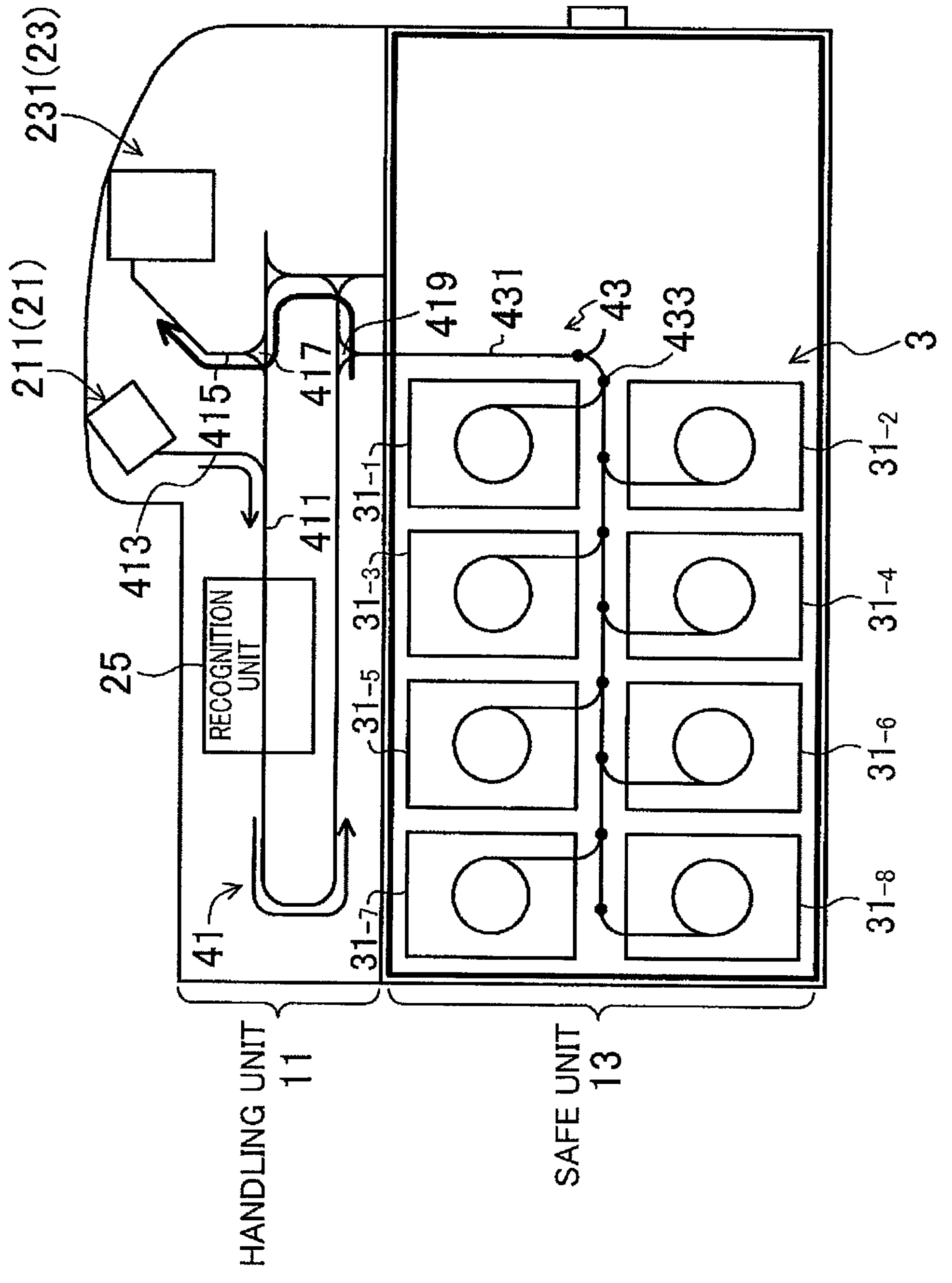
FIG. 36 shows how the money handling apparatus of the third type is operated in a counting process.

FIG. 36 shows how the counting process is performed. When the banknotes are placed in the inlet 211, the counting process is started by performing predetermined operation at the higher-ranking terminal T etc. As indicated by solid arrows in FIG. 36, the depositing unit 21 feeds the banknotes in the inlet 211 one by one, and the upper transport unit 41 transports the banknotes to the recognition unit 25. The recognition unit 25 recognizes the banknotes. As indicated by thick solid arrows in FIG. 36, all the recognized banknotes are dispensed to the outlet 231. The results of the recognition and the counting are displayed on the display unit 511 etc.

(Storing Process)

A storing process is performed to store the banknotes retained in the escrow unit 51 in the storage cassette 31, or in the escrow unit 51 in the collection cassette 53 if the depositing/dispensing machine 1C is provided with the collection cassette 53. This process is performed when the depositing/dispensing machine 1C is provided with the escrow unit 51.

Figure 37:
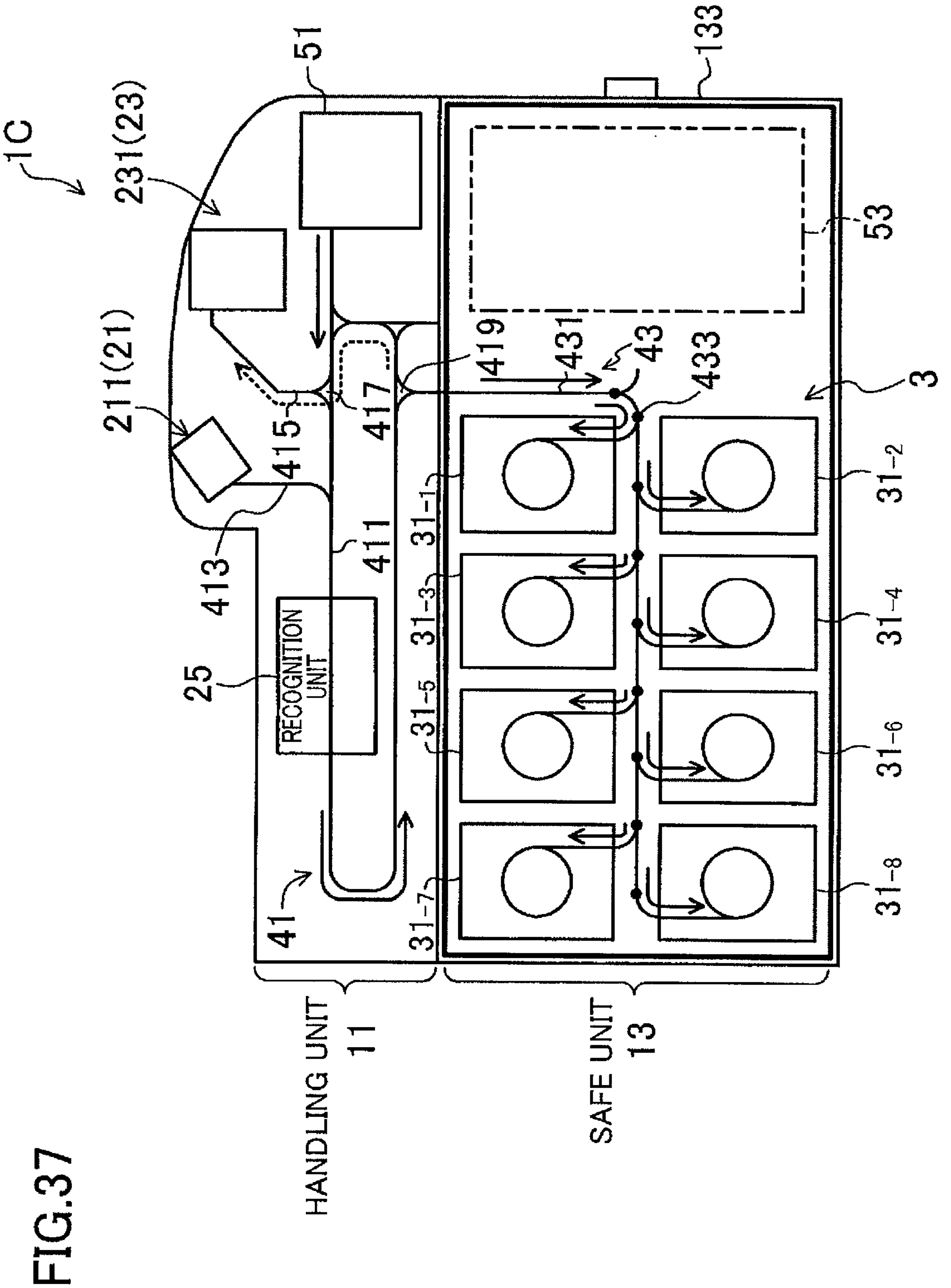
FIG. 37 shows how the money handling apparatus of the third type is operated in a storing process.

FIG. 37 shows how the storing process is performed. The storing process is started by performing predetermined operation at the higher-ranking terminal T etc. When the storing process is started, the escrow unit 51 feeds the banknotes to the upper transport unit 41 as indicated by solid arrows in FIG. 37. The fed banknotes are transported by the upper transport unit 41 to the recognition unit 25, and recognized. Based on the results of the recognition, the recognized banknotes are stored in the predetermined storage modules 31 through the upper transport unit 41 and the lower transport unit 43.

The banknotes which cannot be transported to the storage module 31, such as the rejected banknotes, and the banknotes which cannot be stored in the corresponding storage module 31 because the storage module is full, are stored in the collection cassette 53, if the collection cassette 53 is provided. When the collection cassette 53 is not provided, these banknotes are dispensed to the outlet 231 as indicated by dashed arrows in FIG. 37.

(Returning Process)

A returning process is performed to dispense the banknotes stored in the escrow unit 51 to the outlet 231. Thus, the returning process is performed when the depositing/dispensing machine 1C includes the escrow unit 51. This process can be performed in combination with the sorting counting process.

Figure 38:
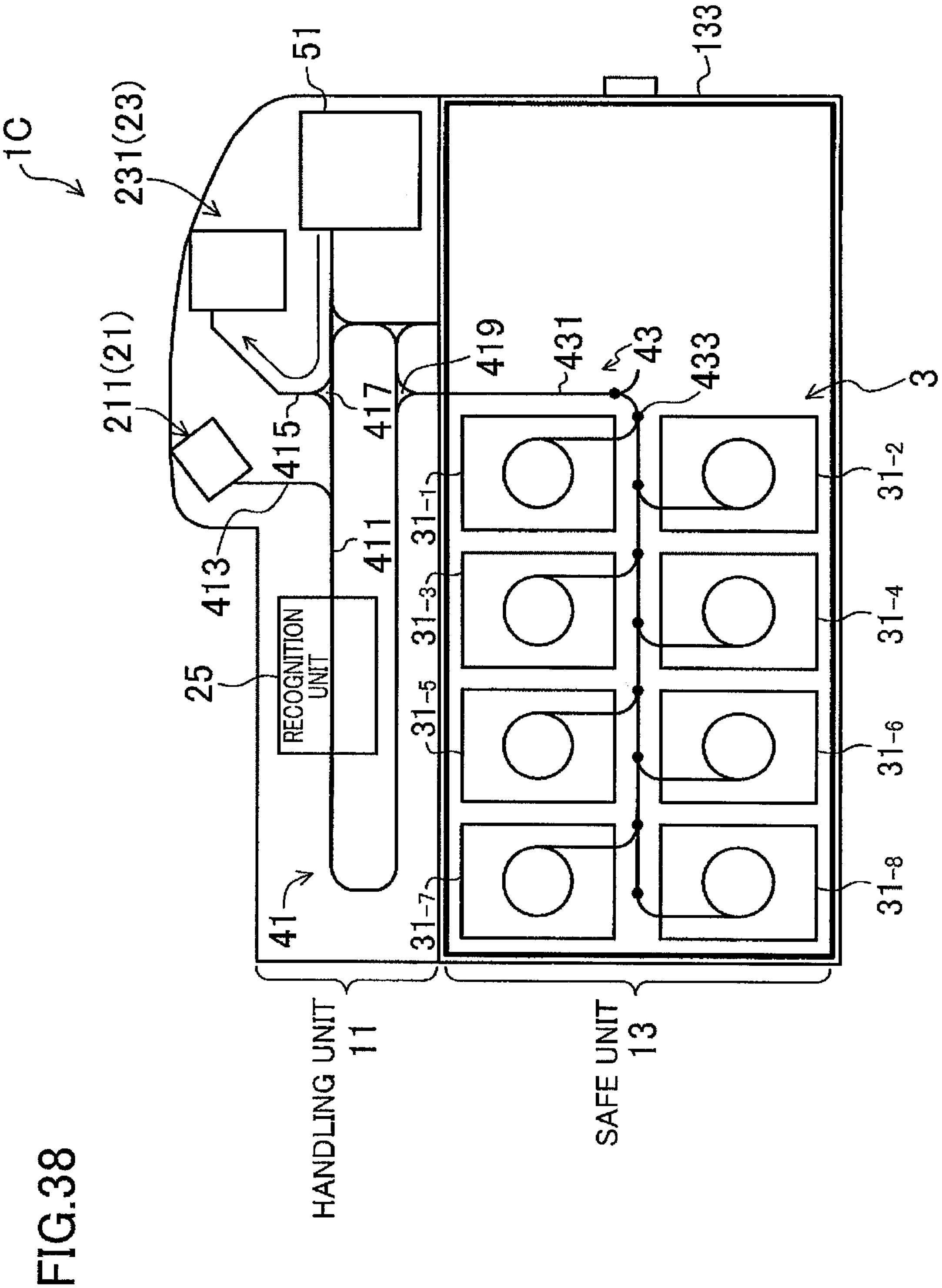
FIG. 38 shows how the money handling apparatus of the third type is operated in a returning process.

FIG. 38 shows how the returning process is performed. The returning process is started by performing predetermined operation at the higher-ranking terminal T etc. When the returning process is started, the escrow unit 51 feeds the banknotes to the upper transport unit 41 as indicated by solid arrows in FIG. 38. The fed banknotes are not transported to the recognition unit 25, but dispensed to the outlet 231 through the shortest path.

(Roll Back Process)

A roll back process is performed to dispense the specified number of the banknotes from the specified storage module 31 to recognize them, and to dispense the fit banknotes to the outlet 231.

Figure 39:
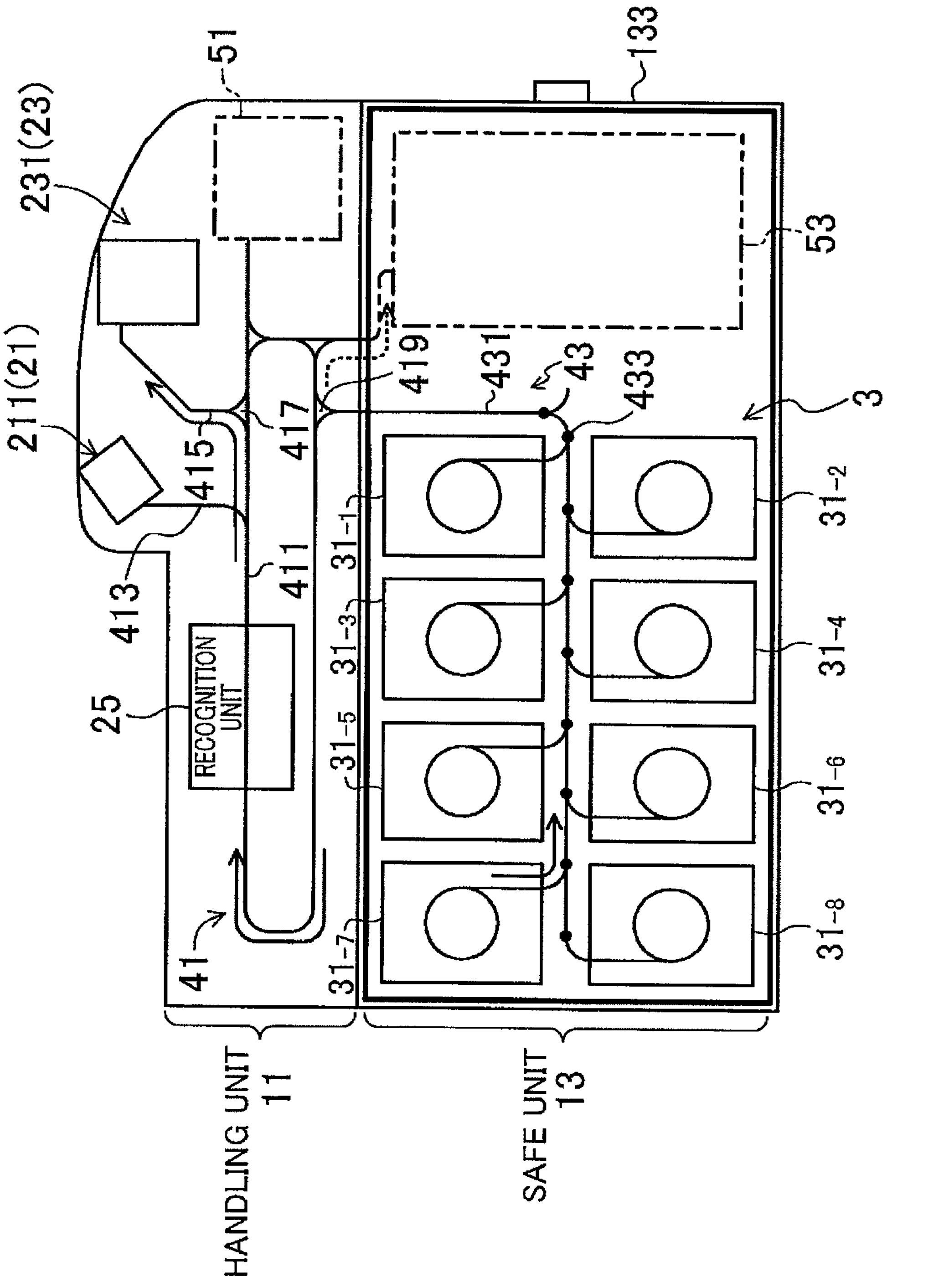
FIG. 39 shows how the money handling apparatus of the third type is operated in a roll back process.

FIG. 39 shows how the roll back process is performed. The roll back process is started by performing predetermined operation at the higher-ranking terminal T etc. In this example, the storage module $\mathbf{31}_{-7}$ is the specified module. When the roll back process is started, the banknotes are fed from the storage module $\mathbf{31}_{-7}$ as indicated by solid arrows in FIG. 39, and the fed banknotes are transported by the lower transport unit 43 and the upper transport unit 41 transport to the recognition unit 25, and recognized. The banknotes recognized as the fit banknotes by the recognition unit 25 are dispensed to the outlet 231. This process is repeated until the specified number of the banknotes is dispensed.

When the banknote is rejected in the roll back process, and the collection cassette 53 is available, the rejected banknote is transported to the collection cassette 53 as indicated by dashed arrows in FIG. 39, and stored therein. Then, the process is repeated until the specified number of the banknotes is dispensed. When the collection cassette 53 is not available, e.g., when the collection cassette 53 is not provided, or the collection cassette 53 is shut down, the rejected banknote is also dispensed to the outlet 231. In this case, the banknote as a substitute of the rejected banknote is not additionally fed, and the operator is informed that the banknote is not additionally fed.

(Dispensing Process)

In a dispensing process, the banknotes are fed from the corresponding storage module 31 to recognize them, and the fit banknotes are dispensed.

Figure 40:
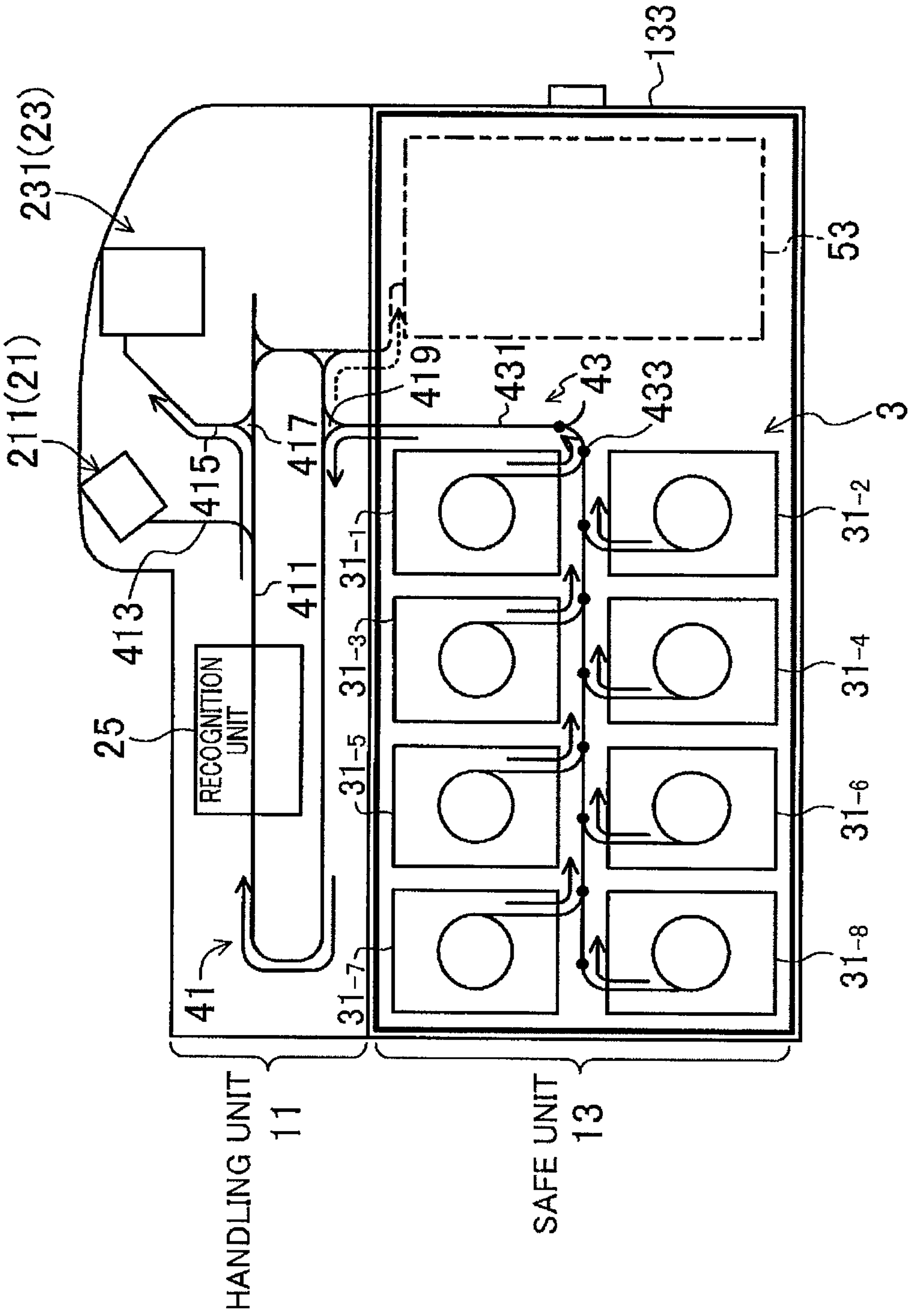
FIG. 40 shows how the money handling apparatus of the third type is operated in a dispensing process.

FIG. 40 shows how the dispensing process is performed. The dispensing process is started by performing predetermined operation of specifying the denomination and number of the banknotes to be dispensed at the higher-ranking terminal T etc. As indicated by solid arrows in FIG. 40, the specified number of the banknotes of the specified denomination is fed from the storage module 31. The lower transport unit 43 transports the fed banknotes to the upper transport unit 41. The upper transport unit 41 transports the banknotes to the recognition unit 25, and the recognition unit 25 recognizes the banknotes. Then, the recognized banknotes are transported to the dispensing unit 23. Thus, the banknotes are dispensed to the outlet 231.

When the number of the dispensed banknotes exceeds the capacity of the outlet 231, the banknotes are dispensed in several times (divisional dispensing process). Specifically, in the divisional dispensing process, the dispensing process is suspended when the number of the banknotes equal to or smaller than the capacity of the outlet 231 is dispensed to the outlet 231, and the banknotes are removed from the outlet 231. Then, the dispensing process is restarted. The suspension and restart of the process are repeated based on the number of the banknotes to be dispensed.

When the banknote is rejected in the dispensing process, and the collection cassette 53 is available, the rejected banknote is transported to the collection cassette 53 as indicated by dashed arrows in FIG. 40, and stored therein. Then, the process is repeated until the specified number of the banknotes is dispensed. When the collection cassette 53 is not available, e.g., when the collection cassette 53 is not provided, or the collection cassette 53 is shut down, the rejected banknote is also dispensed to the outlet 231. In this case, the banknote as a substitute of the rejected banknote is not additionally fed, and the operator is informed that the banknote is not additionally fed.

In the dispensing process, order of dispensing the banknotes can be set. The dispensing order can be set by selecting the order of the banknotes at the higher-ranking terminal T etc. For example, when two or more storage modules 31 are configured to store the banknotes of the same denomination, the banknotes can be dispensed in order of the number of the storage modules. The banknotes can be dispensed in order of the number of the denominations set as the denominations to be received. The banknotes can be dispensed in order of length or size thereof.

In the dispensing process, the banknotes can be dispensed in a batch of the predetermined number of the banknotes (batch process). The batch process can be performed by, for example, selecting the batch process at the higher-ranking terminal T etc. When the batch process is selected, the dispensing process is suspended when the predetermined number of the banknotes are dispensed. Then, the dispensing process is restarted after the banknotes in the outlet 231 are removed. When the denomination is changed, the dispensing process is suspended to wait for the removal of the banknotes from the outlet 231. Thus, the dispensed banknotes can be handled according to the denominations.

In the dispensing process, the operator can select continuous dispensing in which the banknotes are continuously fed from two or more storage modules 31, or separate dispensing in which the banknotes fed from one of the storage modules 31 are all dispensed to the outlet 231, and then the banknotes are fed from another storage module 31. The continuous dispensing is advantageously performed in a short time, while the separate dispensing advantageously classifies the dispensed banknotes by denomination.

The setting of the dispensing order, the batch process, and the separate dispensing can be performed on the storage module 31 to which a single denomination is allocated. These processes cannot be performed on the storage module 31 to which multiple denominations are allocated because the banknotes of different denominations are stored therein.

Figure 41:
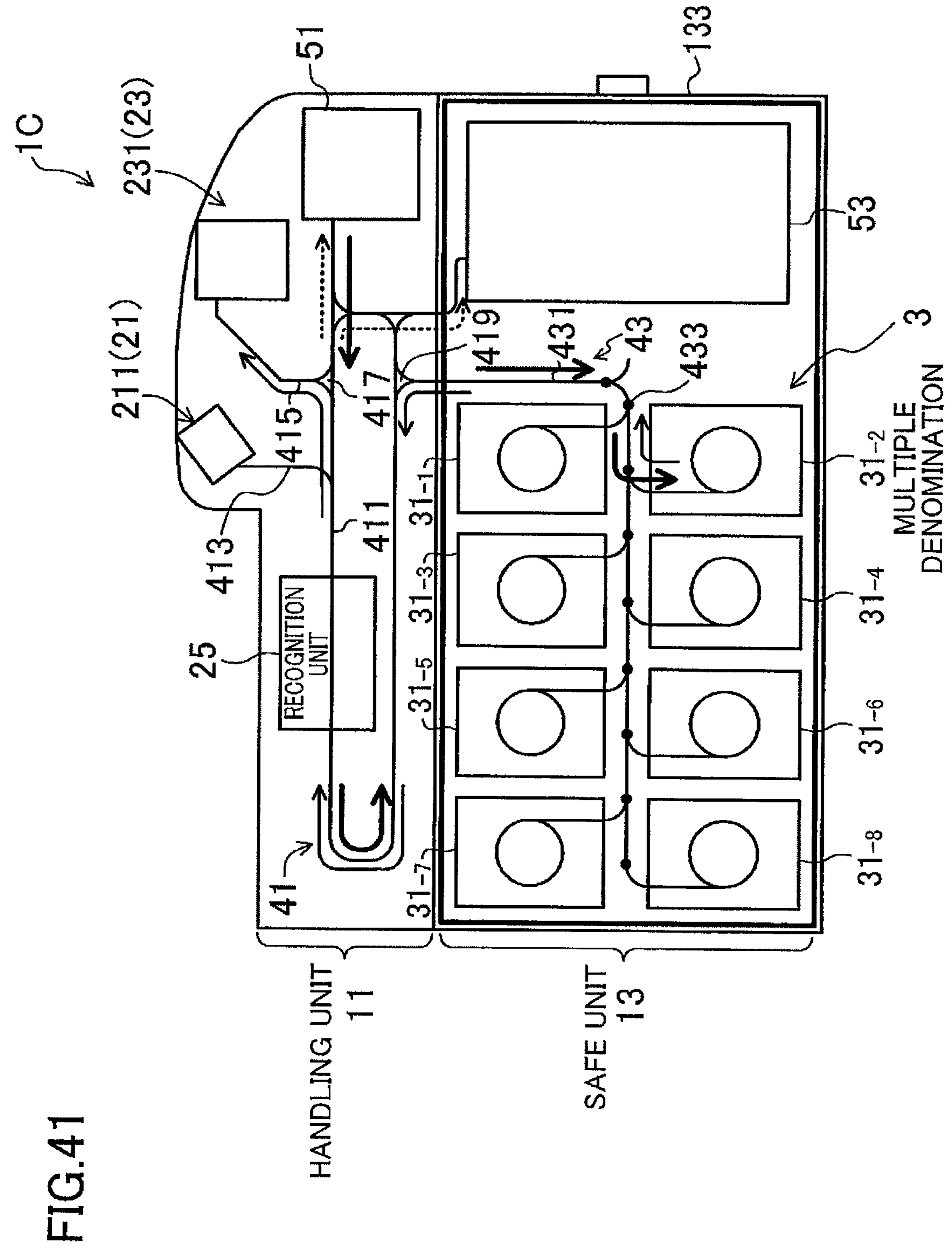
FIG. 41 shows how the money handling apparatus of the third type is operated in the dispensing process.

FIG. 41 shows how the dispensing process is performed when the storage unit 3 includes the multiple denomination storage module 31. In the example shown in FIG. 41, multiple denominations are allocated to the storage module $\mathbf{31}_{-2}$, while a single denomination is allocated to each of the other storage modules 31. The banknotes can be dispensed from the multiple denomination storage module 31 when the depositing/dispensing machine 1C is provided with the escrow unit 51 and the collection cassette 53.

The banknotes stored in the storage module $\mathbf{31}_{-2}$ are fed and transported to the recognition unit 25 as indicated by solid arrows in FIG. 41. After the recognition by the recognition unit 25, the banknotes to be dispensed are dispensed to the outlet 231. As indicated by dashed arrows in FIG. 41, the rejected banknote is stored in the collection cassette 53, and surplus banknotes are stored in the escrow unit 51. Then, the surplus banknotes stored in the escrow unit 51 are transported in a reverse direction as indicated by thick solid arrows in FIG. 41, and stored in the original storage module $\mathbf{31}_{-2}$.

(All Banknote Dispensing Process)

An all banknote dispensing process is performed to dispense all the banknotes stored in the specified storage module 31 to the outlet 231 to empty the specified storage module 31.

Figure 42:
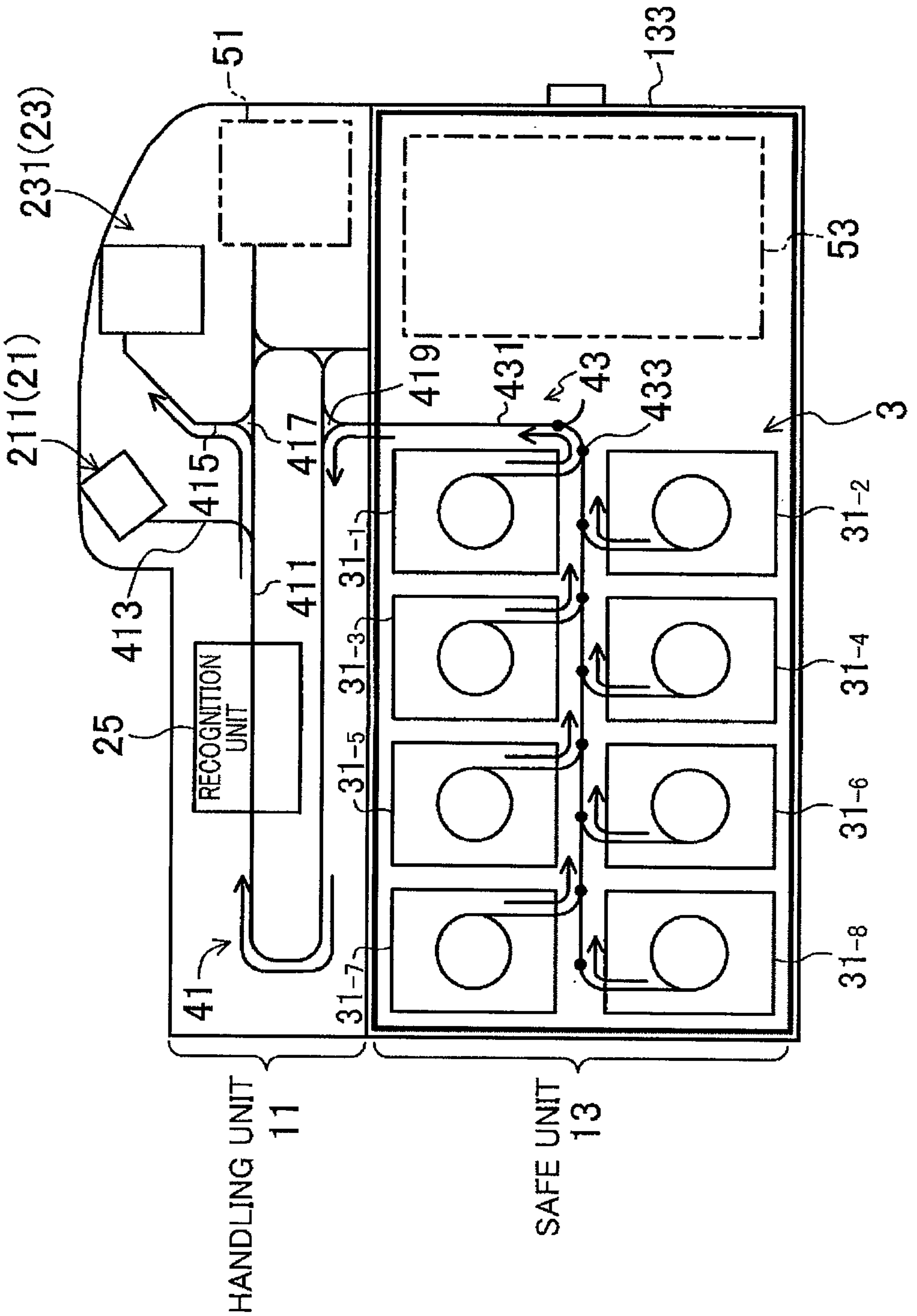
FIG. 42 shows how the money handling apparatus of the third type is operated in an all banknote dispensing process.

FIG. 42 shows how the all banknote dispensing process is performed. The all banknote dispensing process is started by performing predetermined operation at the higher-ranking terminal T etc. As indicated by solid arrows in FIG. 42, the banknotes are fed from the specified storage module 31. The lower transport unit 43 transports the fed banknotes to the upper transport unit 41. The upper transport unit 41 transports the banknotes to the recognition unit 25, and the recognition unit 25 recognizes the banknotes. Then, all the banknotes including the rejected banknote are transported to the dispensing unit 23. Thus, the banknotes are dispensed to the outlet 231 until the specified storage module 31 is empty.

(Collection Process)

A collection process is performed to transport the banknotes of the specified denomination from the storage module 31 storing the banknotes to the collection cassette 53. Thus, the collection process is performed when the collection cassette 53 is available.

Figure 43:
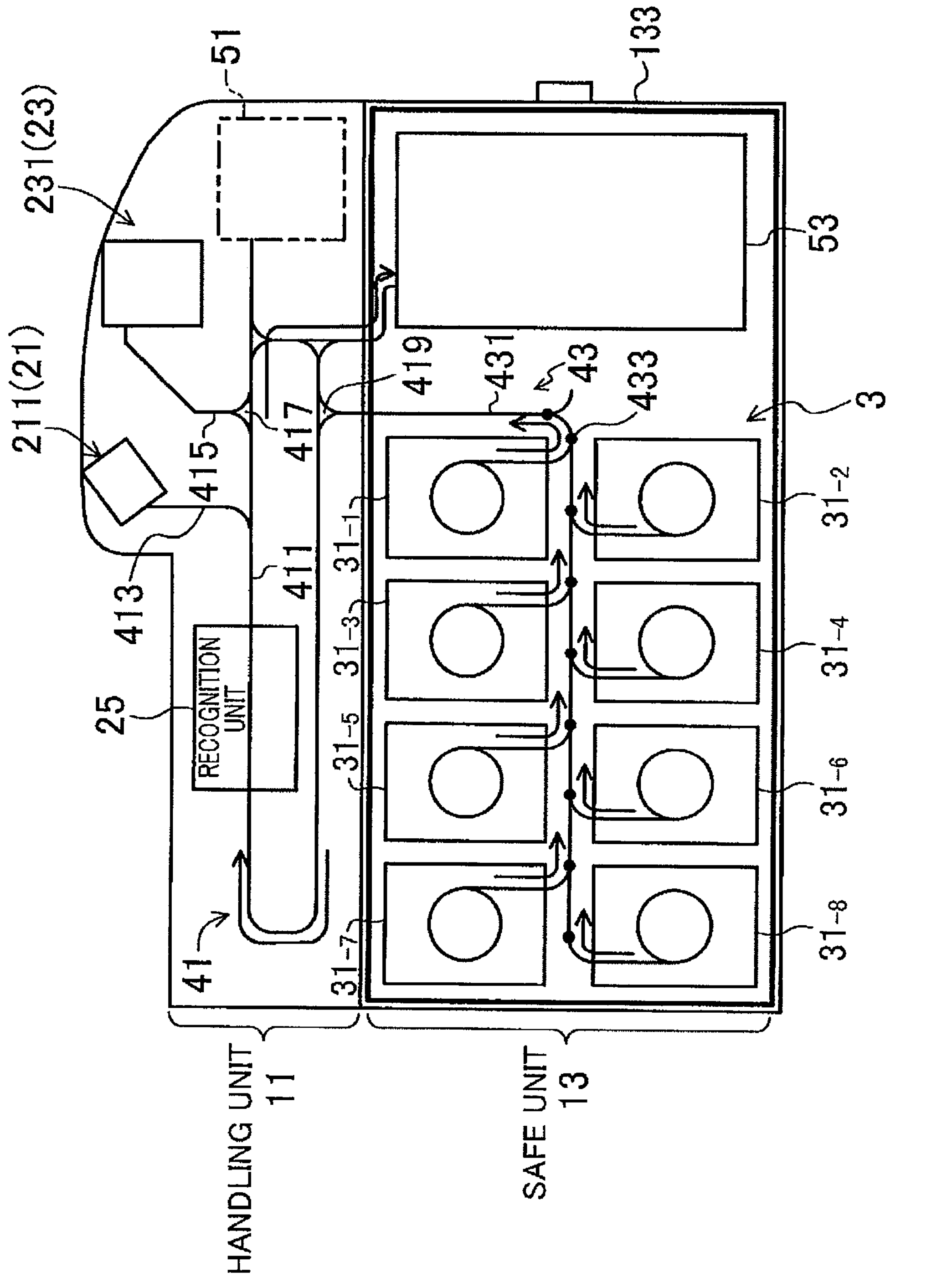
FIG. 43 shows how the money handling apparatus of the third type is operated in a collection process.

FIG. 43 shows how the collection process is performed. The collection process is started by performing predetermined operation of specifying the denomination and the number of the banknotes at the higher-ranking terminal T etc. . . . As indicated by solid arrows in FIG. 43, only the specified number of the banknotes of the specified denomination is fed from the storage module 31. The lower transport unit 43 transports the fed banknotes to the upper transport unit 41. The upper transport unit 41 transports the banknotes to the recognition unit 25, and the recognition unit 25 recognizes the banknotes. Then, the banknotes are transported to the collection cassette 53.

In the collection process, order of dispensing the banknotes can be set. The dispensing order can be set by selecting the order of collecting the banknotes at the higher-ranking terminal T etc. For example, when two or more storage modules 31 are configured to store the banknotes of the same denomination, the banknotes can be collected in order of the number of the storage modules. The banknotes can be dispensed in order of the number of the denominations set as the denominations to be received. The banknotes can be collected in order of length or size thereof.

In the collection process, the operator can select continuous collection in which the banknotes are continuously fed from two or more storage modules 31, or separate collection in which the banknotes fed from one of the storage modules 31 are all collected in the collection cassette 53, and then the banknotes are fed from another storage module 31. The continuous collection is advantageously performed in a short time, while the separate collection advantageously classifies the collected banknotes by denomination.

The setting of the collecting order, and the separate collection can be performed on the storage module 31 to which a single denomination is allocated. These processes cannot be performed on the storage module 31 to which multiple denominations are allocated because the banknotes of different denominations are stored therein.

Figure 44:
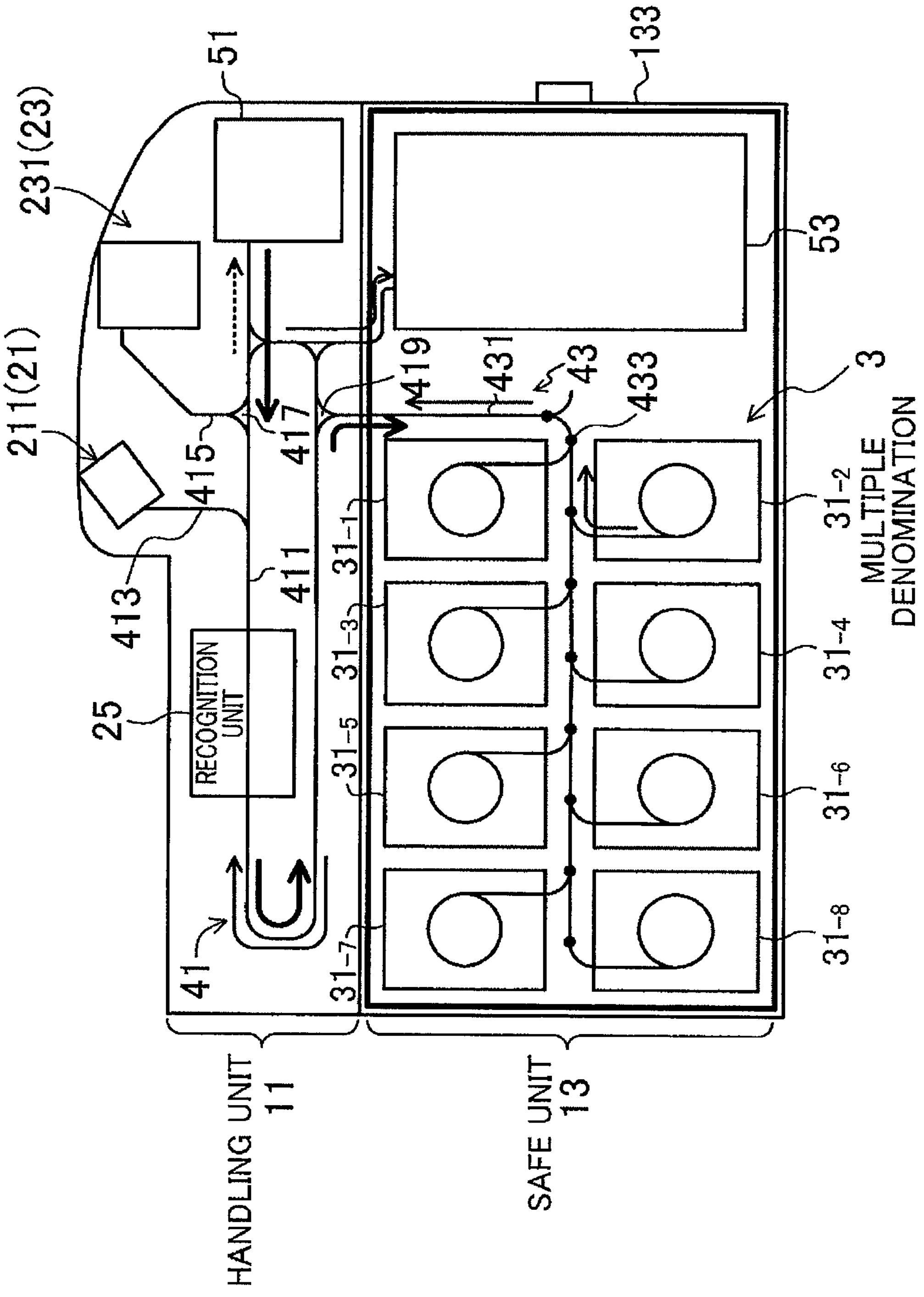
FIG. 44 shows how the money handling apparatus of the third type is operated in the collection process.

FIG. 44 shows how the collecting process is performed when the storage unit 3 includes the multiple denomination storage module 31. In the example shown in FIG. 44, multiple denominations are allocated to the storage module $\mathbf{31}_{-2}$, while a single denomination is allocated to each of the other storage modules 31. The banknotes can be collected from the multiple denomination storage module 31 when the depositing/dispensing machine 1C is provided with the escrow unit 51 and the collection cassette 53.

The banknotes stored in the storage module $\mathbf{31}_{-2}$ are fed and transported to the recognition unit 25 as indicated by solid arrows in FIG. 44. After the recognition by the recognition unit 25, the banknotes to be dispensed are stored in the collection cassette 53. As indicated by dashed arrows in FIG. 44, surplus banknotes are stored in the escrow unit 51. Then, the surplus banknotes stored in the escrow unit 51 are transported in a reverse direction as indicated by thick solid arrows in FIG. 44, and stored in the original storage module $\mathbf{31}_{-2}$.

In the collection process, when the banknotes except for the fit banknotes, such as the unfit banknotes, the banknotes whose authenticity cannot be determined, etc., (may be referred to as banknotes of different types) are stored in the storage module 31, these banknotes can be transported to a predetermined destination in the predetermined order. The predetermined destination may be, for example, the collection cassette 53 or the outlet 231. In this case, the number of the banknotes cannot be specified, and all the banknotes of different types stored in the storage module 31 are transported.

Figure 45:
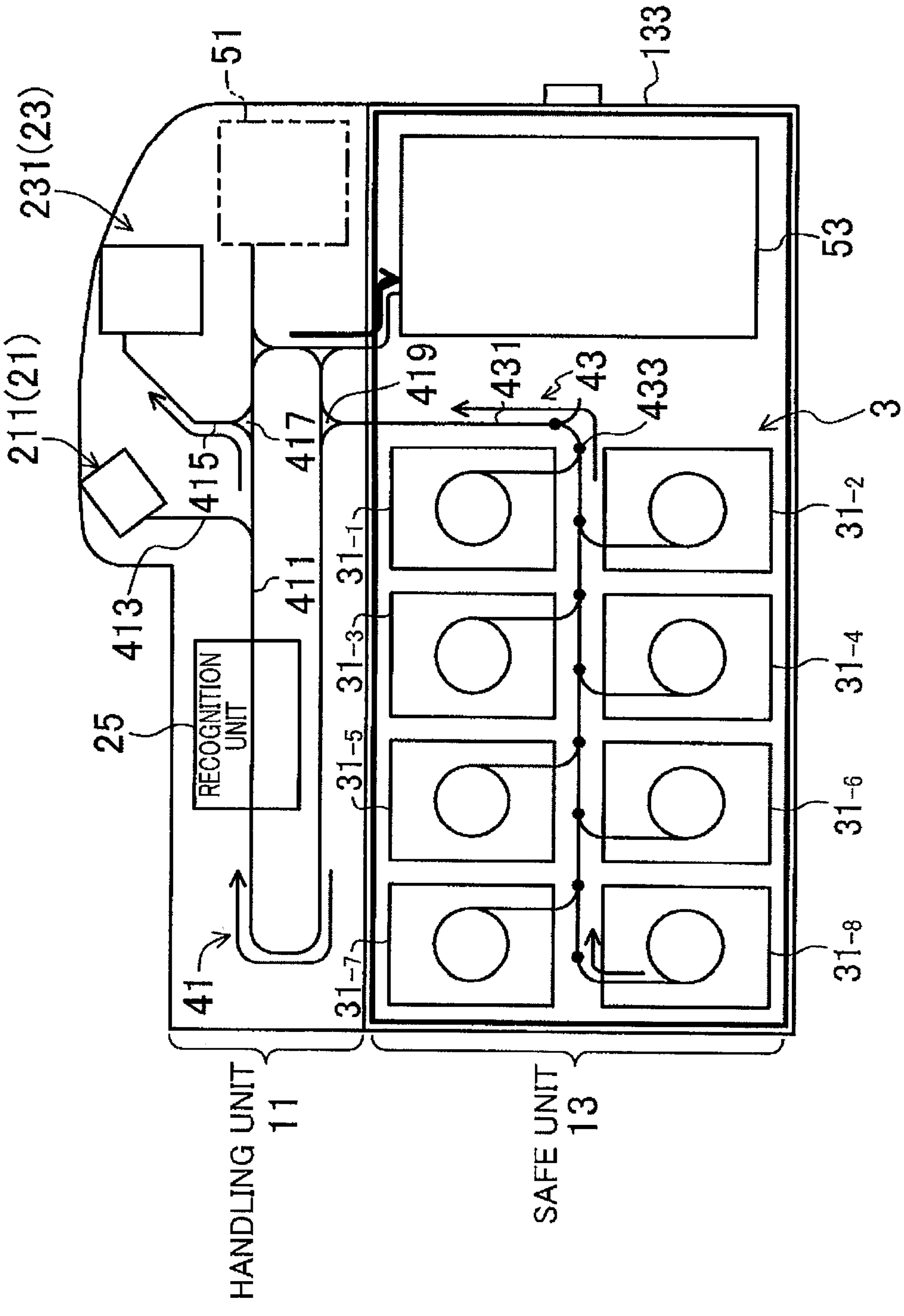
FIG. 45 shows how the money handling apparatus of the third type is operated in the collection process.

FIG. 45 shows an example of the above case. In the example of FIG. 45, the storage module $\mathbf{31}_{-8}$ stores the banknotes of different types, and the other storage modules 31 stores the fit banknotes. When the outlet 231 is specified as the destination, the banknotes of different types fed from the storage module $\mathbf{31}_{-8}$ are transported to the recognition unit 25 through the lower transport unit 43 and the upper transport unit 41 as indicated by solid arrows in FIG. 45. After the recognition by the recognition unit 25, the banknotes are dispensed to the outlet 231. When the collection cassette 53 is specified as the destination, the banknotes are transported to the collection cassette 53 as indicated by thick solid arrows in FIG. 45.

When the storage unit 3 includes the storage module 31 containing the banknotes of different types, the banknotes of the specified denomination are collected in order of the single denomination storage module 31, the multiple denomination storage module 31, and the storage module 31 containing the banknotes of different types.

(Partial Collection Process)

In a partial collection process, the banknotes of the specified denomination are collected while only the specified number of the banknotes of the specified denomination is left in the storage module. The partial collection process is performed on every storage module 31 on different denominations. The partial collection process can be performed when the depositing/dispensing machine 1C is provided with at least the escrow unit 51.

Figure 46:
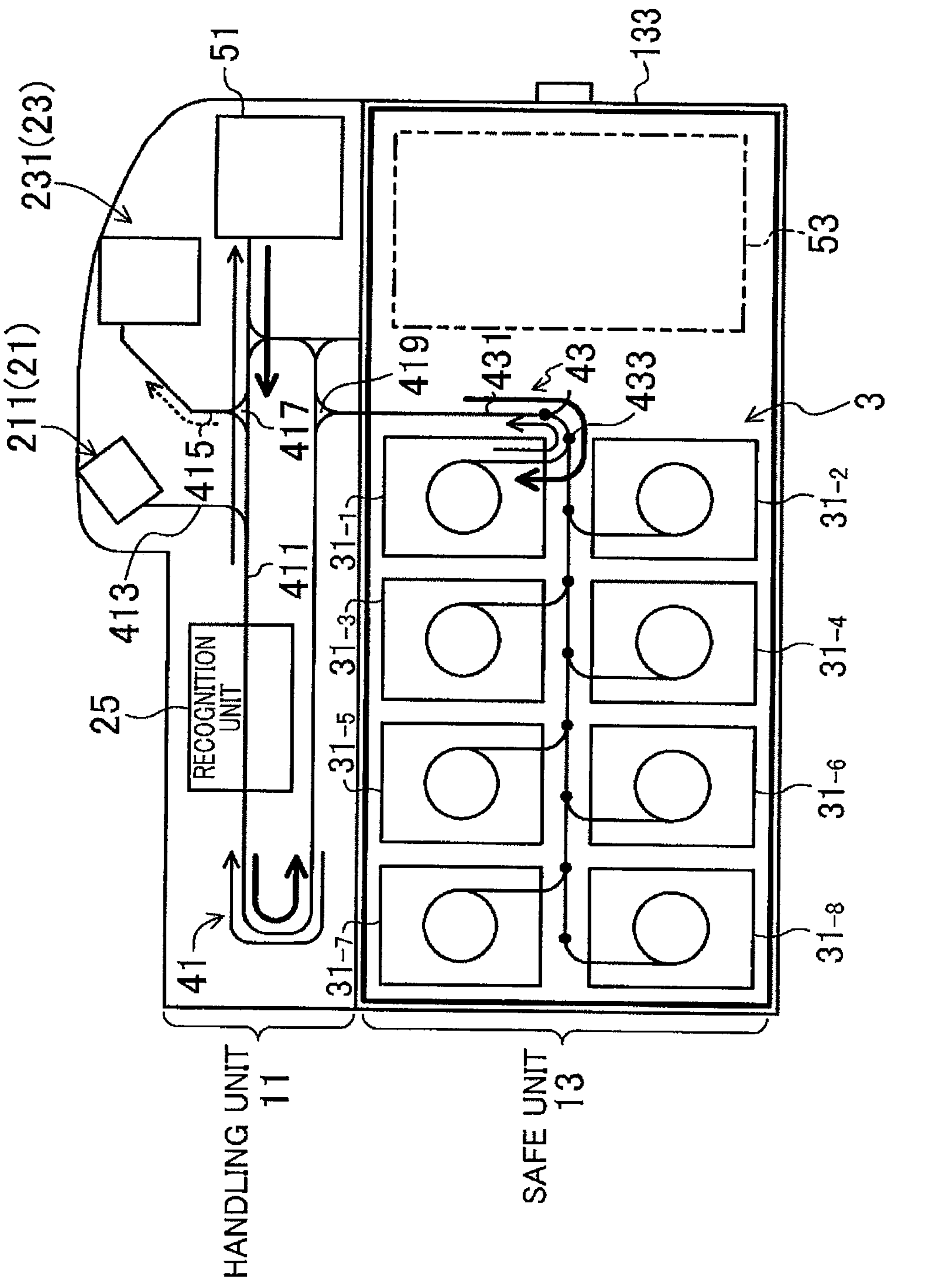
FIG. 46 shows how the money handling apparatus of the third type is operated in a partial collection process.

FIG. 46 shows how the partial collection process is performed when the depositing/dispensing machine 1C is provided with the escrow unit 51 only. The partial collection process is started when predetermined operation of specifying the denomination, the number of the banknotes to be left in the storage module, and the target storage module 31 is performed at the higher-ranking terminal T etc. In this case, when the all the banknotes are specified to be left, the process is similar to the reconciliation process.

In the example of FIG. 46, the storage module $\mathbf{31}_{-1}$ is specified as the target storage module. As indicated by solid arrows in FIG. 46, the banknotes of the specified denomination are fed from the storage module $\mathbf{31}_{-1}$, and the lower transport unit 43 transports the fed banknotes to the upper transport unit 41. The upper transport unit 41 transports the banknotes to the recognition unit 25, and the recognition unit 25 recognizes the banknotes. After the recognition, the fit banknotes are transported to the escrow unit 51, and stored therein. The rejected banknotes are dispensed to the outlet 231 as indicated by dashed arrows in FIG. 46.

After all the banknotes are fed from the storage module $\mathbf{31}_{-1}$, the banknotes stored in the escrow unit 51 are fed and transported through a reverse transport path as indicated by thick solid arrows in FIG. 46, and stored in the storage module $\mathbf{31}_{-1}$ until the specified number of the banknotes are left therein. When the specified number of the banknotes is left in the storage module, the partial collection process is finished, and information that the partial collection process on the banknotes of the target denomination is finished is stored.

Figure 47:
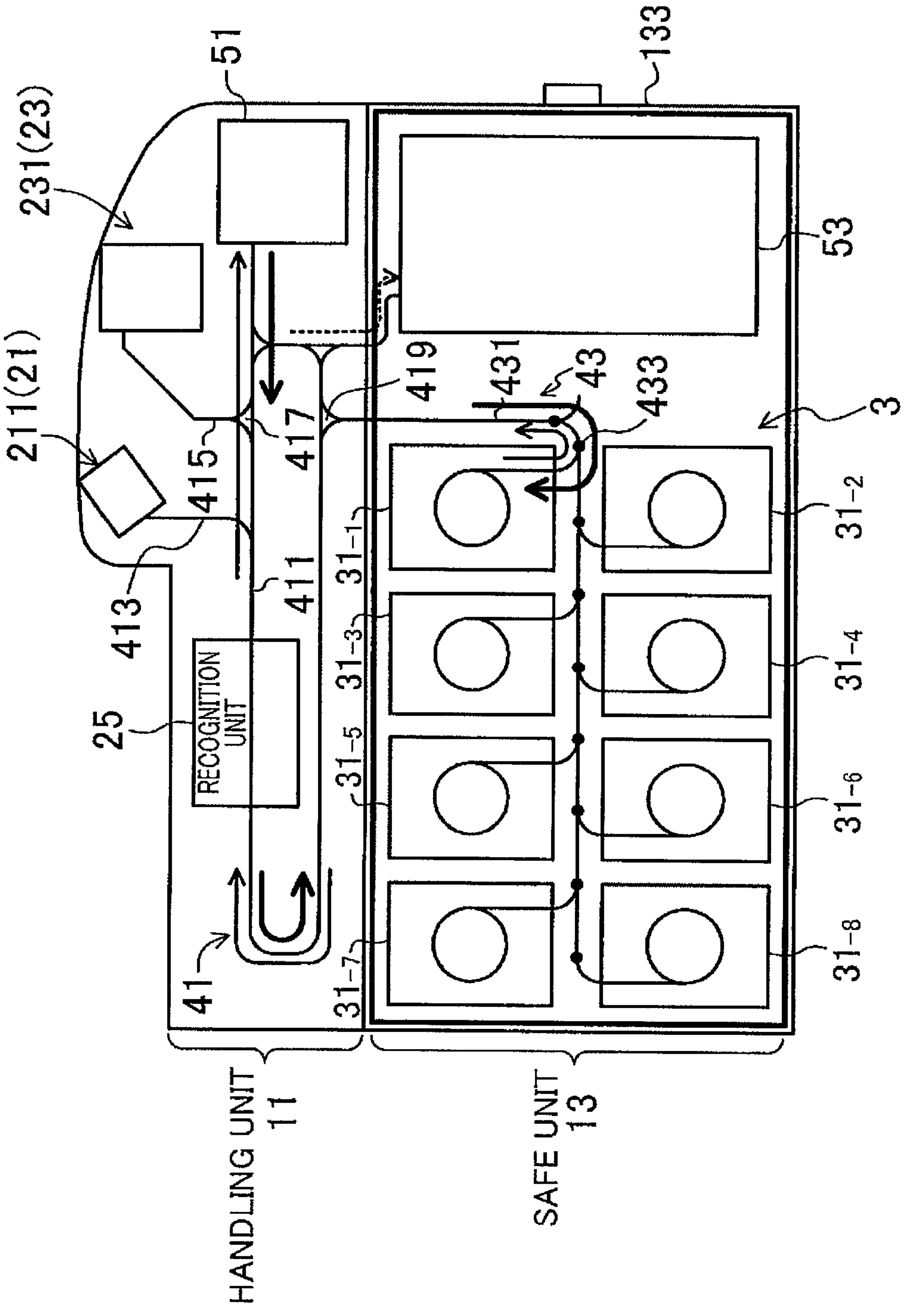
FIG. 47 shows how the money handling apparatus of the third type is operated in the partial collection process.

FIG. 47 shows how the partial collection process is performed when the depositing/dispensing machine 1C is provided with both of the escrow unit 51 and the collection cassette 53. In the example shown in FIG. 47, the storage module $\mathbf{31}_{-1}$ is specified as the target storage module, and the partial collection process is started by performing predetermined operation of specifying the denomination, the number of the banknotes to be left, and the target storage module 31 at the higher-ranking terminal T etc.

Also in this case, the banknotes of the specified denomination are fed from the storage module $\mathbf{31}_{-1}$ as indicated by solid arrows in FIG. 47. The banknotes recognized as the fit banknotes by the recognition unit 25 are transported to the escrow unit 51, and stored therein. The banknotes recognized as the rejected banknotes are transported to the collection cassette 53 as indicated by dashed arrows in FIG. 47, and stored therein.

Once the specified number of the fit banknotes to be left is stored in the escrow unit 51, the other fit banknotes are transported to the collection cassette 53 and stored therein. When there is another storage module 31 which stores the banknotes of the specified denomination, these banknotes are also transported to the collection cassette 53 and stored therein.

Then, as indicated by thick solid arrows in FIG. 47, the banknotes stored in the escrow unit 51 are fed and transported through a reverse transport path, and stored in the original storage module $\mathbf{31}_{-1}$. Then, information that the partial collection process on the banknotes of the target denomination is finished is stored.

In the partial collection process, order of collecting the banknotes can be set in the same manner as the collection process. However, the collecting order cannot be set on the multiple denomination storage module 31 because the banknotes of different denominations are stored therein. The partial collection process is performed on the multiple denomination storage module 31 after the partial collection process is performed on the single denomination storage module 31.

When the banknotes of different types are stored in the storage module 31, these banknotes can be transported to a predetermined destination in the predetermined order in the same manner as the collection process. The storage module 31 is handled in the same manner as the collection process.

[Specific Configuration of Money Handling Apparatus]

Figure 48:
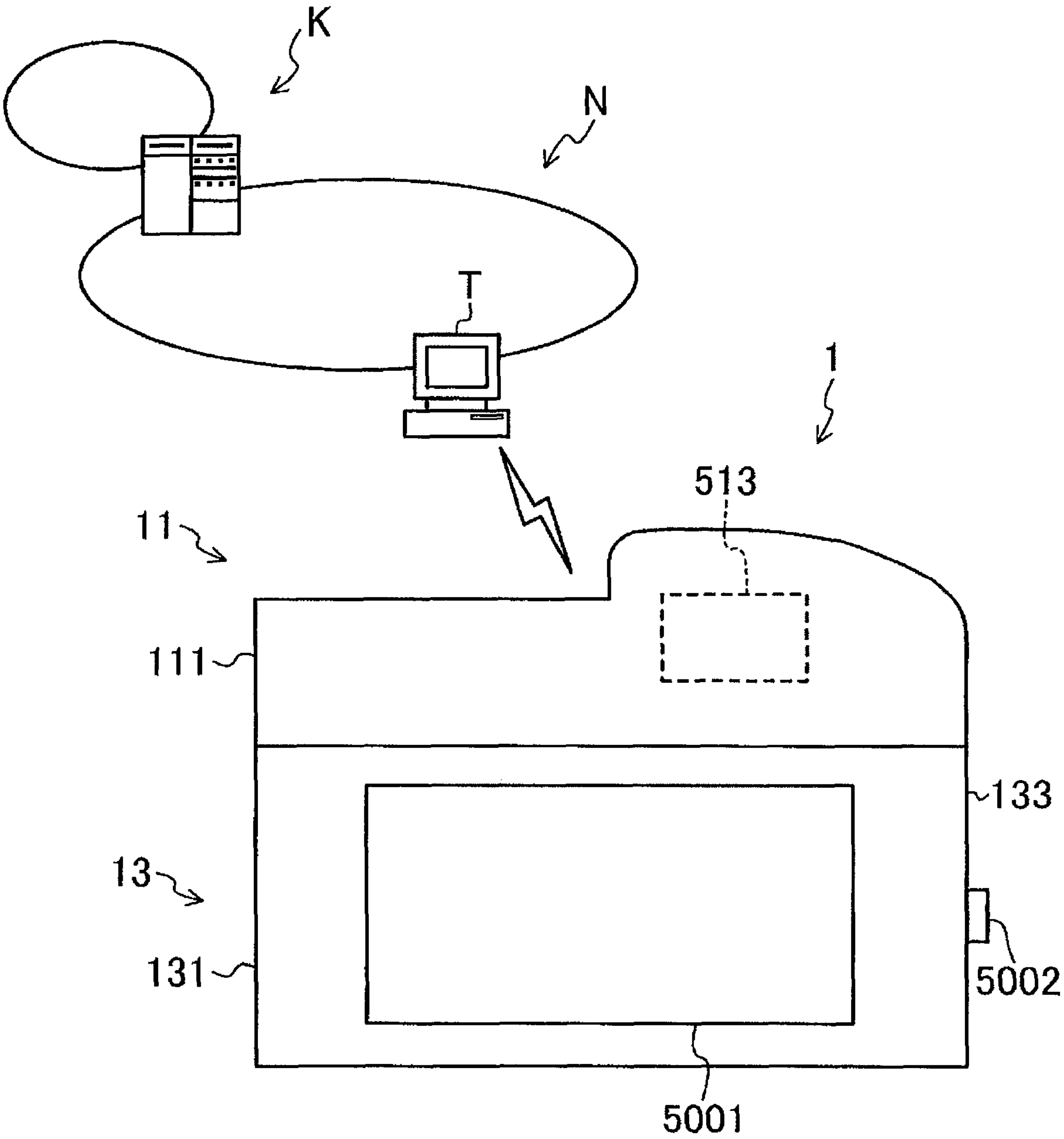
FIG. 48 shows a basic configuration of a money handling apparatus.

FIG. 48 shows a basic configuration of the money handling apparatus 1 to describe the present disclosure. The money handling apparatus 1 of FIG. 48 generally shows the three money handling apparatuses 1A, 1B, and 1C.

In this example, the money handling apparatus 1 is placed in a retailer, such as a supermarket, and is used to manage proceeds. The money handling apparatus 1 is connected to a higher-ranking terminal T. The money handling apparatus 1 is also connected to an accounting system K of a bank through a network N, thereby allowing bidirectional communication.

The specific configuration and functions of the money handling apparatus 1 have already been described above, and will not be described again. The money handling apparatus 1 of the present embodiment includes at least a money storage unit 5001, a locking unit 5002, and a control unit 513. The money storage unit 5001 stores money, and corresponds to the storage unit 3 or the collection cassette 53 provided in the first safe unit 13 (hereinafter referred to as the safe unit 13) of the depositing/dispensing machine 1A. The money handling apparatus 1 of the present embodiment has only a single safe unit, like the different type of the money handling apparatus 1B and the money handling apparatus 1C. However, two or more safe units may be provided as described later.

The locking unit 5002 corresponds to the first electronic lock 1331 provided on the first door 133 on the front surface of the protective casing 131 (hereinafter referred to as the door 133). The locking unit 5002 is generally locked to limit access to the storage unit 3 etc. in the safe unit 13. The storage unit 3 can be accessed when the locking unit 5002 is unlocked. The locking unit 5002 is electrically connected to the control unit 513. For example, the control unit 513 changes a pin number of the locking unit 5002.

Figures 49, 50:
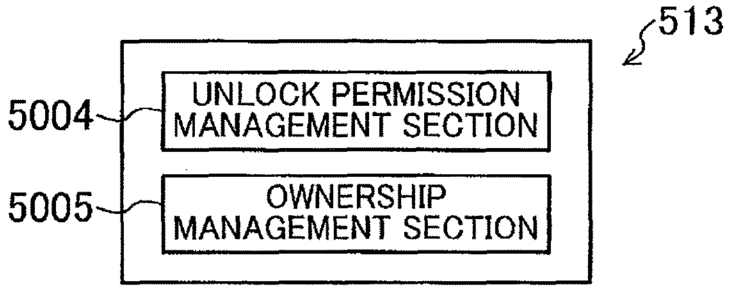
FIG. 49 shows a control unit.
FIG. 50 shows relationship among persons qualified to unlock a money storage unit.

As shown in FIG. 49, the control unit 513 of the present embodiment has additional functions as compared with the above-described control unit 513. The control unit 513 includes an unlock permission management section 5004 and an ownership management section 5005.

The unlock permission management section 5004 is configured to manage unlock permission, which is permission to unlock the locking unit 5002, in cooperation with the memory unit 59 etc. The memory unit 59 includes a permission storing section (not shown) which stores infoimation about the unlock permission, and the unlock permission management section 5004 registers a person qualified to have the unlock permission (may be referred to as a qualified person) in the permission storing section through input from the operation unit 55 etc. The peimission storing section can store two or more qualified persons. Each of the qualified persons has a unique pin number etc. for unlocking the locking unit 5002, i.e., the electronic lock. The qualified person may include a certain group.

The unlock permission management section 5004 can determine at least one of the registered qualified persons as a person who is permitted to unlock the locking unit 5002 (may be referred to as a permitted qualified person). In general, one permitted qualified person is deteimined, but two or more permitted qualified persons may be determined.

Even when two or more qualified persons have been registered, only the permitted qualified person can actually unlock the locking unit 5002. For example, the permitted qualified person is determined when the unlock permission management section 5004 validates only the pin number of the permitted qualified person in the locking unit 5002.

The ownership management section 5005 is configured to manage ownership of the money stored in the money storage unit 5001 in cooperation with the memory unit 59 etc. The memory unit 59 records an owner having the ownership of the money storage unit 5001, or a history of the amount of the money stored in the money storage unit 5001 in association with the owner. The memory unit 59 also records the owner of the money storage unit 5001 in association with the permitted qualified person. The ownership management section 5005 is configured to communicate with the accounting system K of the bank through the network N, to dispense or deposit the money from or in an account of the owner, and to make a transfer between accounts of the registered qualified persons.

The unlock permission management section 5004 and the ownership management section 5005 are operated based on a predetermined condition. For example, these sections are operated when a command to change the permitted qualified person is input through the higher-ranking terminal T etc., when a particular state of the money handling apparatus 1 is detected, e.g., when it is detected that an abnormal event has occurred in the money handling apparatus 1, such as when the money handling apparatus 1 is moved, or when an impact is given to the money handling apparatus 1, or at a predetermined time.

Not only the control unit 513 and the memory unit 59 of the money handling apparatus 1, but the higher-ranking terminal T can have some or all of these functions. Specifically, these functions may be enabled by the cooperation of the control unit 513 and the memory unit 59 of the money handling apparatus 1 and the higher-ranking terminal T.

FIG. 50 shows relationship among the qualified person, the permitted qualified person, and the owner of the money storage unit 5001. In the present embodiment, the money handling apparatus 1 is placed in a retailer. Thus, the money handling apparatus 1 can be handled by, for example, a person in charge of accounting of a shop who manages the proceeds, a correspondent bank of the shop, and a CIT company which collects the money at the request of the bank.

According to a conventional money handling apparatus 1, as shown in a column of Conventional Example in FIG. 50, only the CIT company is determined as the qualified person and the permitted qualified person, and as the owner of the banknotes in the money storage unit 5001. According to the money handling apparatus 1 of the present embodiment, as shown in a column of Example 1, both of the CIT company and the person in charge of accounting are registered as the qualified persons, and the CIT company is determined as an initial setting of the permitted qualified person. The owner of the money storage unit 5001 is the CIT company.

As shown in a column of Example 2, the CIT company, the person in charge of accounting, and the bank may be registered as the qualified persons, and the CIT company may be determined as the initial setting of the permitted qualified person. Also in this case, the owner of the money storage unit 5001 is the CIT company.

Provided that trouble has occurred in the safe unit when the person in charge of accounting is handling the proceeds using the money handling apparatus 1, and the handling is suspended. To recover from the trouble, the locking unit 5002 needs to be unlocked. In a conventional case, only the CIT company can unlock the locking unit 5002. Thus, the person in charge of accounting of the shop needs to call and wait for the CIT company. As a result, the handling of the proceeds is suspended for a long time, for more than 24 hours in some cases. According to the money handling apparatus 1 of the present embodiment, the permitted qualified person can dynamically be changed. Thus, the trouble can be solved quickly and flexibly, thereby improving convenience of the apparatus.

Figure 51:
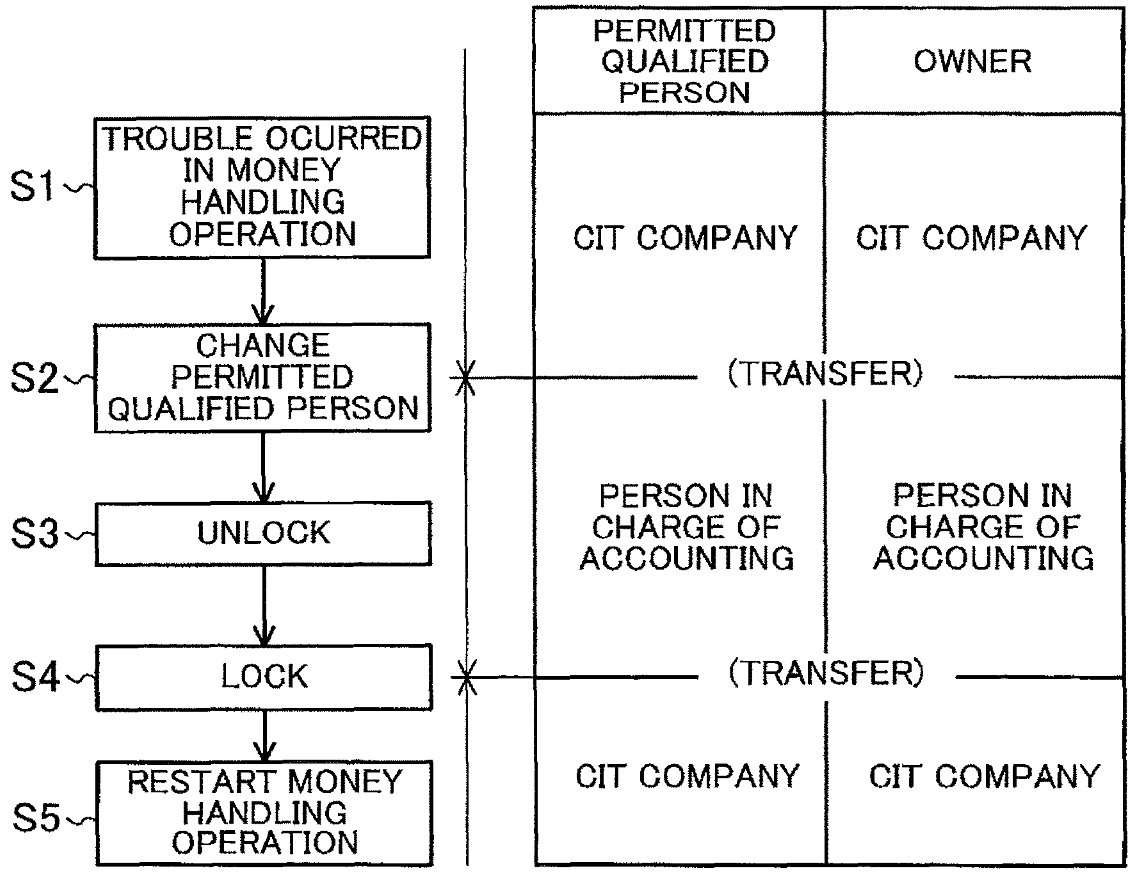
FIG. 51 shows an example of operation of the money handling apparatus.

FIG. 51 shows an example of operation of the money handling apparatus 1 in the above-described case. When trouble has occurred in the safe unit when the person in charge of accounting is handling the proceeds (step S1), the person in charge of accounting inputs a command to change the permitted qualified person through the higher-ranking terminal T or the operation unit 55. For example, only the qualified person is allowed to input the command to change the permitted qualified person by inputting a unique pin number or by referring to an ID card. The person who inputs the command may automatically be selected as a new permitted qualified person, or the new permitted qualified person may be selected from the registered qualified persons. The CIT company called by the person in charge of accounting may input the command to change the permitted qualified person through the higher-ranking terminal T.

When the command is input, the permitted qualified person is changed (step S2), and the unlock permission management section 5004 determines the selected qualified person as a new permitted qualified person. In this example, the person in charge of accounting is determined as the new permitted qualified person. For example, the unlock permission management section 5004 changes the pin number of the locking unit 5002 from the pin number of the CIT company to the pin number of the person in charge of accounting. Thus, the person in charge of accounting can unlock the locking unit 5002 in place of the CIT company.

The person in charge of accounting unlocks the locking unit 5002 (step S3), and solves the trouble in the safe unit 13. When the person in charge of accounting closes the door 133 after the trouble is solved, the locking unit 5002 is automatically locked (step S4). Simultaneously or after the locking unit 5002 is locked, the unlock permission management section 5004 changes the permitted qualified person from the person in charge of accounting to the original permitted qualified person, i.e., the CIT company. When the money handling apparatus 1 is recovered from the trouble, the suspended handling of the proceeds can be restarted (step S5).

Before and after changing the permitted qualified person, handling of the money in the money storage unit 5001 needs to be considered. For example, when the money in the money storage unit 5001 is somehow reduced when the person in charge of accounting is having access to the money storage unit 5001, the CIT company who is the owner of the money may have unexpected damage when the unlock permission is returned to the CIT company. This may damage reliability.

To prevent the damage to the reliability, the money handling apparatus 1 is configured to change the owner of the money in the money storage unit 5001 simultaneously with, before, or after the change of the permitted qualified person. Specifically, the ownership management section 5005 transfers the money in the money storage unit 5001 from the account of the CIT company to the account of the person in charge of accounting (shop) when the unlock permission management section 5004 changes the permitted qualified person, thereby changing the owner of the money in the money storage unit 5001.

More specifically, a balance of the money stored in the money storage unit 5001 when the locking unit is unlocked is determined. Then, the money corresponding to the balance is transferred from the account of the CIT company to the account of the person in charge of accounting (shop), i.e., the CIT company temporarily lends the money corresponding to the balance to the person in charge of accounting. When the locking unit is unlocked, the owner of the money in the money storage unit 5001 is changed from the CIT company to the person in charge of accounting. In this case, if some of the proceeds have already remitted to the account of the CIT company through the accounting system K of the bank, the ownership management section 5005 cancels the remittance as preprocessing, and holds the balance of the account of the CIT company before the change of the permitted qualified person.

Then, when the unlock permission management section 5004 changes the permitted qualified person from the person in charge of accounting to the CIT company, the ownership management section 5005 transfers the money in the money storage unit 5001 from the account of the person in charge of accounting (shop) to the account of the CIT company. More specifically, the full reconciliation process etc. is performed to determine the balance of the money stored in the money storage unit 5001 when the locking unit is locked. Then, the money corresponding to the balance is deposited to the account of the person in charge of accounting (shop), and the money corresponding to the balance which has been lent to the person in charge of accounting by the CIT company is transferred from the account of the person in charge of accounting (shop) to the account of the CIT company, i.e., the lent money is returned. Then, the ownership of the money in the money storage unit 5001 when the locking unit is locked is returned from the person in charge of accounting to the CIT company.

In this configuration, even when the money in the money storage unit 5001 is somehow reduced when the person in charge of accounting is having access to the money storage unit 5001, the reduced amount is reduced from the account of the person in charge of accounting (shop) who has been the owner at that time. The amount of the money in the account of the CIT company does not change, and the CIT company will not have unexpected damage. Thus, the reliability of the money handling apparatus 1 can be ensured even when the permitted qualified person is dynamically changed. The transfer may be performed in real-time through the network N, or may suitably be performed after being stored in the memory unit 59. Then, the person in charge of accounting can restart the handling of the proceeds.

The owner may automatically be changed when the qualified person has unlocked the locking unit 5002. For example, the CIT company and the person in charge of accounting are both registered as the permitted qualified persons so that the person in charge of accounting can also unlock the locking unit 5002. When the person in charge of accounting inputs his pin number to unlock locking unit 5002, the ownership management section 5005 automatically changes the owner from the CIT company to the person in charge of accounting. Accordingly, the input of the command is no longer necessary, and time required for the recovery can be shortened.

The money handling apparatus 1 can deal with possible abnormal events. For example, according to Example 2 described above, the locking unit may be configured to be unlocked only by the bank when it is detected that an abnormal event has occurred in the money handling apparatus 1, such as when the money handling apparatus 1 is moved, or a great impact is given to the money handling apparatus 1. The control unit 513 detects the abnormal event using a sensor etc.

Figure 52:
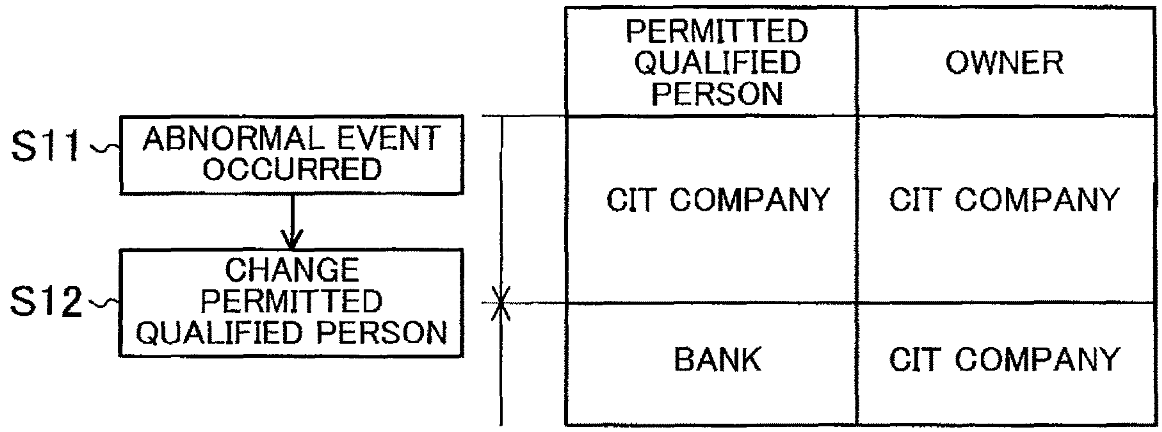
FIG. 52 shows an example of operation of the money handling apparatus.

FIG. 52 shows an example of operation of the money handling apparatus 1 in the above-described case. When the control unit 513 detects an abnormal event of the money handling apparatus 1 (step S11), the unlock permission management section 5004 changes the permitted qualified person from the CIT company to the bank (step S12). Thus, the locking unit 5002 cannot be unlocked by a third person except for the bank, thereby reducing the possibility of robbery of the money. In this case, the locking unit 5002 is not unlocked. Thus, the ownership may not necessarily be changed.

The permitted qualified person may be changed at a predetermined time by setting a timer. For example, the unlock permission may be given to the CIT company during a time period when the CIT company can collect the money, and the unlock permission may be given to the person in charge of accounting out of the time period. In this case, even in the time period when the CIT company cannot collect the money, the person in charge of accounting can collect the money in place of the CIT company. This can improve the convenience of the apparatus.

(Alternative)

Figure 53:
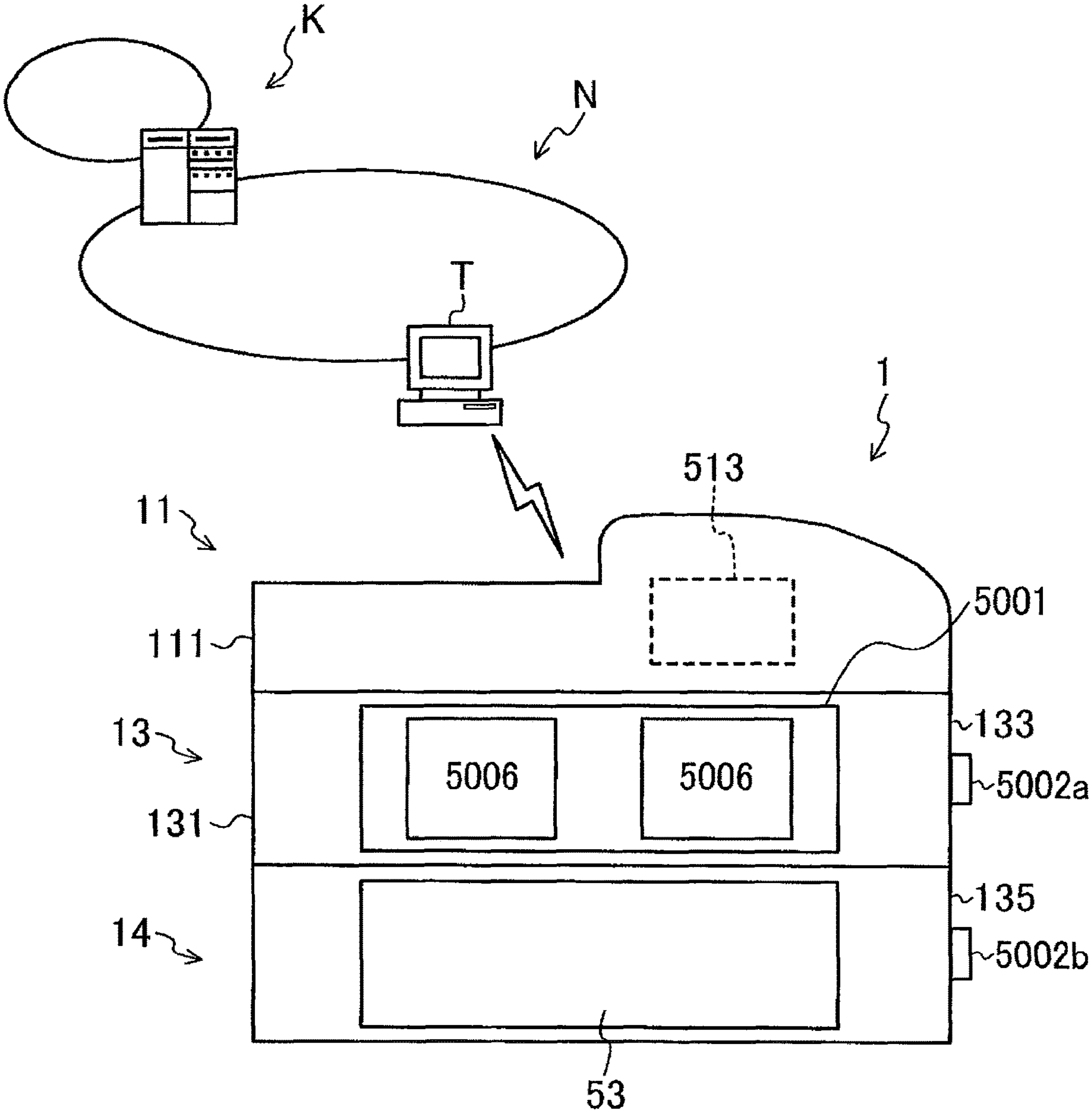
FIG. 53 shows an alternative of the money handling apparatus.

FIG. 53 shows an alternative of the disclosed money handling apparatus 1. The alternative of the money handling apparatus 1 includes two safe units 13 and 14 like the depositing/dispensing machine 1A etc., and the safe units are provided with locking units 5002. Unlock permissions to unlock the locking units 5002 can be given to different persons. Specifically, a first locking unit 5002*a* (corresponding to the first electronic lock 1331) is provided on a first door 133 of a first safe unit 13, and a second locking unit 5002*b* (corresponding to the second electronic lock 1332) is provided on a second door 135 of a second safe unit 14. The control unit 513 can register different persons permitted to unlock the locking units 5002*a* and 5002*b*.

At least one money cassette 5006 which is detachable from the money handling apparatus 1 is provided in the first safe unit 13. The money cassette 5006 corresponds to the storage cassette 31 or the storage module 31 of the depositing/dispensing machine 1A etc.

FIG. 54 shows relationship among the qualified person, the permitted qualified person, and the owner of the money handling apparatus 1 (initial setting). In the example of FIG.

54, the person in charge of accounting, the bank, and the CIT company are registered as the qualified persons of the first locking unit 5002*a* of the first safe unit 13, and the second locking unit 5002*b* of the second safe unit 14. The person in charge of accounting is determined as the permitted qualified person of the first locking unit 5002*a*, and the CIT company is determined as the permitted qualified person of the second locking unit 5002*b*. The person in charge of accounting and the CIT company determined as the permitted qualified persons are also determined as the owners of the money in the corresponding storage units.

In general, the CIT company collects the banknotes from the money cassettes 5006 of the first safe unit 133 to the collection cassette 53 of the second safe unit 14 (collection process), and collects the banknotes from the collection cassette 53. However, the collection process takes long time. The banknotes can directly be collected from the money cassettes 5006. This can reduce the time for the collection. The direct collection may be preferred in some cases.

Figure 55:
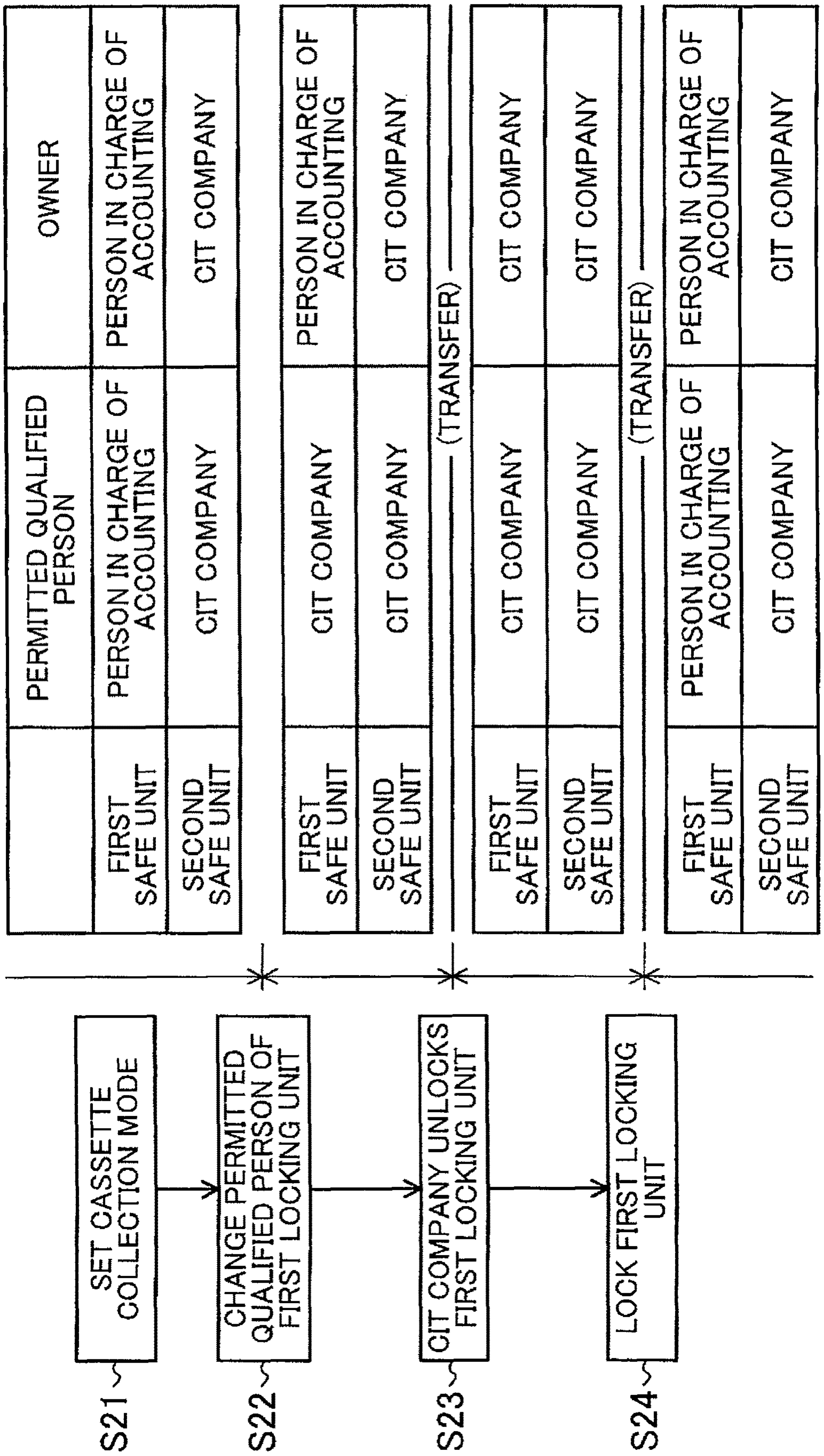
FIG. 55 shows an example of operation of the money handling apparatus according to the alternative.

The money handling apparatus 1 is configured in such a manner that the CIT company can collect the money also from the first safe unit 13. FIG. 55 shows an example of operation of the money handling apparatus 1 in this case. To collect the money from the first safe unit 13, the CIT company selects a cassette collection mode through the higher-ranking terminal T etc., and inputs a command to perform the collection from the cassette to the control unit 513 (step S21). Thus, the unlock permission management section 5004 changes the permitted qualified person of the first locking unit 5002*a* from the person in charge of accounting to the CIT company (step S22).

Thus, the CIT company can unlock the first locking unit 5002*a*. The CIT company unlocks the first locking unit 5002*a* by inputting his pin number, for example (step S23). When the first locking unit 5002*a* is unlocked, the ownership management section 5005 transfers the money in the money storage unit 5001 from the account of the person in charge of accounting (shop) to the account of the CIT company, and changes the owner. Thus, the CIT company can freely collect the money storage unit 5001 owned by himself.

When the collection of the money is finished, and the first locking unit 5002*a* is locked (step S24), the ownership management section 5005 transfers the money in the money storage unit 5001 from the account of the CIT company to the account of the person in charge of accounting (shop), and returns the ownership to the person in charge of accounting.

The money storage unit 5001 may be the money cassettes 5006. Specifically, the qualified person, the permitted qualified person, and the owner of each of the locking units of the money cassettes 5006 can be determined. Each of the locking units corresponds to the lock unit 3001 of the money handling apparatus 1. This allows management of the money in various ways, thereby improving the convenience of the apparatus.

The door 133 etc. may be provided with an additional electrical lock (additional locking unit) in addition to the electronic lock, so that different electrical locks can be unlocked by different permitted qualified persons. For example, the additional electrical lock may remain locked when it is not energized, and may be unlocked when it is energized. The additional electrical lock may be locked or unlocked by operating itself, while the electrical lock may be unlocked only when the additional electrical lock is unlocked.

Thus, use of the electronic lock and the additional electronic lock can vary a security level in unlocking them. The locking unit 5002 can selectively be used in accordance with the security level.

A sensor which detects that the locking unit 5002 is unlocked, and outputs a signal indicating that the locking unit is unlocked to the control unit 513 may be provided. When the locking unit 5002 is unlocked in changing the permitted qualified person, information that the locking unit is unlocked may be given to both of the permitted qualified person before the change, and the changed permitted qualified person. Thus, the information may be given to all the concerned persons.

What is claimed is:

1. A money handling apparatus comprising:
a handling unit;
a first safe unit below the handling unit; and
a second safe unit below the first safe unit; wherein
the handling unit includes
an inlet through which money is received;
an outlet through which the received money is dispensed;
a transport path connecting the inlet and the outlet, the transport path transporting the received money in a front-back direction of the money handling apparatus; and
a plurality of branch paths each of which being connected to the transport part and transports the money transported through the transport path,
the first safe unit includes a plurality of storage cassettes which are arranged in the front-back direction of the money handling apparatus, each storage cassette being connected to each branch path and stores therein the money transported through each branch path and feeds the money stored therein to the transport path through each branch path, and
the second safe unit includes a collection cassette that stores the money fed from the storage cassette therein, wherein
the money handling apparatus further comprising:
a connection path which penetrates the first safe unit, which connects the transport path in the handling unit and the collection cassette in the second safe unit, the connection path which transports in an up-down direction the money transported through the transport path to the collection cassette.

2. The money handling apparatus of claim 1, further comprising:
a first casing for housing the handling unit; and
a second casing for housing the first safe unit and the second safe unit, wherein the first casing is provided with a first door for opening and closing the first safe unit, and the second casing is provided with a second door for opening and closing the second safe unit.

3. The money handling apparatus of claim 2, wherein
the first door has a first lock for locking and unlocking the first door, and the second door has a second lock for locking and unlocking the second door, and
unlock permission for the first key and unlock permission for the second key are respectively changeable.

4. The money handling apparatus of claim 2, wherein
the second casing is protected at a higher security level than the first casing.

5. The money handling apparatus of claim 1, further comprising:
a recognition unit and an escrow unit housed in the handling unit;

wherein the recognition unit is configured to recognize the money fed from the storage cassettes, the storage cassettes are configured to store the money recognized by the recognition unit as normal money therein, and the escrow unit is configured to store the money recognized by the recognition unit as money to be rejected therein.

6. The money handling apparatus of claim 1, wherein the first safe unit and the second safe unit are configured to protect the storage cassettes and the collection cassettes at different security levels, respectively.

* * * * *